United States Patent
Yoshioka et al.

(10) Patent No.: US 7,419,095 B2
(45) Date of Patent: Sep. 2, 2008

(54) DESTINATION PREDICTION APPARATUS AND DESTINATION PREDICTION METHOD

(75) Inventors: Mototaka Yoshioka, Osaka (JP); Jun Ozawa, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 219 days.

(21) Appl. No.: 11/367,576

(22) Filed: Mar. 6, 2006

(65) Prior Publication Data

US 2006/0238409 A1    Oct. 26, 2006

Related U.S. Application Data

(63) Continuation of application No. PCT/JP2005/017063, filed on Sep. 15, 2005.

(30) Foreign Application Priority Data

Oct. 14, 2004  (JP)  ............................. 2004-299949

(51) Int. Cl.
*G07B 15/02* (2006.01)

(52) U.S. Cl. .................. 235/384; 235/375; 340/995.19; 340/995.22; 701/207; 701/209; 701/210

(58) Field of Classification Search ................. 235/375; 340/995.19, 995.22; 701/207, 209, 210
See application file for complete search history.

(56) References Cited

U.S. PATENT DOCUMENTS

| 7,044,373 B1 * | 5/2006 | Garber et al. ................ 235/385 |
| 7,203,598 B1 * | 4/2007 | Whitsell ...................... 701/210 |
| 2004/0128066 A1 | 7/2004 | Kudo et al. |

FOREIGN PATENT DOCUMENTS

| JP | 2000-293540 | 10/2000 |
| JP | 2002-163301 | 6/2002 |
| WO | 03/014670 | 2/2003 |

* cited by examiner

*Primary Examiner*—Michael G. Lee
*Assistant Examiner*—Ali Sharifzada
(74) *Attorney, Agent, or Firm*—Wenderoth, Lind & Ponack, L.L.P.

(57) ABSTRACT

To provide a destination prediction apparatus which can predict a destination of a user by using a carried item carried by the user, the destination prediction apparatus according to the present invention includes: a position information detection unit which detects a present position of a mobile terminal; a carried item detection unit which detects the carried item of the user; a history accumulation unit which accumulates a history of date and time information detected by a clock unit, position information detected by the position information detection unit, and information of the carried item of the user detected by the carried item detection unit; a carry frequency judgment unit which calculates a frequency at which the carried item is carried; a causal relationship extraction unit which calculates an infrequently carried item and a related point; a destination prediction unit which predicts the destination using the position information, the carried item information, and a position causal relationship extracted by the causal relationship extraction unit; and the clock unit which detects the date and time information.

12 Claims, 72 Drawing Sheets

FIG. 4

| Date/Time | Position | Carried Item | Carried Item | Carried Item |
|---|---|---|---|---|
| Wed, May 14 19:20 | N35.00E135.00 | Wallet | Watch | English Textbook |
| Wed, May 14 19:21 | N35.01E135.00 | Wallet | Watch | English Textbook |
| Wed, May 14 19:22 | N35.02E135.00 | Wallet | Watch | English Textbook |
| .. | .. | .. | .. | .. |
| Wed, May 14 19:52 | N35.05E135.05 | Wallet | Watch | English Textbook |
| .. | .. | .. | .. | .. |
| Thurs, May 15 19:20 | N35.00E135.00 | Wallet | Watch | Jersey |
| Thurs, May 15 19:21 | N35.01E135.00 | Wallet | Watch | Jersey |
| Thurs, May 15 19:22 | N35.02E135.00 | Wallet | Watch | Jersey |
| .. | .. | .. | .. | .. |
| Fri, May 17 19:20 | N35.00E135.00 | Wallet | Watch | |
| Fri, May 17 19:21 | N35.01E135.00 | Wallet | Watch | |
| .. | .. | .. | .. | |

33 Histories (rows 1-5), 38 Histories (rows 6-10), 29 Histories (rows 11-13)

FIG. 5

| Date/Time | Position | Carried Item | Carried Item | Carried Item | |
|---|---|---|---|---|---|
| Wed, May 14 19:20 | N35. 00E135. 00 | Wallet | Watch | English Textbook | |
| Wed, May 14 19:21 | N35. 01E135. 00 | Wallet | Watch | English Textbook | |
| Wed, May 14 19:22 | N35. 02E135. 00 | Wallet | Watch | English Textbook | |
| .. | .. | .. | .. | .. | |
| Wed, May 14 19:52 | N35. 05E135. 05 | Wallet | Watch | English Textbook | |
| .. | .. | .. | .. | .. | |
| Thurs, May 15 19:20 | N35. 00E135. 00 | Wallet | Watch | Jersey | |
| Thurs, May 15 19:21 | N35. 01E135. 00 | Wallet | Watch | Jersey | |
| Thurs, May 15 19:22 | N35. 02E135. 00 | Wallet | Watch | Jersey | |
| .. | .. | .. | .. | .. | |
| Fri, May 17 19:20 | N35. 00E135. 00 | Wallet | Watch | | |
| Fri, May 17 19:21 | N35. 01E135. 00 | Wallet | Watch | | |
| .. | .. | .. | .. | | |

33 Histories / 34 Histories / 33 Histories

FIG. 6

| Date/Time | Position | Carried Item |
|---|---|---|
| Wed, May 14 19:20 | N35. 00E135. 00 | English Textbook |
| Wed, May 14 19:21 | N35. 01E135. 00 | English Textbook |
| Wed, May 14 19:22 | N35. 02E135. 00 | English Textbook |
| : | : | : |
| Wed, May 21 19:20 | N35. 00E135. 05 | English Textbook |
| Wed, May 21 19:21 | N35. 01E135. 00 | English Textbook |
| Wed, May 21 19:22 | N35. 02E135. 00 | English Textbook |
| : | : | : |
| Wed, May 28 19:20 | N35. 00E135. 00 | English Textbook |
| Wed, May 28 19:21 | N35. 01E135. 00 | English Textbook |
| Wed, May 28 19:22 | N35. 02E135. 00 | English Textbook |
| : | : | : |

FIG. 7

| Date/Time | Position | Carried Item |
|---|---|---|
| Wed, May 14 19:20 | N35. 00E135. 00 | English Textbook |
| Wed, May 14 19:21 | N35. 01E135. 00 | English Textbook |
| Wed, May 14 19:22 | N35. 02E135. 00 | English Textbook |
| .. | .. | .. |
| Wed, May 21 19:20 | N35. 00E135. 05 | English Textbook |
| Wed, May 21 19:21 | N35. 01E135. 00 | English Textbook |
| Wed, May 21 19:22 | N35. 02E135. 00 | English Textbook |
| .. | .. | .. |
| Wed, May 28 19:20 | N35. 00E135. 00 | English Textbook |
| Wed, May 28 19:21 | N35. 01E135. 00 | English Textbook |
| Wed, May 28 19:22 | N35. 02E135. 00 | English Textbook |
| .. | .. | .. |

| Position | Commercial Information | |
|---|---|---|
| N35. 00E135. 00 | .. | .. |
| N35. 01E135. 00 | .. | .. |
| N35. 02E135. 00 | CD Shop Information | Accepting reservations for Mai Kuramoto's new album |
| .. | .. | .. |

| History Display Mark | Carried Item |
|---|---|
| X | English Textbook |
| O | Jersey |
| △ | Wallet |

FIG. 21

| Node Number | Name | Longitude | Latitude |
|---|---|---|---|
| C1 | Hanamachi 1 Intersection | 135 Degrees 20 Minutes 35.45 Seconds | 34 Degrees 44 Minutes 35.22 Seconds |
| C2 | Hanamachi 2 Intersection | 135 Degrees 24 Minutes 35.74 Seconds | 34 Degrees 44 Minutes 35.22 Seconds |
| C3 | Yamakawa 1 Intersection | 135 Degrees 22 Minutes 6.22 Seconds | 34 Degrees 44 Minutes 78.18 Seconds |
| C4 | ··· Intersection | 135 Degrees 22 Minutes 10.4 Seconds | 34 Degrees 45 Minutes 60.75 Seconds |
| C5 | ··· Intersection | 135 Degrees 22 Minutes 20.0 Seconds | 34 Degrees 46 Minutes 79.37 Seconds |
| C6 | ··· Intersection | 135 Degrees 20 Minutes 42.76 Seconds | 34 Degrees 46 Minutes 70.48 Seconds |
| C7 | ··· Intersection | 135 Degrees 22 Minutes 35.39Seconds | 34 Degrees 47 Minutes 35.82 Seconds |
| ·· | ·· | ·· | ·· |
| L101 | Landmark(Home) | 135 Degrees 19 Minutes 48.42Seconds | 34 Degrees 42 Minutes 38029 Seconds |
| L102 | Landmark(Work) | 135 Degrees 30 Minutes 22.33Seconds | 35 Degrees 12 Minutes 23.6 Seconds |
| L105 | Landmark(English School Geon) | 135 Degrees 19 Minutes 48.42Seconds | 34 Degrees 42 Minutes 38029 Seconds |
| L106 | Landmark(Sports Gym Excize) | 135 Degrees 30 Minutes 22.33Seconds | 35 Degrees 12 Minutes 23.6 Seconds |
| L107 | Landmark(Munakata Tennis Courts) | 135 Degrees 30 Minutes 22.33Seconds | 35 Degrees 12 Minutes 23.6 Seconds |
| ·· | ·· | ·· | ·· |
| A427 | Area(Umeda North) | 135 Degrees 29 Minutes 51.9Seconds | 34 Degrees 41 Minutes 57.0 Seconds |

FIG. 22

| Date/Time | Carried Item | | |
|---|---|---|---|
| Wed, May 14 19:20 | Watch | Wallet | English Textbook |
| .. | .. | .. | .. |

FIG. 23

| Date/Time | Position | Carried Item | | |
|---|---|---|---|---|
| Wed, May 14 19:20 | N35. 00E135. 00 | Watch | Wallet | English Textbook |
| Wed, May 14 19:21 | N35. 01E135. 00 | Watch | Wallet | English Textbook |
| Wed, May 14 19:22 | N35. 02E135. 00 | Watch | Wallet | English Textbook |
| .. | .. | .. | .. | .. |
| Wed, May 14 19:22 | N35. 02E135. 00 | Watch | Wallet | Jersey |
| .. | .. | .. | .. | .. |

FIG. 24A  Sampled with possession check

| Date/Time | Carried Item | | |
| --- | --- | --- | --- |
| | Watch | Wallet | English Textbook |
| Wed, May 14 19:20 | | | |
| .. | .. | .. | .. |
| .. | .. | .. | .. |

FIG. 24B  Map information display or automatic sampling

| Date/Time | Position |
| --- | --- |
| Wed, May 14 19:20 | N35. 00E135. 00 |
| Wed, May 14 19:21 | N35. 01E135. 00 |
| Wed, May 14 19:22 | N35. 02E135. 00 |
| .. | .. |
| .. | .. |

FIG. 25

Systemized History

| Date/Time | Departure Area | Target Area | Node Series | Carried Item | | |
|---|---|---|---|---|---|---|
| Wed, May 14 19:20 | Work (L102) | English School Geon (L105) | C7→C8→C5→C6 →C17→C18 | Wallet | Watch | English Textbook |
| Fri, May 16 20:20 | Work (L102) | English School Geon (L105) | C7→C8→C5→C6 →C17→C18 | Wallet | Watch | English Textbook |
| Sat, May 17 16:05 | Home (L101) | English School Geon (L105) | C1→C2→C3→C17 →C18 | Wallet | — | English Textbook |
| Mon, May 19 20:05 | Work (L02) | Johnny's Restaurant (L107) | C7→C10→C11→C12 →C13 | Wallet | Watch | — |
| Sun, May 18 18:15 | Home (L101) | Sports Gym Excize (L106) | C1→C2→C3→C9 | Wallet | Watch | Jersey |
| .. | .. | .. | .. | .. | .. | .. |

FIG. 26

| Date/Time | Position | Carried Item | |
|---|---|---|---|
| Wed, May 14 19:20 | N35.00E135.00 | Wallet | English Textbook |
| Wed, May 14 19:21 | N35.01E135.00 | Wallet | English Textbook |
| Wed, May 14 19:22 | N35.02E135.00 | Wallet | English Textbook |
| .. | .. | .. | .. |
| Thurs, May 15 19:20 | N35.00E135.05 | Wallet | |
| Thurs, May 15 19:21 | N34.49E135.00 | Wallet | |
| .. | .. | .. | .. |
| Fri, May 17 19:20 | N35.00E135.00 | Wallet | Racket |
| Fri, May 17 19:21 | N35.00E135.01 | Wallet | Racket |
| Fri, May 17 19:22 | N35.00E135.02 | Wallet | Racket |
| Fri, May 17 19:23 | N35.00E135.03 | Wallet | Racket |
| Fri, May 17 19:24 | N35.00E135.04 | Wallet | Racket |
| ... | .. | .. | .. |

33 Histories / 7 Histories / 60 Histories

FIG. 27

| Date/Time | Position | Carried Item | |
|---|---|---|---|
| Wed, May 14 19:20 | N35.00E135.00 | Wallet | English Textbook |
| Wed, May 14 19:21 | N35.01E135.00 | Wallet | English Textbook |
| Wed, May 14 19:22 | N35.02E135.00 | Wallet | English Textbook |
| .. | .. | .. | .. |
| Thurs, May 15 19:20 | N35.00E135.05 | Wallet | |
| Thurs, May 15 19:21 | N34.49E135.00 | Wallet | |
| .. | .. | .. | .. |
| Fri, May 17 19:20 | N35.00E135.00 | Wallet | Racket |
| Fri, May 17 19:21 | N35.00E135.01 | Wallet | Racket |
| Fri, May 17 19:22 | N35.00E135.02 | Wallet | Racket |
| Fri, May 17 19:23 | N35.00E135.03 | Wallet | Racket |
| Fri, May 17 19:24 | N35.00E135.04 | Wallet | Racket |
| ... | .. | .. | .. |

33 Histories / 7 Histories / 60 Histories

FIG. 33

Infrequently Carried Item and Target Area

| Date/Time | Departure Area | Target Area | Node Series | Carried Item | |
|---|---|---|---|---|---|
| Wed, May 14 19:20 | Work (L102) | English School Geon (L105) | C7→C8→C5→C6 →C17→C18 | Wallet/Watch | English Textbook |
| Fri, May 16 20:20 | Work (L102) | English School Geon (L105) | C7→C8→C5→C6 →C17→C18 | Wallet/Watch | English Textbook |
| Sat, May 17 16:05 | Home (L101) | English School Geon (L105) | C1→C2→C3→C17 →C18 | Wallet | English Textbook |
| Mon, May 19 20:05 | Work (L02) | Johnny's Restaurant (L107) | C7→C10→C11→C12 →C13 | Wallet/Watch | — |
| .. | .. | .. | .. | .. | .. |
| Sun, May 18 18:15 | Home (L101) | Sports Gym Excize (L106) | C1→C2→C3→C9 | Wallet/Watch | Jersey |
| .. | .. | .. | .. | .. | .. |

FIG. 37

| Date/Time | Departure Area | Target Area | Node Series | Carried Item | | |
|---|---|---|---|---|---|---|
| Sun, May 18 18:15 | Home (L101) | Sports Gym Excize (L106) | C1→C2→C3→C9 | Wallet | Watch | Jersey |
| Sat, May 24 18:15 | Home (L101) | Sports Gym Excize (L106) | C1→C2→C3→C9 | Wallet | Watch | Jersey |
| .. | .. | .. | .. | .. | .. | .. |
| Sun, June 22 18:15 | Home (L101) | Sports Gym Excize (L106) | C1→C2→C3→C9 | Wallet | Watch | Jersey |
| Sun, June 29 18:15 | Home (L101) | Park (L109) | C1→C2→C3→C16 | Wallet | Watch | Jersey |
| .. | .. | .. | .. | .. | .. | .. |

9 Histories (first four data rows)
1 History (last data row)

FIG. 38

| Date/Time | Departure Area | Target Area | Node Series | Carried Item | | | | |
|---|---|---|---|---|---|---|---|---|
| Wed, May 14 19:20 | Work (L102) | English School Geon (L105) | C7→C8→C5→C6→C17→C18 | Wallet | Watch | English Textbook A | English Textbook B | Writing Instruments | Electronic Dictionary |
| Fri, May 16 20:00 | Work (L102) | English School Geon (L105) | C7→C8→C5→C6→C17→C18 | Wallet | Watch | English Textbook A | English Textbook B | Writing Instruments | Electronic Dictionary |
| Sat, May 17 16:05 | Home (L101) | English School Geon (L105) | C1→C2→C3→C17→C18 | Wallet | | English Textbook A | English Textbook B | Writing Instruments | Electronic Dictionary |
| .. | .. | .. | .. | .. | | .. | .. | .. | .. |

FIG. 40

| | L1 | L2 | L3 | L4 | L5 | L6 |
|---|---|---|---|---|---|---|
| | Position | Facility Identifier | Facility Name | Specified Item (Morning) | Specified Item (Afternoon) | Specified Item (Evening) |
| | Longitude e1, Latitude n1 | Facility 1 | English School Geon | English Textbook | English Textbook | English Textbook |
| | Longitude e2, Latitude n2 | Facility 2 | Sports Gym Excize | Racket | Swimsuit | Jersey |
| | Longitude e3, Latitude n3 | Facility 3 | Music Studio | Sheet Music | Sheet Music | Guitar |
| | | Facility 4 | Calligraphy School | Calligraphy Set | Calligraphy Set | — |
| | ... | ... | ... | ... | ... | ... |

FIG. 41

Facility Candidate Information

| Facility Identifier | Facility Name | Specified Item (Morning) | Specified Item (Afternoon) | Specified Item (Evening) |
|---|---|---|---|---|
| Facility Name 1 | English School Geon | English Textbook | English Textbook | English Textbook |
| Facility Name 2 | Sports Gym Excize | Racket | Swimsuit | Jersey |

FIG. 43
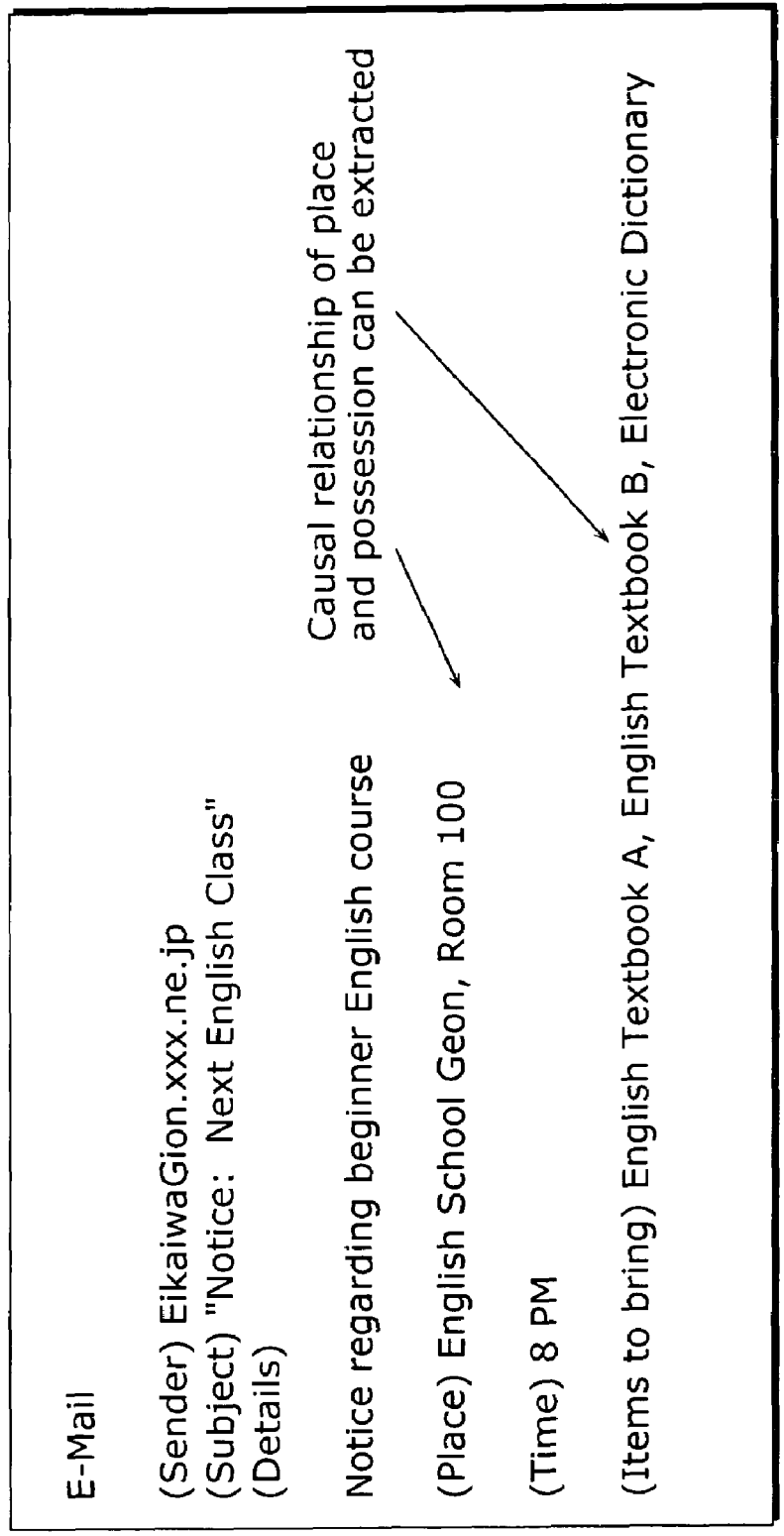
E-Mail
(Sender) EikaiwaGion.xxx.ne.jp
(Subject) "Notice: Next English Class"
(Details)
Notice regarding beginner English course
(Place) English School Geon, Room 100
(Time) 8 PM
(Items to bring) English Textbook A, English Textbook B, Electronic Dictionary
Causal relationship of place and possession can be extracted

FIG. 44

| Position | Facility Identifier | Facility Name | Facility Category | Specified Item (Morning) | Specified Item (Afternoon) | Specified Item (Evening) |
|---|---|---|---|---|---|---|
| Longitude e5, Latitude n5 | Facility 1 | Maruyama Golf Course | Golf Course | Golf Bag Golf Shoes | Golf Bag Golf Shoes | Golf Bag Golf Shoes |
| Longitude e6, Latitude n6 | Facility 2 | Katayama Golf Course | Golf Course | ※ | ※ | ※ |
| ... | ... | ... | ... | ... | ... | ... |

FIG. 47

| ID | Position | Facility Name | Carried Item | | | |
|---|---|---|---|---|---|---|
| 001 | Longitude 135 degrees, 34 minutes, 30 seconds Latitude 35 degrees, 30 minutes, 10 seconds | Yodobashi Cram School | English textbook Y | Japanese -English Dictionary | English- Japanese Dictionary | |
| 002 | Longitude 135 degrees, 31 minutes, 30 seconds Latitude 35 degrees, 36 minutes, 10 seconds | Hanamachi University | Reference Book B | English- Japanese Dictionary | Japanese -English Dictionary | Writing Instruments |
| 003 | Longitude 135 degrees, 10 minutes, 30 seconds Latitude 35 degrees, 56 minutes, 10 seconds | Hanamachi General Library | Book "Electric Engineering" | Book "Energy Conservation Methods" | Writing Instruments | Student ID |
| 004 | Longitude 135 degrees, 30 minutes, 30 seconds Latitude 35 degrees, 02 minutes, 10 seconds | Sports Gym Excize | Jersey | Sports Shoes | Tennis Balls | Racket |
| .. | ... | ... | ... | ... | ... | |

FIG. 49

| ID | Position | Facility Name | Carried Item | | | | |
|---|---|---|---|---|---|---|---|
| 001 | Longitude 135 degrees, 34 minutes, 30 seconds Latitude 35 degrees, 30 minutes, 10 seconds | Yodobashi Cram School | English textbook Y | Japanese -English Dictionary | English- Japanese Dictionary | | Student ID |
| 002 | Longitude 135 degrees, 31 minutes, 30 seconds Latitude 35 degrees, 36 minutes, 10 seconds | Hanamachi University | Reference Book B | English- Japanese Dictionary | Japanese -English Dictionary | Writing Instruments | |
| 003 | Longitude 135 degrees, 10 minutes, 30 seconds Latitude 35 degrees, 56 minutes, 10 seconds | Hanamachi General Library | Book "Electric Engineering" | Book "Energy Conservation Methods" | Writing Instruments | | |
| 004 | Longitude 135 degrees, 30 minutes, 30 seconds Latitude 35 degrees, 02 minutes, 10 seconds | Sports Gym Excize | Jersey | Sports Shoes | Tennis Balls | Racket | |
| .. | ... | ... | ... | ... | | | |

FIG. 50

| Date/Time | Carried Item | | | |
|---|---|---|---|---|
| | English Textbook Y | Japanese-English Dictionary | Writing Instruments | Watch |
| Wed, May 14 19:20 | .. | .. | .. | .. |
| .. | .. | .. | .. | .. |
| ... | | | | |

FIG. 55

| Same-type Carried Item | Substitute Carried Item | ... |
|---|---|---|
| Japanese-English Dictionary | Electronic Dictionary Japanese-English /English-Japanese Dictionary | |
| English-Japanese Dictionary | | |
| : | | |
| : | | |
| | | |
| | | |
| | | |
| Writing Instruments | | |
| Pen | | |
| | | |
| | | |
| | | |
| | | |

FIG. 56

| Date/Time | Carried Item | | | |
|---|---|---|---|---|
| | English Textbook Y | Electronic Dictionary | Writing Instruments | Watch |
| Wed, May 14 19:20 | .. | .. | .. | .. |
| .. | | | | |

FIG. 57

| ID | Position | Facility Name | Carried Item | Degree of Importance | | Degree of Importance | | Degree of Importance | | Degree of Importance | Student ID | Degree of Importance |
|----|----------|---------------|--------------|---------------------|---|---------------------|---|---------------------|---|---------------------|------------|---------------------|
| 001 | Longitude 135 degrees, 34 minutes, 30 seconds Latitude 35 degrees, 30 minutes, 10 seconds | Yodobashi Cram School | English textbook Y | 10 | Japanese -English Dictionary | 3 | English-Japanese Dictionary | 3 | | | | |
| 002 | Longitude 135 degrees, 36 minutes, 30 seconds Latitude 35 degrees, 36 minutes, 10 seconds | Hanamachi University | Reference Book B | 5 | English-Japanese Dictionary | 3 | Japanese-English Dictionary | 3 | Writing Instruments | 1 | | 5 |
| 003 | Longitude 135 degrees, 10 minutes, 30 seconds Latitude 35 degrees, 56 minutes, 10 seconds | Hanamachi General Library | Book "Electric Engineering" | 5 | Book "Energy Conservation Methods" | 5 | Writing Instruments | 1 | | | | |
| 004 | Longitude 135 degrees, 30 minutes, 30 seconds Latitude 35 degrees, 02 minutes, 10 seconds | Sports Gym Excize | Jersey | ※ 10 | Sports Shoes | ※ 10 | Tennis Balls | ※ 10 | Racket | ※ 10 | | |
| ⋮ | ⋮ | ⋮ | ⋮ | | ⋮ | | ⋮ | | ⋮ | | | |

FIG. 58

| Position | Facility Name | Carried Item | | | |
|---|---|---|---|---|---|
| Wed, May 14 11:20 | Longitude 135 degrees, 34 minutes, 30 seconds Latitude 35 degrees, 36 minutes, 10 seconds | Hanamachi University | Reference Book B | Japanese-English Dictionary | Student ID | Laptop PC |
| .. | .. | .. | .. | .. | .. | .. |
| Thurs, May 15 9:21 | Longitude 135 degrees, 36 minutes, 30 seconds Latitude 35 degrees, 36 minutes, 10 seconds | Hanamachi University | Reference Book B | Japanese-English Dictionary | Student ID | Laptop PC |
| .. | .. | .. | .. | .. | .. | .. |
| Fri, May 16 10:22 | Longitude 135 degrees, 36 minutes, 30 seconds Latitude 35 degrees, 36 minutes, 10 seconds | Hanamachi University | Reference Book B | Japanese-English Dictionary | Student ID | Laptop PC |
| .. | .. | .. | .. | .. | .. | .. |

FIG. 59

| ID | Position | Facility Name | Carried Item | Degree of Importance | | Degree of Importance | | Degree of Importance | | Degree of Importance | | Degree of Importance |
|---|---|---|---|---|---|---|---|---|---|---|---|---|
| 001 | Longitude 135 degrees, 34 minutes, 30 seconds Latitude 35 degrees, 30 minutes, 10 seconds | Yodobashi Cram School | English textbook Y | 10 | Japanese-English Dictionary | 3 | English-Japanese Dictionary | 3 | | | | |
| 002 | Longitude 135 degrees, 36 minutes, 30 seconds Latitude 35 degrees, 36 minutes, 10 seconds | Hanamachi University | Reference Book B | 5 | Laptop PC | 3 | Japanese-English Dictionary | 3 | Student ID | | 5 | |
| 003 | Longitude 135 degrees, 10 minutes, 30 seconds Latitude 35 degrees, 56 minutes, 10 seconds | Hanamachi General Library | Book "Electric Engineering" | 5 | Book "Energy Conservation Methods" | 5 | Writing Instruments | 1 | | | | |
| 004 | Longitude 135 degrees, 30 minutes, 30 seconds Latitude 35 degrees, 02 minutes, 10 seconds | Sports Gym Excize | Jersey | ※10 | Sports Shoes | ※10 | Tennis Balls | ※10 | Racket | | ※10 | |
| .. | ... | ... | ... | | ... | | ... | | | | | |

FIG. 61A

| ID | Position | Facility Name | Carried Item | | | |
|---|---|---|---|---|---|---|
| 001 | Longitude 135 degrees, 34 minutes, 30 seconds, Latitude 35 degrees, 30 minutes, 10 seconds | Yodobashi Cram School | English textbook Y | Japanese -English Dictionary | English- Japanese Dictionary | |
| 002 | Longitude 135 degrees, 31 minutes, 30 seconds, Latitude 35 degrees, 36 minutes, 10 seconds | Hanamachi University | Reference Book B | English- Japanese Dictionary | Japanese -English Dictionary | Writing Instruments | Student ID |
| 003 | Longitude 135 degrees, 10 minutes, 30 seconds, Latitude 35 degrees, 56 minutes, 10 seconds | Hanamachi General Library | Book "Electric Engineering" | Book "Energy Conservation Methods" | Writing Instruments | |
| 004 | Longitude 135 degrees, 30 minutes, 30 seconds, Latitude 35 degrees, 02 minutes, 10 seconds | Sports Gym Excize | Jersey | Sports Shoes | Tennis Balls | Racket |
| ... | | | | | | |

FIG. 61B Current Carried Items

| Day/Time | Carried Item | | |
|---|---|---|---|
| Wed, May 14 19:20 | Japanese-English Dictionary | English-Japanese Dictionary | ... |
| ... | ... | | |

FIG. 64A

| ID | Position | Facility Name | Carried Item | | | | |
|---|---|---|---|---|---|---|---|
| 001 | Longitude 135 degrees, 34 minutes, 30 seconds Latitude 35 degrees, 30 minutes, 10 seconds | Yodobashi Cram School | English textbook Y | Japanese -English Dictionary | English- Japanese Dictionary | | |
| 002 | Longitude 135 degrees, 31 minutes, 30 seconds Latitude 35 degrees, 36 minutes, 10 seconds | Hanamachi University | Reference Book B | English- Japanese Dictionary | Japanese -English Dictionary | | |
| 003 | Longitude 135 degrees, 10 minutes, 30 seconds Latitude 35 degrees, 56 minutes, 10 seconds | Hanamachi General Library | Book "Electric Engineering" | Book "Energy Conservation Methods" | Writing Instruments | | |
| 004 | Longitude 135 degrees, 30 minutes, 30 seconds Latitude 35 degrees, 02 minutes, 10 seconds | Sports Gym Excize | Jersey | Sports Shoes | Towel | Racket | |
| ... | ... | ... | ... | ... | ... | | |

FIG. 64B  Current Carried Items

| Day/Time | Carried Item | | |
|---|---|---|---|
| Wed, May 14 19:20 | Japanese-English Dictionary | English-Japanese Dictionary | ... |
| ... | ... | | |

FIG. 65

| Item ID | Item | Position |
|---------|------|----------|
| 001 | English Textbook Y | Longitude 135 degrees, 34 minutes, 30 seconds Latitude 35 degrees, 30 minutes, 10 seconds |
| 002 | Reference Book B | Longitude 135 degrees, 35 minutes, 30 seconds Latitude 35 degrees, 33 minutes, 10 seconds |
| : | : | : |

FIG. 70

| Date/Time | Position | Facility | Carried Item | | |
|---|---|---|---|---|---|
| Wed, May 14 11:20 | Longitude 135 degrees, 35 minutes, 30 seconds Latitude 35 degrees, 33 minutes, 10 seconds | Home | English Textbook Y | Japanese-English Dictionary | English-Japanese Dictionary |
| Wed, May 14 11:21 | Longitude 135 degrees, 34 minutes, 30 seconds Latitude 35 degrees, 33 minutes, 10 seconds | | English Textbook Y | Japanese-English Dictionary | English-Japanese Dictionary |
| .. | .. | .. | .. | .. | .. |
| Wed, May 14 11:30 | Longitude 135 degrees, 34 minutes, 30 seconds Latitude 35 degrees, 30 minutes, 10 seconds | Yodobashi Cram School | English Textbook Y | Japanese-English Dictionary | English-Japanese Dictionary |
| Wed, May 14 14:00 | Longitude 135 degrees, 35 minutes, 30 seconds Latitude 35 degrees, 36 minutes, 10 seconds | .. | | Japanese-English Dictionary | English-Japanese Dictionary |
| Wed, May 14 14:01 | Longitude 135 degrees, 35 minutes, 30 seconds Latitude 35 degrees, 36 minutes, 10 seconds | .. | | Japanese-English Dictionary | English-Japanese Dictionary |
| .. | .. | .. | .. | .. | .. |

FIG. 72

| Item ID | Item | Position |
|---------|------|----------|
| 001 | English Textbook Y | Longitude 135 degrees, 34 minutes, 30 seconds Latitude 35 degrees, 30 minutes, 10 seconds |
| 002 | Reference Book B | Longitude 135 degrees, 35 minutes, 30 seconds Latitude 35 degrees, 33 minutes, 10 seconds |
| : | : | : |

DESTINATION PREDICTION APPARATUS AND DESTINATION PREDICTION METHOD

CROSS REFERENCE TO RELATED APPLICATION

This is a continuation application of PCT Application No. PCT/JP05/017063 filed on Sep. 15, 2005, designating the United States of America.

BACKGROUND OF THE INVENTION (1) Field of the Invention

The present invention relates to a destination prediction apparatus which predicts a destination of a user, and is particularly applicable to a destination prediction apparatus used in a mobile terminal device.

(2) Description of the Related Art

As a conventional destination prediction apparatus that uses a mobile terminal and predicts a destination of a user, there is, for example, a method which predicts a future destination of the user, as shown in FIG. 1, by accumulating activity of the user in a position log 14 of a communications provider; breaking down the accumulated activity of the user into discrete units of activity; and acquiring a personal activity pattern by modeling the activity of the user as a series of these units of activity (see Patent Reference 1: Japanese Laid-Open Patent Application No. 2000-293540). In this method, an activity history of an individual is detected, so, for example, when the user has moved from intersection A to intersection B, the destination of the user is his/her workplace. In this manner, it is possible to predict the destination of the user.

In addition, there is a method in which starting/stopping an engine is used as a trigger in a car navigation device; a departure area is judged when the engine is started, a target area is judged when the engine is stopped, a history of the departure area and target area is acquired, and the destination is predicted.

SUMMARY OF THE INVENTION

However, activity pattern analysis in the destination prediction method indicated in the abovementioned Patent Reference 1 is carried out based on position information. Accordingly, there are cases where the position information cannot be acquired from a mobile terminal such as a mobile phone when the user is, for example, indoors, and cases arise in which it is impossible to predict the destination of a user based solely on the position information. For example, because a GPS for acquiring the position information of a user's mobile terminal device can only be used outdoors, it is impossible to predict the destination of the user before the position information is acquired by the GPS in the case where the position information is a trigger for predicting the destination of the user.

In addition, in order to predict the destination of the user based on the position information, it is necessary to acquire movement transit information, such as the user's movement route, in a predetermined interval after departure, to a certain degree beforehand. Therefore, it is impossible to predict the user's destination before or at the instant when the user leaves his/her house.

The present invention takes into consideration these conventional problems, and makes predicting the destination easier by using a carried item of the user. That is, an object of the present invention is to provide a destination prediction apparatus in which the destination is easily predictable, using only the carried item which the user carries during his/her daily routine, without requiring the user to input information.

To solve the problems presented by the aforementioned conventional art, a destination prediction apparatus according to the present invention is a destination prediction apparatus which predicts a destination of a user, and includes: a carried item detection unit that detects a carried item which the user carries; an accumulation unit that associates at least the carried item detected by the carried item detection unit with predetermined position information, and accumulates the carried item and the information as a history; a causal relationship extraction unit that extracts, from the history, a causal relationship between at least the carried item and the predetermined position information; and a destination prediction unit that predicts the destination of the user based on the causal relationship and the carried item.

In addition, the destination prediction apparatus further includes a carry frequency judgment unit that performs judgment that distinguishes whether the carried item is a frequently carried item which is carried with a frequency greater than or equal to a predetermined percentage, or an infrequently carried item which is carried with a frequency lower than the predetermined percentage, and the causal relationship extraction unit extracts a causal relationship between the infrequently carried item and the frequently carried item.

Through this configuration, in the destination prediction apparatus, the causal relationship extraction unit uses the position information and the carried item information to extract the causal relationship, and it is thus possible to use this causal relationship to predict the destination of the user. In addition, because the infrequently carried item is judged by the carry frequency judgment unit, it is possible to detect the infrequently carried item that can be used in predicting the destination based on the carried item of the user.

In addition, the frequency carry judgment unit judges the carried item with a percentage lower than the predetermined percentage to be the infrequently carried item, and the carried item with a percentage greater than or equal to the predetermined percentage to be the frequently carried item, using, as the predetermined percentage, a percentage at which the user carries the carried item in each of areas obtained by dividing a travel route of the user on a map. Furthermore, the frequency carry judgment unit judges the carried item with a percentage lower than the predetermined percentage to be the infrequently carried item, and the carried item with a percentage greater than or equal to the predetermined percentage to be the frequently carried item, using, as the predetermined percentage, a percentage at which the carried item is present in each of classes that are obtained by dividing a travel route into the classes. Also, the destination prediction apparatus further includes a target area prediction unit that predicts a target area which is the destination of the user, and the causal relationship extraction unit extracts a causal relationship between the infrequently carried item and the target area.

Through this configuration, the carry frequency judgment unit uses a variety of information to judge the infrequently carried item, such as a frequency in a predetermined length of time, the number of areas on a map when the map is divided into the areas, information based on the classes created by clustering processing, and so on. Therefore, it is possible to extract the infrequently carried item, from among the carried items of the user, to be used as a more accurate trigger for destination prediction.

In addition, the destination prediction apparatus further includes a carried item confirmation unit that confirms a presence/absence of the carried item by using the causal relationship extracted by the causal relationship extraction unit; and a notification unit that notifies the user in the case where the carried item confirmation unit has confirmed that the carried item is absent.

Through this configuration, the presence/absence of the carried item is confirmed by the carried item confirmation unit based on the causal relationship information, and thus it is possible for the destination prediction apparatus to detect lost items and possessions. Note that to achieve the aforementioned goal, the present invention can be realized as a destination prediction method which makes steps of the characteristic structural means of the destination prediction apparatus, and as a program that includes characteristic instructions included in this method. It goes without saying that this program can then be distributed via a storage medium such as a CD-ROM, a communications network such as the Internet, and so on.

With the destination prediction apparatus according to the present invention, it is possible to predict a destination of a user by automatically detecting a carried item, by using, for example, a carried item carried by the user, information attached to the carried item, and so on, without requiring information input on the part of the user.

FURTHER INFORMATION ABOUT TECHNICAL BACKGROUND TO THIS APPLICATION

The disclosures of the following applications including specification, drawings and claims are incorporated herein by reference in their entirety: Japanese Patent Application No. 2004-299949 filed on Oct. 14, 2004; and PCT Application No. PCT/JP05/017063 filed on Sep. 15, 2005.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 4 is a diagram showing a history of carried item information and position information according to the first embodiment of the present invention;

FIG. 5 is a diagram showing an infrequently carried item according to the first embodiment of the present invention;

FIG. 6 is a diagram showing a position causal relationship of the infrequently carried item according to the first embodiment of the present invention;

FIG. 7 is a diagram showing a destination prediction through the position causal relationship according to the first embodiment of the present invention;

FIG. 8 is a diagram showing commercial information based on a position according to the first embodiment of the present invention;

FIG. 21 is a diagram showing a position node conversion table according to the second embodiment of the present invention;

FIG. 22 is a diagram showing a detected carried item according to the second embodiment of the present invention;

FIG. 23 is a diagram showing a history of carried item information and position information according to the second embodiment of the present invention;

FIGS. 24A and 24B are diagrams showing a history of carried item information and position information according to the second embodiment of the present invention;

FIG. 25 is a diagram showing a systemized history of carried item information and position information according to the second embodiment of the present invention;

FIG. 26 is a diagram showing a history of a position and a carried item according to the first embodiment of the present invention;

FIG. 27 is a diagram showing a relationship between a position and a carried item according to the first embodiment of the present invention;

FIG. 33 is a diagram showing a relationship between an extracted carried item and an arrival point according to the second embodiment of the present invention;

FIG. 37 is a table showing one example of a relationship between an infrequently carried item and a target area;

FIG. 38 is a diagram showing a position causal relationship between an infrequently carried item and an arrival point as extracted by a causal relationship extraction unit;

FIG. 40 is an information content table showing a content of facility information stored in the above facility database;

FIG. 41 is an information content table showing a content of facility candidate information which a most-probable facility determination unit is notified of by the above facility candidate searching unit;

FIG. 43 is a diagram showing a specified item extraction from text information according to the third embodiment of the present invention;

FIG. 44 is a diagram showing a facility database according to the third embodiment of the present invention;

FIG. 47 is a diagram showing causal relationship information in the fourth embodiment;

FIG. 49 is a diagram showing a judgment of a specified item in the fourth embodiment;

FIG. 50 is a diagram showing a detected carried item in the fourth embodiment;

FIG. 55 is a diagram showing an analogy dictionary in the fourth embodiment;

FIG. 56 is a diagram showing a detected carried item in the fourth embodiment;

FIG. 57 is a diagram showing causal relationship information in the fourth embodiment;

FIG. 58 is a diagram showing causal relationship information in the fourth embodiment;

FIG. 59 is a diagram showing causal relationship information in the fourth embodiment;

FIG. 61A is a diagram showing causal relationship information in the fifth embodiment, and FIG. 61B is a diagram showing a user's present carried item in the fifth embodiment;

FIG. 64A is a diagram showing causal relationship information in the fifth embodiment, and FIG. 64B is a diagram showing a user's present carried item in the fifth embodiment;

FIG. 65 is a diagram showing a position of a non-carried item in the fifth embodiment;

FIG. 70 is a diagram showing a history of a carried item in the fifth embodiment;

FIG. 72 is a diagram showing a non-carried item database in the fifth embodiment.

DESCRIPTION OF THE PREFERRED EMBODIMENTS

Hereafter, the destination prediction apparatus according to the present invention is described with reference to the diagrams.

First Embodiment

Figure 1:
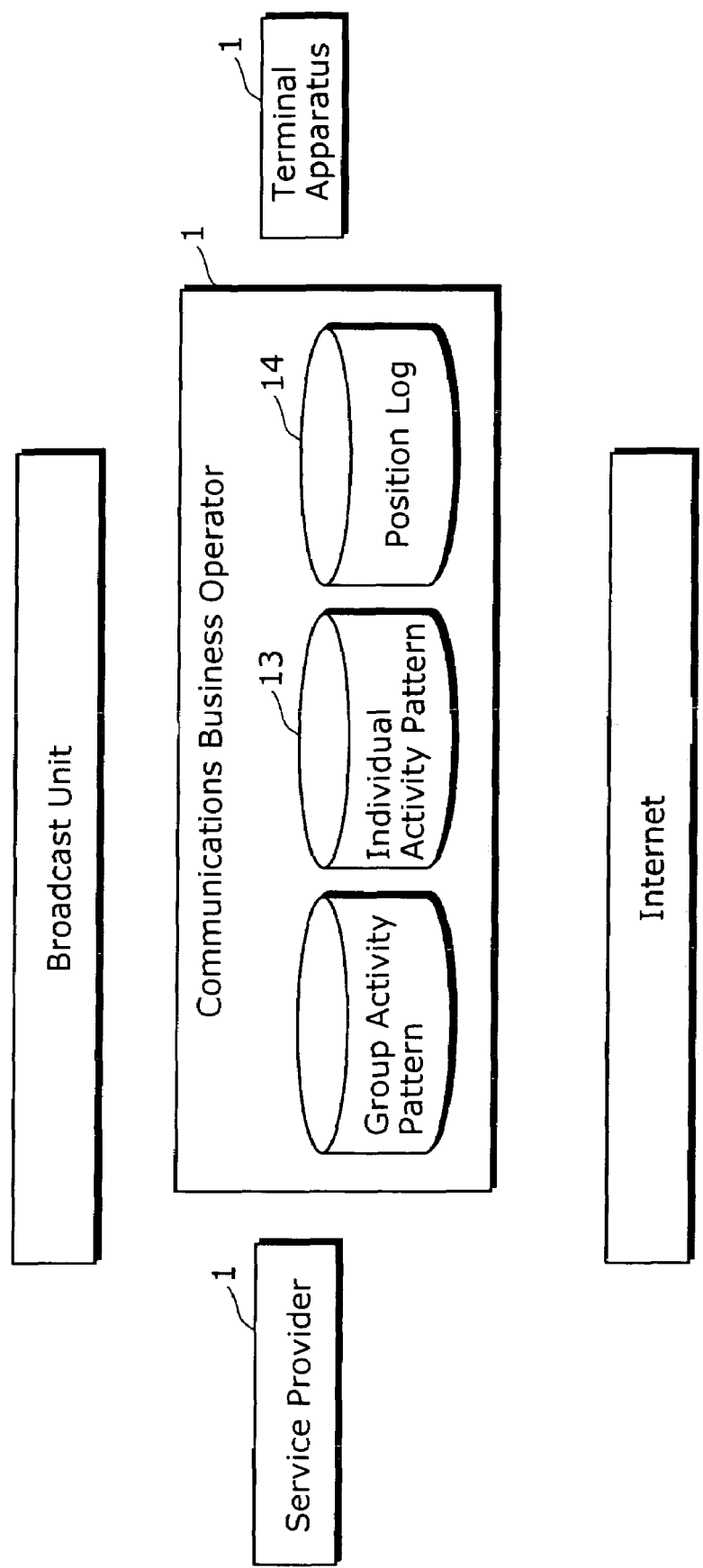
FIG. 1 is a diagram showing an example of a conventional carried item detection apparatus.
Figure 2:
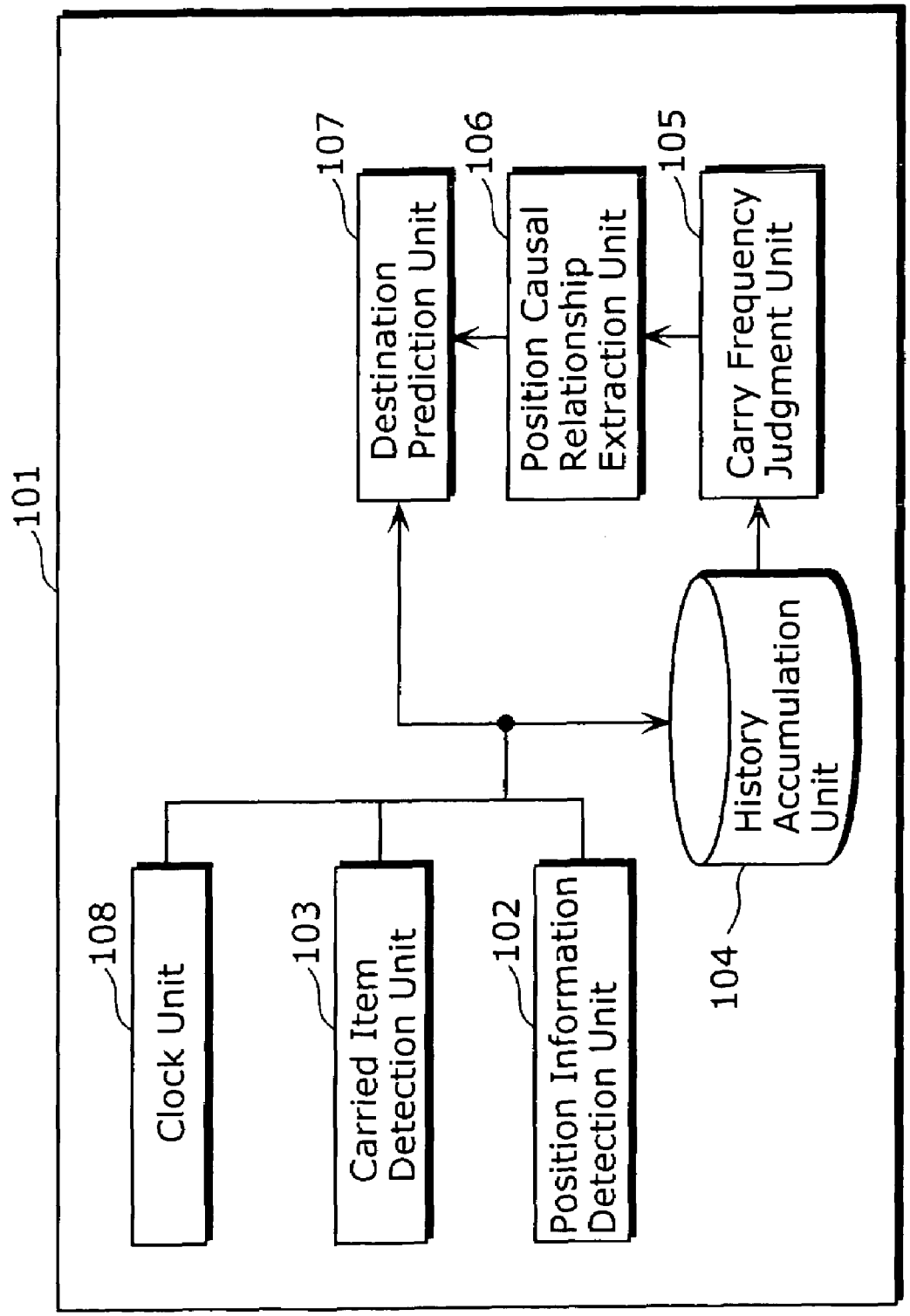
FIG. 2 is a block diagram showing a destination prediction apparatus according to the first embodiment of the present invention.

FIG. 2 is a block diagram showing an overall configuration of the destination prediction apparatus according to the first embodiment of the present invention.

In FIG. 2, a mobile terminal 101, which is the destination prediction apparatus in the present embodiment, is, for example, a cellular phone and the like, and includes: a position information detection unit 102; a carried item detection unit 103; a history accumulation unit 104; a carry frequency judgment unit 105; a position causal relationship extraction unit 106; a destination prediction unit 107; and a clock unit 108. The apparatus predicts a subsequent destination of a user based on a history.

The position information detection unit 102 detects a present position of the mobile terminal 101. The position information detection unit 102 is configured of, for example, a GPS antenna and the like included in the mobile terminal, and detects longitude/latitude information of the user.

The clock unit 108 acquires a present date and time from, for example, a calendar timer, and records this date and time information as a part of history information in the history accumulation unit 104.

The carried item detection unit 103 is configured of an RF reader or the like, and detects an item the user carries (hereafter, carried item). Detection of the carried item involves detecting an RFID within a detection region (for example, within a diameter of 2 R cm), and detecting the obtained ID as the carried item.

Figure 3:
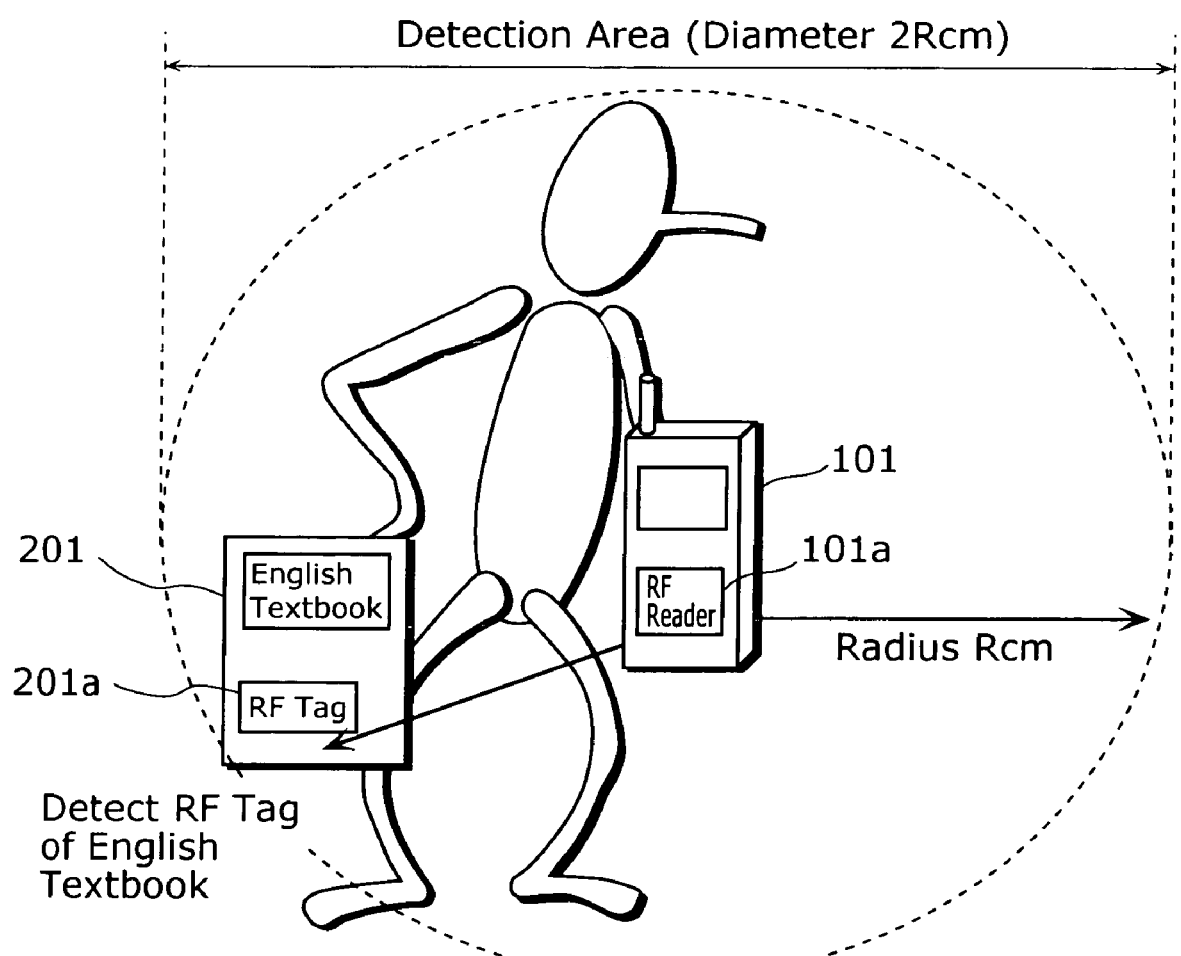
FIG. 3 is a diagram showing a carried item detection according to the first embodiment of the present invention.

FIG. 3 is a descriptive diagram of when a carried item carried by the user is detected by the carried item detection unit 103 of the destination prediction apparatus. The mobile terminal 101 includes RF reader 101a for reading out information regarding the carried item from an RF tag 201 which is attached to the carried item, which is an English textbook 201 and the like. In the case shown in FIG. 3, the carried item detection unit 103 detects the English textbook 201 as the carried item.

The history accumulation unit 104 accumulates the history of the date and time information detected by the clock unit 108, position information detected by the position information detection unit 102, and information of the carried item of the user as detected by the carried item information detection unit 103. Hereafter, these pieces of information are collectively called a carried item movement history.

FIG. 4 shows the carried item movement history accumulated in the history accumulation unit 104. The date and time information, position information, and carried item information are automatically detected when, for example, the user is in transit; in addition, an acquisition interval is, for example, every one minute, and the carried item movement history is automatically accumulated in the history accumulation unit 104.

It can be seen from the carried item movement history shown in FIG. 4 that on "May 14, 19:20" the user moved, in order, from a position "N 35.00, E 135.00" to "N 35.01, E 135.00" while carrying a "wallet," a "watch," and an "English textbook."

Note that the acquisition of the carried item movement history may be automatic, or may be carried out through user operation. In addition, the acquisition interval may be constant, or may be controlled according to the position and carried item. For example, having a narrow acquisition interval in the case where an item that is frequently carried during movement is being carried, and so on, it is possible to acquire a more detailed history by controlling the interval depending on the carried item.

Next, the carry frequency judgment unit 105 shown in FIG. 2 calculates a frequency at which the carried item is carried based on the carried item movement history, and judges whether the item is a "frequently carried item" or an "infrequently carried item." Note that in the description in the present embodiment, an item with a high carry frequency and which is carried in a variety of movement routes and positions is defined as a "frequently carried item." On the other hand, an item with a low carry frequency and which is carried in a certain position and so on is defined as an "infrequently carried item."

In the destination prediction apparatus according to the present invention, this infrequently carried item is very important for isolating the destination. That is, items such as the wallet, which the user generally carries on a daily basis, have a high carry frequency, and are carried during all kinds of movement. On the other hand, items such as the English textbook, which are carried for use at a specific target area, have a low carry frequency, but are frequently carried in a certain movement. Therefore, it is possible to predict and calculate the destination of the user by extracting the infrequently carried item from a relationship between the movement and the carried item. Hereafter, descriptions are given using FIGS. 4, 5, and 6.

FIG. 4 is a table showing a relationship between the date and time, position, and carried item, in the destination prediction apparatus according to the present first embodiment.

In FIG. 4, "watch" and "wallet" are items the user is always carrying, and as they appear frequently in the history, the carry frequency judgment unit 105 judges that they are frequently carried items. However, "English textbook" and "jersey" have a comparatively low carry frequency, and are thus judged to be infrequently carried items. Note that the judgment between the frequently carried item and the infrequently carried item is carried out by setting a threshold value for a number of times the item appears in the history. For example, in the present first embodiment, when a certain carried item is being carried in the history that is acquired every one minute, the carry number is one time. For example, the carried items for May 14, 19:20 are "wallet," "watch," and "English textbook," and the carry number of each is 1 time. Next, the carried items for 19:21 are also "wallet," "watch," and "English textbook," so by adding 1, the carry number for each becomes 2 times. Therefore, when calculating up until, for example, May 14, 19:52, the wallet is "33 times," the watch is "33 times," and the English textbook is "33 times." Next, the carried items for May 15, 19:20 are "wallet," "watch," and "jersey," so the wallet is "34 times," the watch is "34 times," and the jersey is "1 time." In FIG. 4, when the history has a total of 100 times, the wallet is "100 times," the watch is "100 times," the English textbook is "33 times," and the jersey is "38 times." Here, a carry percentage (%) is, for example, the carry number divided by the history total, and when this percentage is calculated, the wallet is 100%, the watch is 100%, and English textbook is 33%, and the jersey is 38%. Then, when the threshold value for judging an infrequently carried item is set at a carry percentage of greater than or equal to 10% and less than or equal to 60%, the carry frequency judgment unit 105 judges the "English textbook" and "jersey" to be infrequently carried items, and the "watch" and "wallet," which have respective carry percentages of over 60%, to be frequently carried items.

FIG. 5 is a table for describing the infrequently carried item, and in this diagram, "wallet" and "watch," which are calculated as frequently carried items, are indicated by hatched lines, and "English textbook" and "jersey," which are circled, are calculated as infrequently carried items.

In addition, as shown in FIG. 2, the causal relationship extraction unit 106 calculates a position related to the aforementioned infrequently carried item (hereafter defined as a position causal relationship). For example, the position causal relationship in the present embodiment is the carried item movement history that includes the infrequently carried item "English textbook" extracted as-is.

FIG. 6 is a table indicating the extracted position causal relationship. In FIG. 6, for example, the relationship between the date and time and position when the "English textbook" is carried and the carried item "English textbook," this relationship being a result of a characteristic of the user's movement as extracted from the position causal relationship, is indicated; for example, the user is in a position "N35.00, E135.00" at 19:20, and is in a position "N35.01, E135.00" at 19:21.

The destination prediction unit 107 predicts the destination using the position detected by the position information detection unit 102, the carried item detected by the carried item information detection unit 103, and the position causal relationship extracted by the causal relationship extraction unit 106.

Here, a prediction task of the destination prediction unit 107 is, for example, "a position of the user 30 minutes from the present time." The prediction task is a condition for the destination prediction unit 107 to predict the destination, and a trigger for executing the prediction task is, for example, "execution trigger is the user going outdoors"; judgment of whether or not the user has gone outdoors is, for example, carried out by judging "whether or not GPS position acquisition has been started."

In the mobile terminal 101 according to the present first embodiment, which is, for example, a cellular phone, it is furthermore possible to provide commercial information regarding the predicted position. For example, the user departs his/her home at 18:52. At this time, the user is carrying the "English textbook." Then, with the start of position acquisition by the GPS used as a trigger, the destination prediction unit 107 calculates the case in which the "English textbook" is being carried at 19:22, or 30 minutes later, which is the prediction task, from the position causal relationship. Then, it is possible to display, in a screen, commercial information such as English school class information, teacher information, information of a train route to the English school, weather information, and so on, as a result.

Note that, as shown in FIG. 7, a method for the destination prediction unit 107 to predict the destination from the position causal relationship is, for example, extracting the position that corresponds to a prediction time, and in the case of multiple extractions, finding an average of those positions. In this case, the time in which destination prediction is carried out is the aforementioned 19:22, and therefore corresponds to three dates: the 14th, the 21st, and the 28th. Accordingly, by finding the average of the position of these 3 times, a position "N35.02, E135.00" is obtained.

Therefore, the commercial information according to the position "N35.03, E135.00" obtained next is provided. The mobile terminal 101 acquires the commercial information, according to the position, from a commercial information server in which the information is stored, for example.

FIG. 8 is a table showing an example of information recorded in the commercial information server; information, which is provided according to the position, is stored. For example, the information provided in the position "N35.02, E135.00" is "CD Shop Information," and information such as "Accepting reservations for Mai Kuramoto's new album" is displayed on the screen of the mobile terminal.

Note that in the present embodiment, providing the commercial information to the mobile terminal according to the position is setting, for a predicted position (in this case, "N35.02, E135.00"), a unique piece of information ("N35.02, E135.00" is "CD shop information"). However, the embodiment is not limited to this. For example, it is acceptable to provide commercial information regarding an area on a map divided into a mesh shape which includes the obtained position, and it is acceptable to acquire commercial information from within a 50-meter radius centered on the obtained position. In addition, filtering the acquired commercial information in accordance with the carried item can also be considered.

Note that many technologies have been disclosed as conventional methods for providing information based on the predicted destination, but no particular preference is made here.

Note that in the present embodiment, only the frequency is considered when judging an infrequently carried item, but the embodiment is not limited to this. It is also acceptable to judge considering the history of positions in which the carried item has been detected (carried item movement history).

Figure 9:
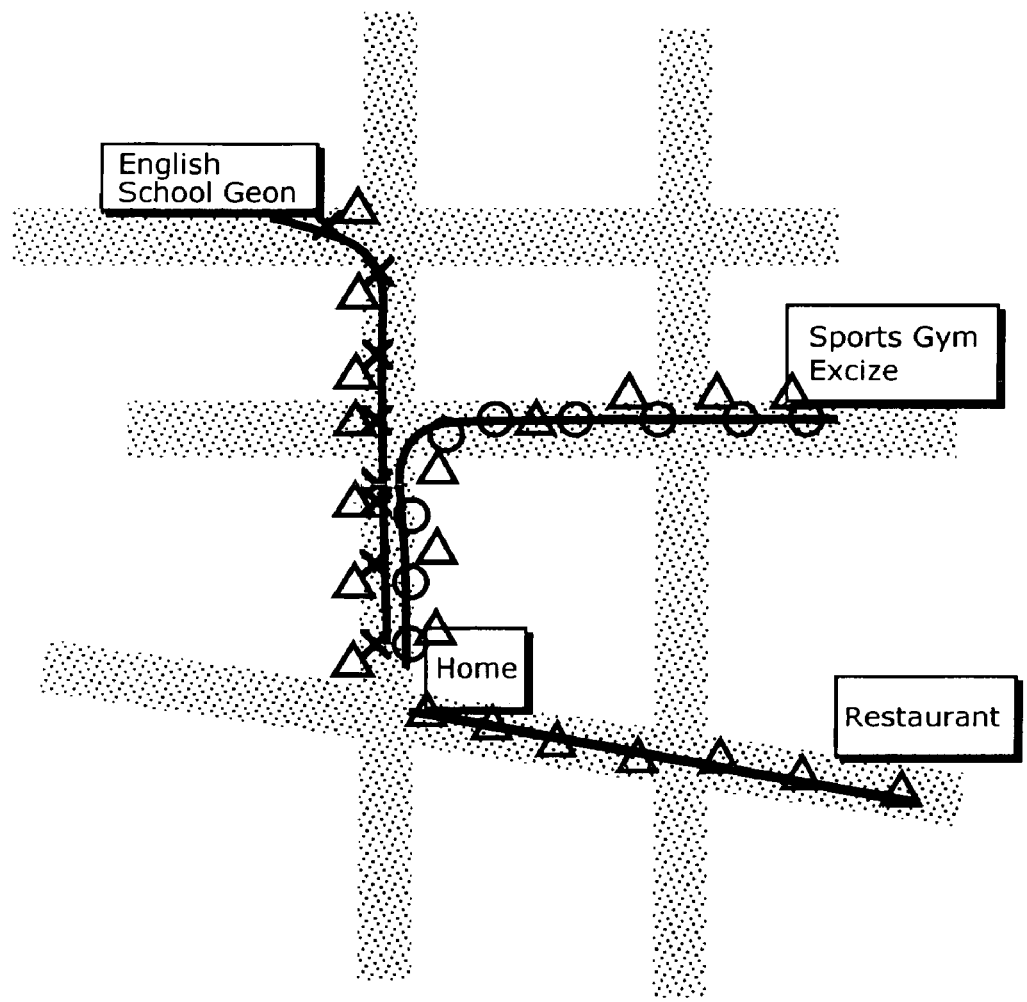
FIG. 9 is a diagram showing a relationship between a position and a carried item according to the first embodiment of the present invention.
Figure 10:
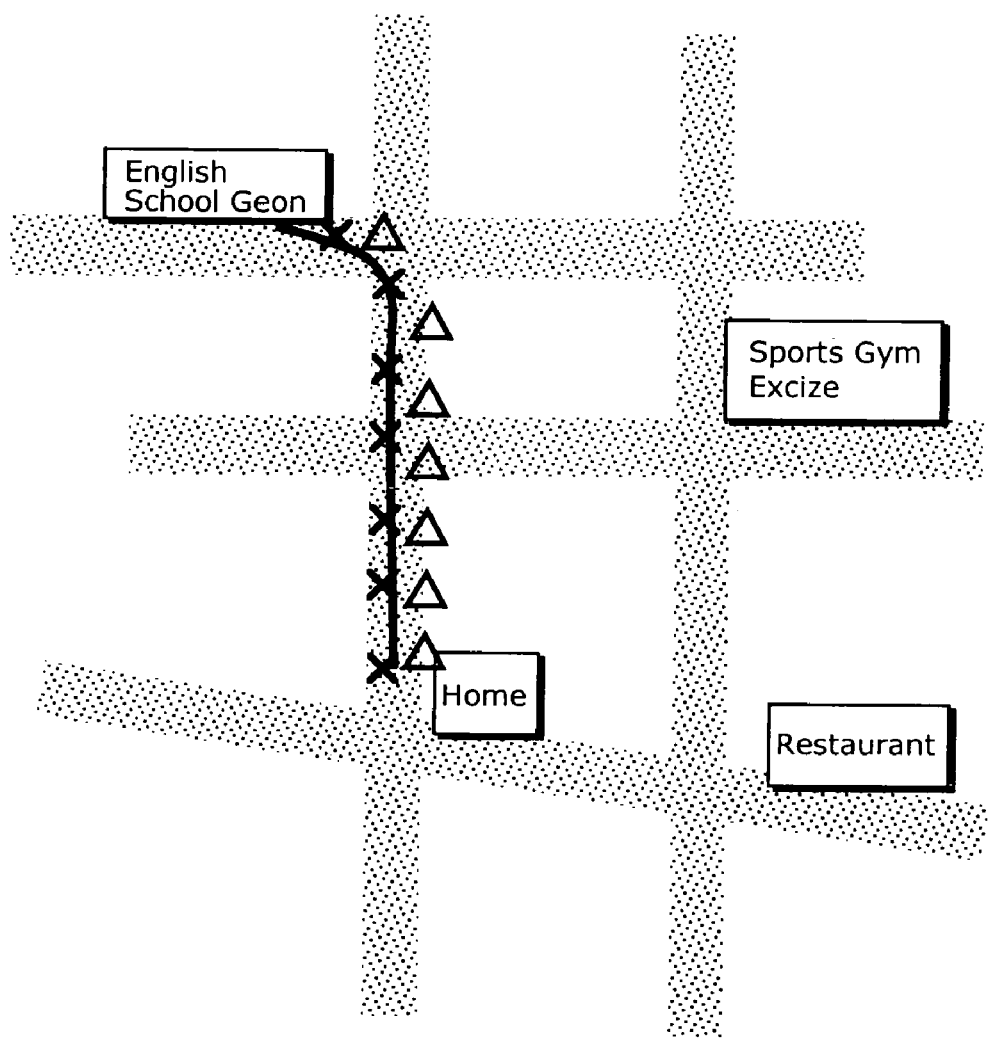
FIG. 10 is a diagram showing a relationship between a position and a carried item according to the first embodiment of the present invention.
Figure 11:
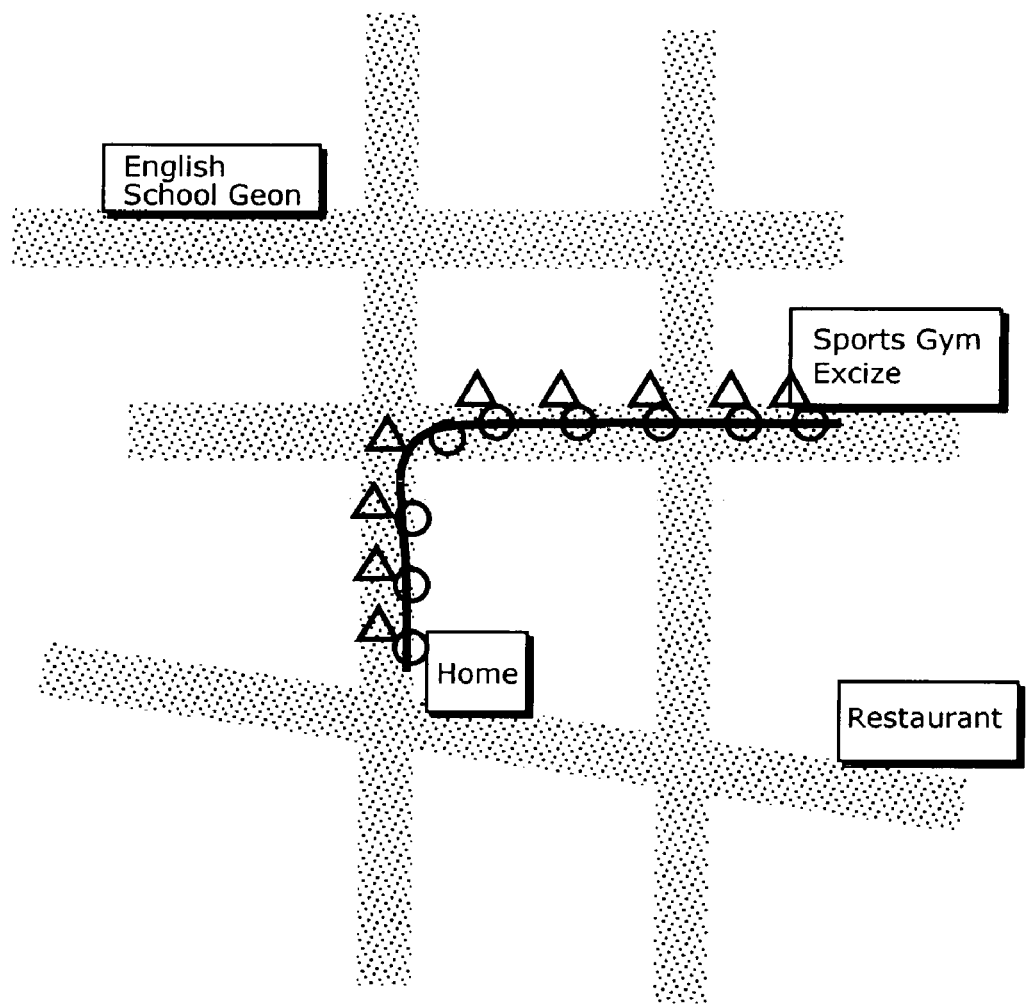
FIG. 11 is a diagram showing a relationship between a position and a carried item according to the first embodiment of the present invention.

Next, a relationship between the carried item movement history and the infrequently carried item is described using FIGS. 9, 10, and 11. Then, a method for judging the infrequently carried item is described.

FIG. 9 is a reference diagram expressing, on a map, the carried item movement history shown in FIG. 4, or in other words, a relationship between the position information and the carried item information. In FIG. 9, the position information for when the "English textbook" is carried is expressed as an "x"; the "jersey," as a "circle"; and the "wallet," as a "triangle" (here, the "watch" is omitted). From FIG. 9, it can be understood that the frequently carried item "wallet" appears with high frequency in all positions on the map.

In addition, with the carried item movement history in which the infrequently carried item "English textbook" is carried, as shown in FIG. 10, and with the carried item movement history in which the infrequently carried item "jersey" is carried, as shown in FIG. 11, it can be seen that the frequency is low, and the positions in the history are comparatively grouped together.

Note that there are cases in which prediction is possible with the carried item information, without using the judgment between frequently and infrequently carried items. For example, there are cases in which prediction is possible by simply using the carried item information of the user; for example, when carrying the "wallet" at 20:00 in "N35.00, E135.00," the user is approaching a "restaurant." However, movement in which the "wallet" is carried is not limited to the "restaurant." For example, movement towards "English School Geon" and movement towards "Sports Gym Excize" may also occur. That is, it is preferable to use the infrequently carried items when considering the accuracy of the destination prediction.

Accordingly, the present invention carries out prediction using the causal relationship based on these infrequently carried items, in the destination prediction task.

Hereafter, another method of judging the infrequently carried item, which takes into consideration the positions of the aforementioned carried item movement history, is described. Judgment of the infrequently carried item, which is an item carried during a predetermined movement, can also be carried out through variance in the carried item movement history. Hereafter, descriptions are given using FIGS. 12, 13, 14, and 15.

Figure 12:
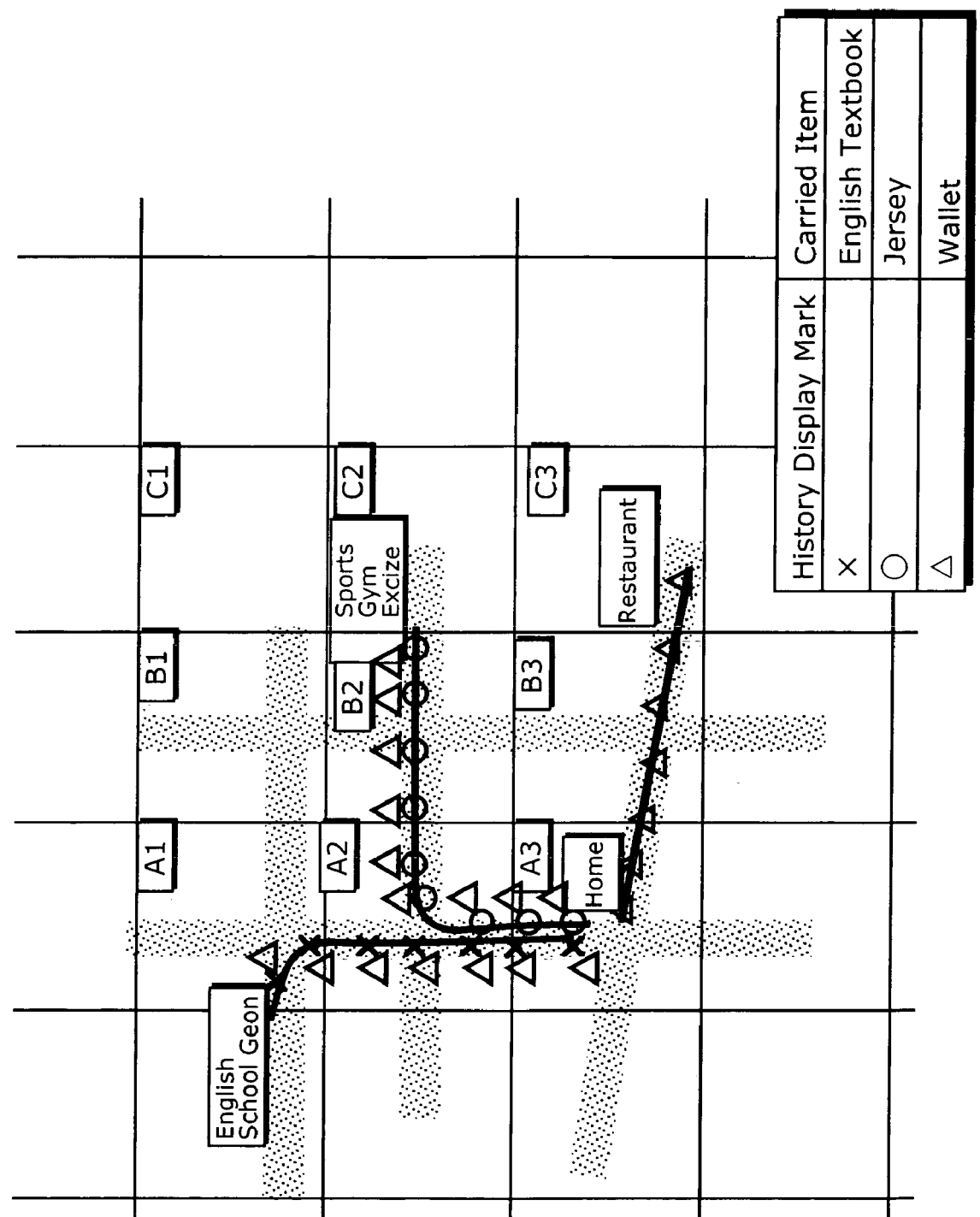
FIG. 12 is a diagram showing a relationship between an area and a carried item according to the first embodiment of the present invention.

FIG. 12 shows, with symbols, the items and positions of the carried items in the carried item movement history in the same manner as FIG. 7, and furthermore, the map has been divided into a mesh shape. The vertical is indicated by numbers 1, 2, and 3, and the horizontal is indicated by the letters A, B, and C.

Figure 13:
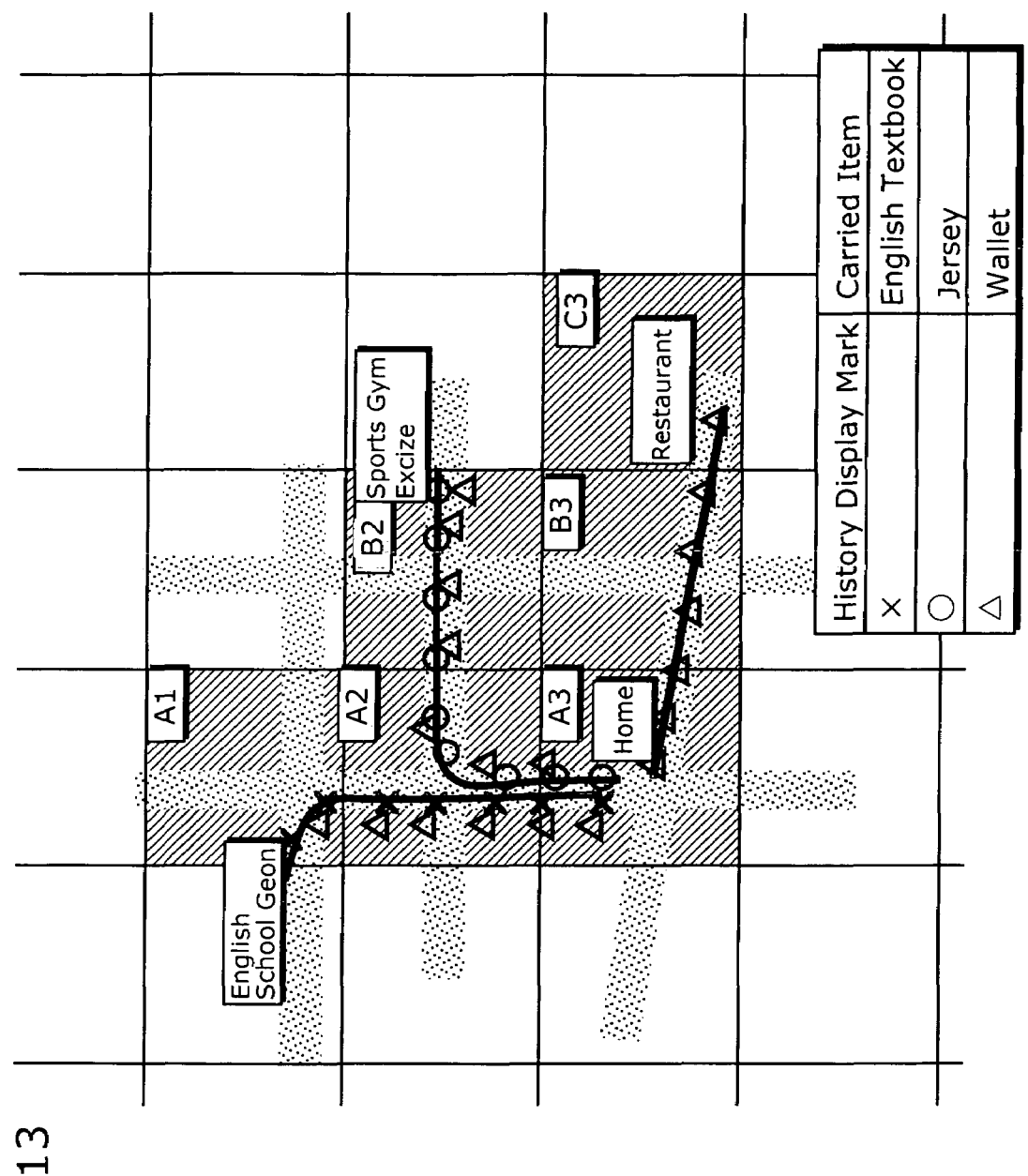
FIG. 13 is a diagram showing a relationship between an area and a carried item according to the first embodiment of the present invention.
Figure 14:
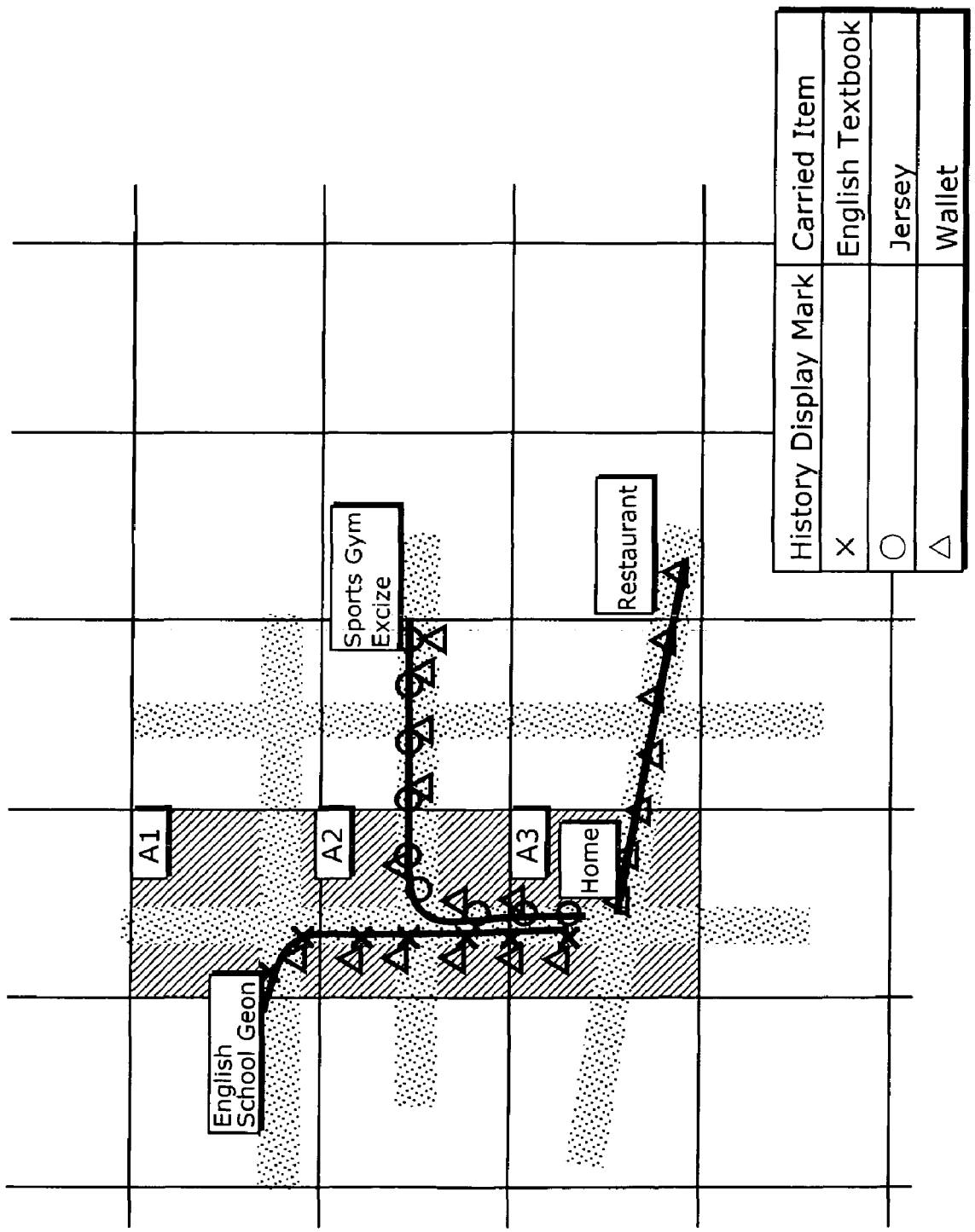
FIG. 14 is a diagram showing a relationship between an area and a carried item according to the first embodiment of the present invention.
Figure 15:
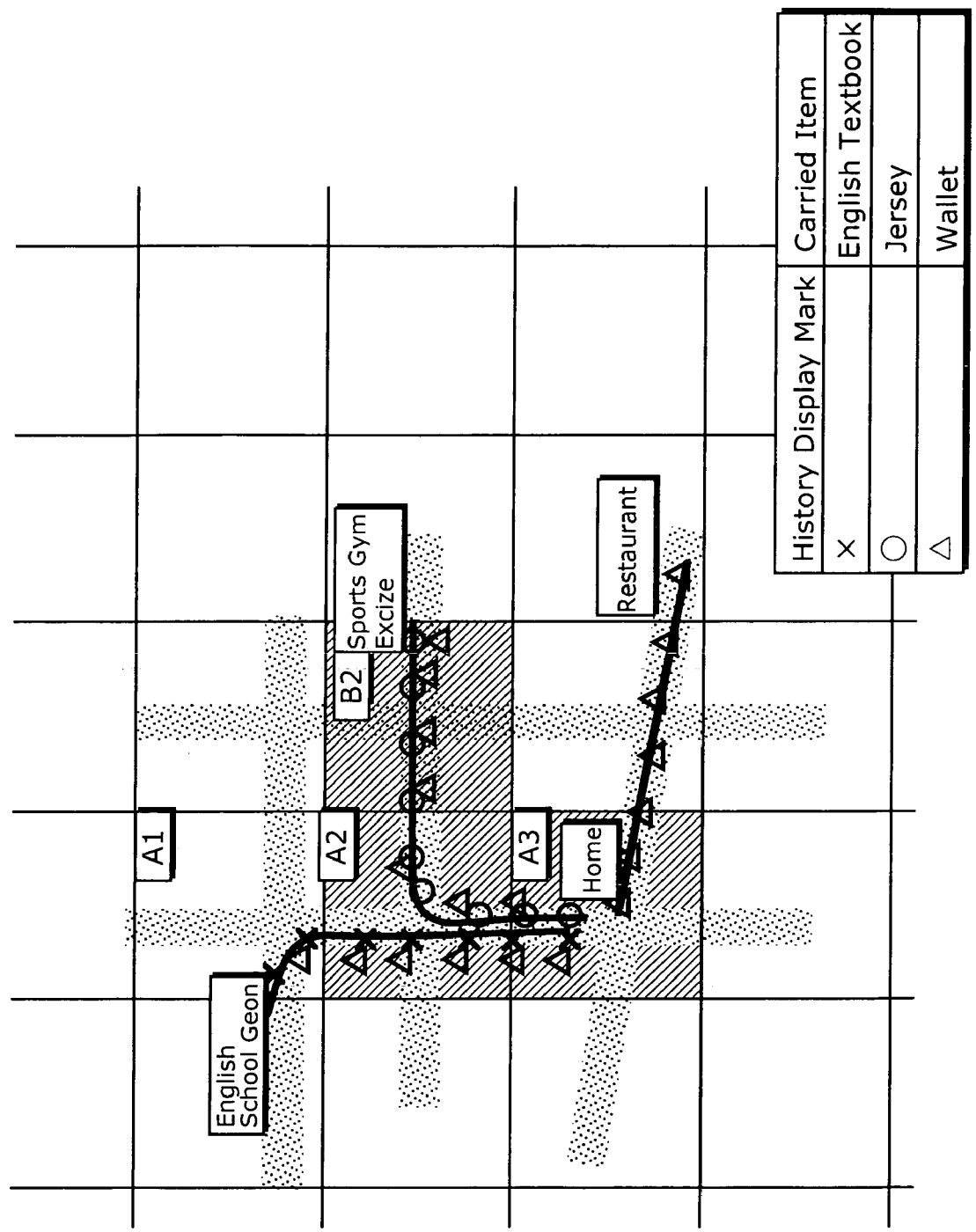
FIG. 15 is a diagram showing a relationship between an area and a carried item according to the first embodiment of the present invention.

FIG. 13 is a reference diagram for describing the carry percentage of the carried item, in which the map has been divided into a mesh shape. In FIG. 13, areas in which the "wallet" exists are indicated by hatched lines, and thus it can be seen that the "wallet" appears in areas "A1 to A3," "B2," "B3," and "C3." On the other hand, in FIG. 14, areas in which the English textbook is carried are indicated by hatched lines, and from FIG. 14, it can be seen that the areas in which the "English textbook" appears are limited to the areas "A1 to A3." In addition, in FIG. 15, areas in which the "jersey" is carried are indicated by hatched lines, and from FIG. 15, it can be seen that the areas in which the "jersey" appears are limited to "A2," "A3," and "B2."

Here, when a percentage of the areas in which the specific carried items exists is calculated against the entire area for which the carried item movement history exists, the wallet is 100% (6÷6), the English textbook is 50% (3÷6), and the jersey is 50% (3÷6). Therefore, when the threshold value for judging an infrequently carried item is greater than or equal to 10% and less than or equal to 60%, the carry frequency judgment unit 105 judges the "English textbook" and the "jersey" as infrequently carried items.

In this manner, the carry frequency judgment unit 105 uses the position information of the carried item movement history in addition to the frequency divided per time, and by dividing the map into a mesh and judging the percentage of the number of areas in which the carried item is carried, can judge between the frequently carried item, which the user always carries, and an infrequently carried item, which is appropriate for destination prediction.

Or, as another method for judging an infrequently carried item, the carry frequency judgment unit 105 may execute clustering of the position information using the K-means method, the FCM method, and so on, to judge between frequently/infrequently carried items.

Figure 16:
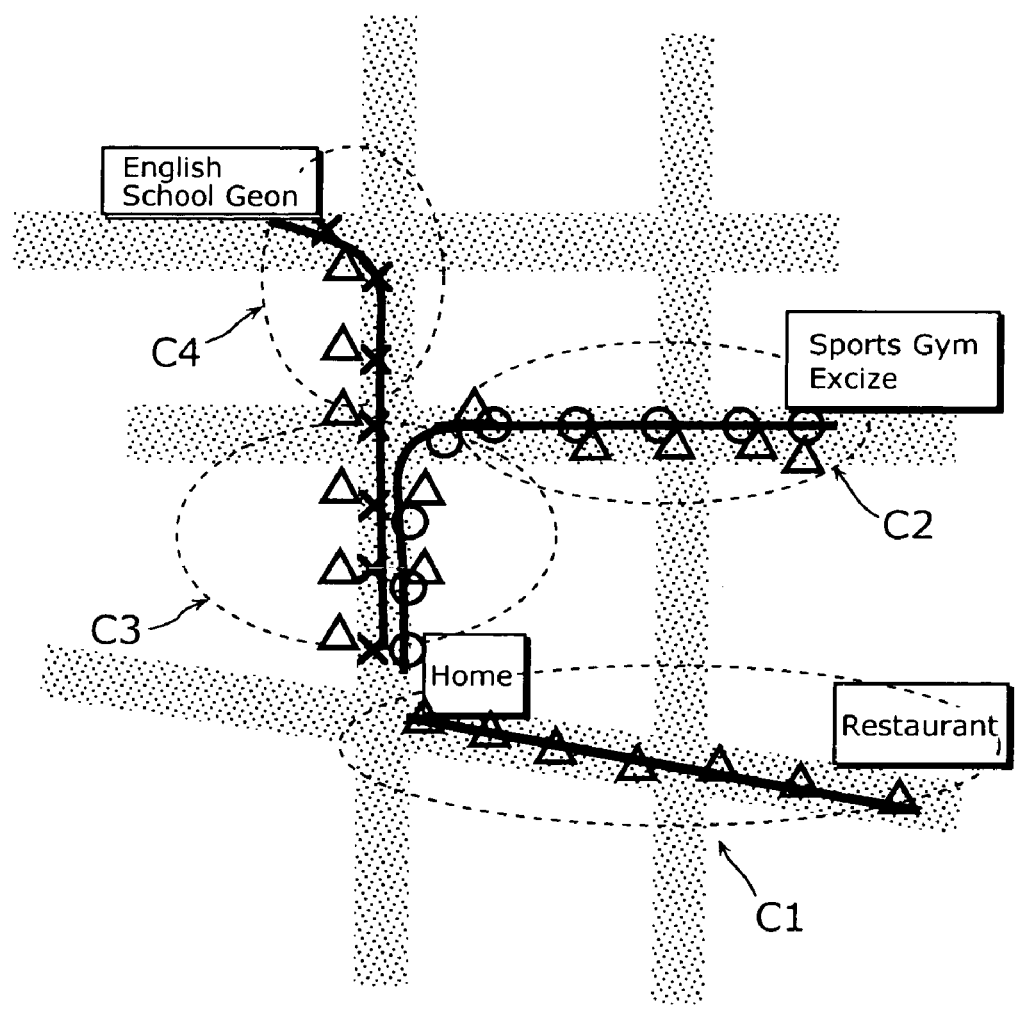
FIG. 16 is a diagram showing a relationship between an area and a carried item according to the first embodiment of the present invention.

FIG. 16 is a reference diagram which displays, as symbols on a map, the relationship of the carried item movement history with the carried item and position, in the same manner as FIG. 13. First, when clustering unrelated to the carried item is carried out on the position information of the carried item movement history, it is possible to automatically divide the information into several classes based on the position, as shown in FIG. 16. In FIG. 16, division into four classes, from class 1 (C1) to class 4 (C4), is possible.

Next, when looking at the relationship of carried items belonging to each class, it can be seen that the "wallet" belongs to all classes; or, in other words, the "wallet" is carried in all instances of movement. Accordingly, the carry frequency judgment unit 105 sets, for example, a threshold value, and judges carried items belonging to a class greater than or equal to the threshold value as frequently carried items. On the other hand, the classes the "English textbook" belongs to are limited to C3 and C4 only, and the classes the "jersey" belongs to are limited to C2 and C3 only, and are thus considered items carried only during specific instances of movement, hence infrequently carried items. The destination prediction apparatus according to the present invention predicts the destination by using the infrequently carried items.

Note that judgment between the frequently carried item and the infrequently carried item is not limited to this; any method is acceptable as long as extraction occurs with emphasis on the frequency, the position, and so on. Or, it may be set by the user him/herself.

In addition, when the user carries an infrequently carried item, there are many cases in which the movement areas are comparatively grouped. For example, as shown in FIG. 14, it can be predicted that the areas in which movement occurs are at least "A1 to A3" in the case where the "English textbook" is carried. Or, in the case where the "English textbook" is carried, it is possible to predict class 3 and class 4, as shown in FIG. 16.

In addition, the prediction task can predict movement in the movement prediction area in at least areas "A1 to A3" as shown in FIG. 14 or classes C3 and C4 as shown in FIG. 16, in the case where the "English textbook" is carried, regardless of the time; it is also possible to provide the commercial information for that area.

Furthermore, the prediction task of the destination prediction apparatus according to the present first embodiment is "the position of the user 30 minutes from the present time," but the embodiment is not limited to this; it is possible to carry out a variety of prediction tasks, such as "the position of the user at 19:30" and so on.

In addition, as a conventional method for predicting the target area of the user, a method is disclosed in which, for example, a past movement history of the user is accumulated, and in the case where the accumulated movement history and the present movement are the same, the target area in the past movement history is the predicted target area. However, in the conventional method, movement of a certain amount of time is necessary in order to judge whether or not the past movement history is the same as the present movement. Therefore, it is impossible to predict the future destination of the user where the position information cannot be acquired, such as indoors. In addition, in order to predict the destination of the user, a predetermined time of movement is necessary, and therefore prediction at the moment the user leaves his/her house is impossible.

On the other hand, with the present invention, a specific position (the position causal relationship, in the present invention), occurring when a specific carried item (the infrequently carried item, in the present invention) is carried, is extracted from the carried item movement history stored in the history accumulation unit 104. Therefore, predicting the destination in a variety of prediction tasks is possible as long as carrying of the infrequently carried item can be detected.

For example, even in the case where the position information cannot be detected, it is possible to calculate the aforementioned area or class as a predicted destination the instant the infrequently carried item is carried. In addition, by using the time information, it is possible to detect the position of the user in an arbitrary time when the user carries an infrequently carried item.

Figure 17:
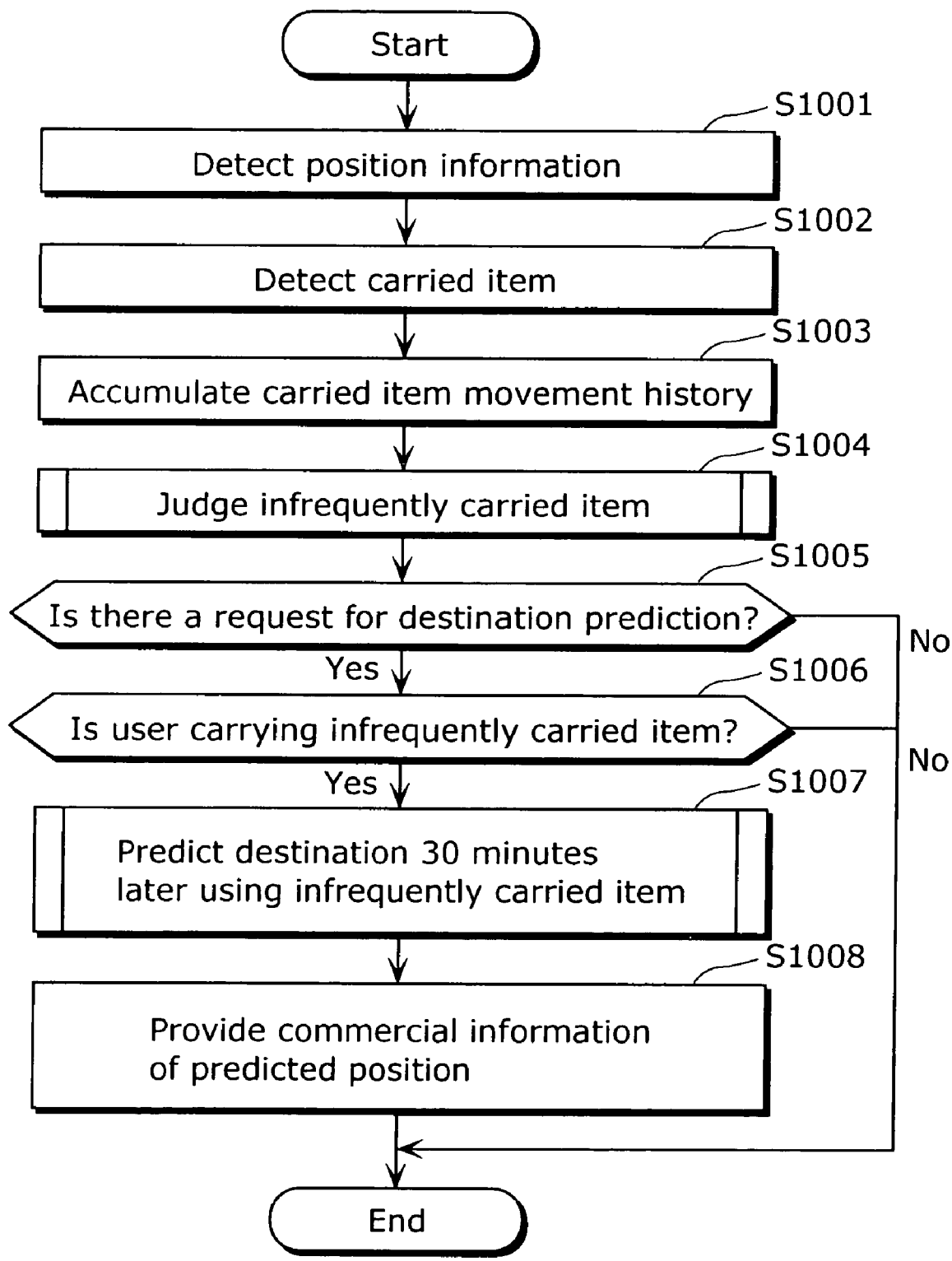
FIG. 17 is an operation flowchart according to the first embodiment of the present invention.
Figure 18:
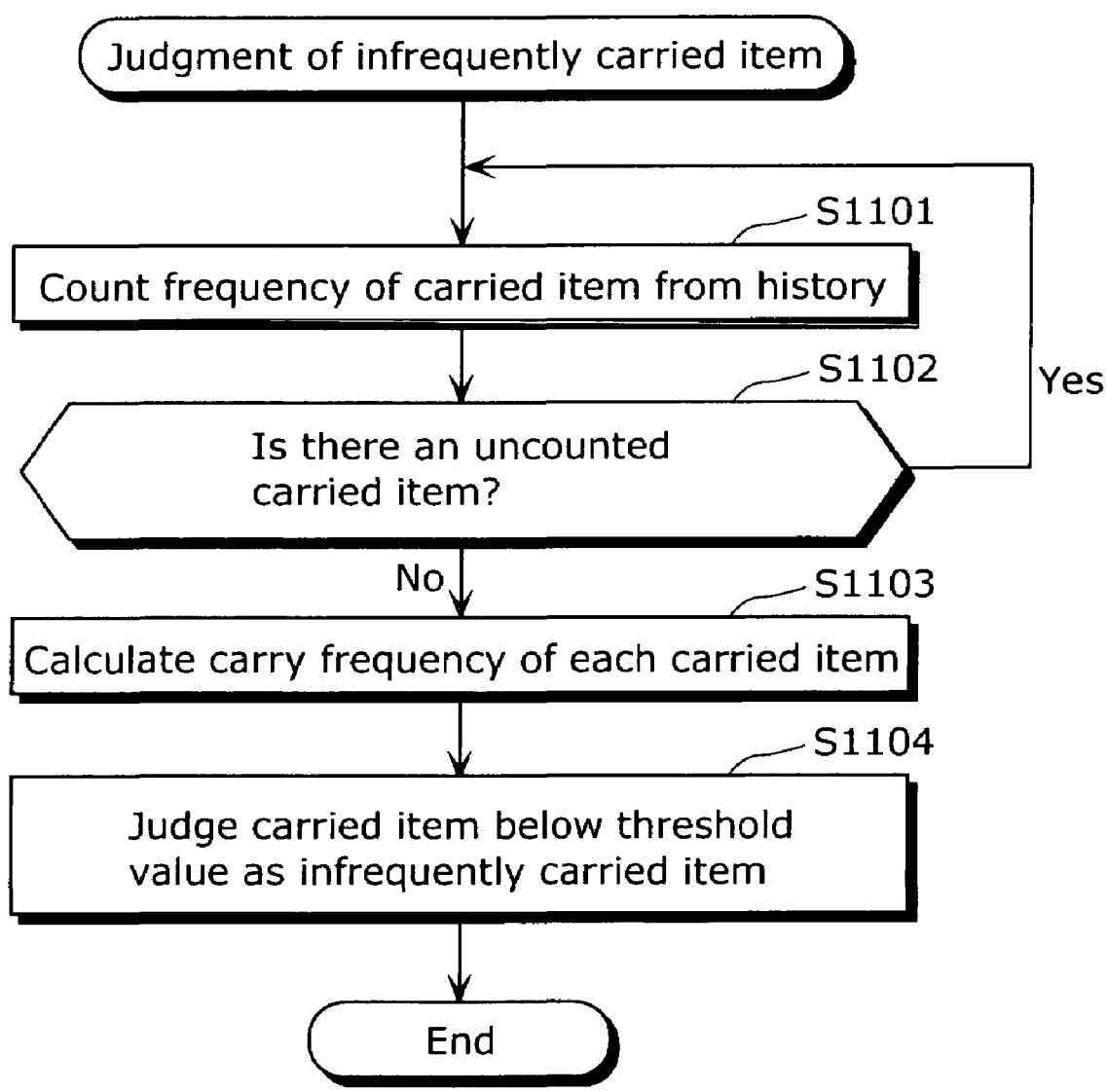
FIG. 18 is an operation flowchart according to the first embodiment of the present invention.
Figure 19:
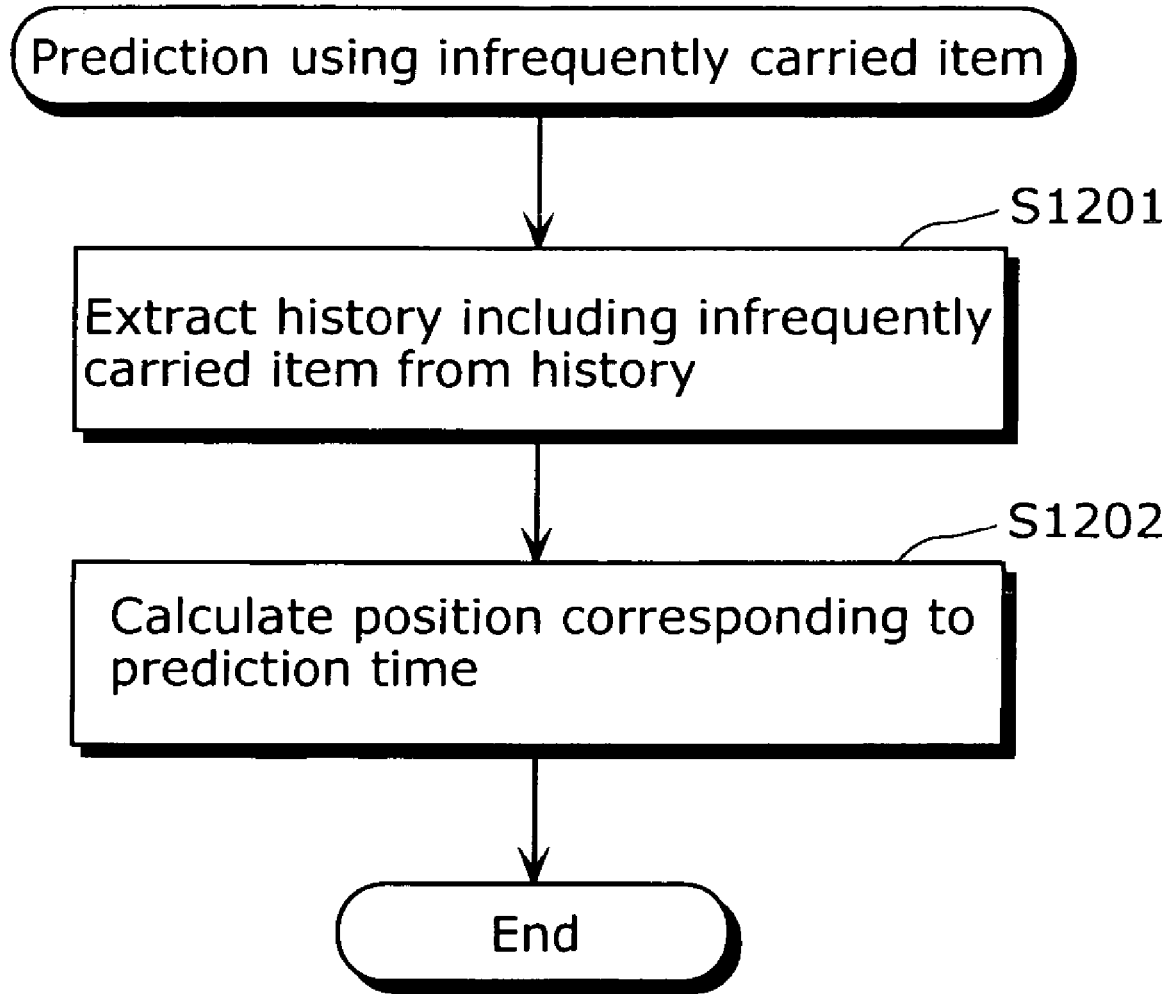
FIG. 19 is an operation flowchart according to the first embodiment of the present invention.

Next, a description of the process of the present destination prediction apparatus configured from the abovementioned processing units is given using the flowcharts shown in FIGS. 17, 18, and 19.

FIG. 17 is a flowchart showing an overall process order of the destination prediction apparatus according to the present embodiment.

First, the position information detection unit detects the position of the user (S1001). At the same time, the carried item information detection unit 103 detects the carried item of the user (S1002). A detection range is, as shown in, for example, FIG. 3, within a radius of 2 Rcm of the user, and the carried item is detected by reading a tag attached to the item. In the case of FIG. 3, it is judged that the "English textbook 201" is being carried.

The detected position information and the carried item information are accumulated by the history accumulation unit 104 (S1003). FIG. 4 shows an example of the accumulated information.

On the other hand, the infrequently carried item is detected from the carried item movement history accumulated in the history accumulation unit 104 (S1004). Judgment of the carry frequency by the carry frequency judgment unit 105 is carried out by, for example, setting a threshold value and judging from the frequency in the history.

FIG. 18 shows an order of processing in the frequency judgment executed by the carry frequency judgment unit 105.

First, the frequency of each carried item is counted from the history (S1101). For example, in the history in FIG. 4, the carried items on May 14, 19:20 are "wallet," "watch," and "English textbook," and each carry number is 1 time.

This processing is repeated until all carried items in each history are counted (S1101 to S1102). In FIG. 4, the carried items at the next time of 19:21 are, similarly, "wallet," "watch," and "English textbook," so by adding 1, each carry number becomes 2 times. For example, when calculation is carried out until May 14, 1952, the wallet is "33 times," the watch is "33 times," and the English textbook is "33 times." Next, the carried items at "May 15, 19:20" are "wallet," "watch," and "jersey," and thus the wallet is "34 times," the watch is "34 times," and the jersey is "1 time." When the total of the history in FIG. 4 is 100 times, the wallet is "100 times," the watch is "100 times," the English textbook is "33 times," and the jersey is "38 times." Here, when the carry frequency is calculated as, for example, a percentage (for example, carry times÷history total (%)), the wallet is 100%, the watch is 100%, the English textbook is 33%, and the jersey is 38% (S1103).

When the threshold value for judging the infrequently carried item is a percentage greater than or equal to 10% and less than or equal to 60%, the carry frequency judgment unit 105 judges that, in the case indicated by FIG. 4, the "English textbook" and "jersey" are judged as infrequently carried items.

The infrequently carried item is, as mentioned earlier, calculated by the carry frequency judgment unit 105 from the carried item movement history accumulated in the history accumulation unit 104. In this case, as shown in FIG. 5, the "wallet" and "watch," which are carried frequently, are judged to be frequently carried items, and the "English textbook" and "jersey" are judged to be infrequently carried items.

Next, the destination prediction unit 107 detects the presence/absence of a destination prediction request from a system with a specific timing via input and the like by the user (S1005). In the present embodiment, the prediction task is "predict the position 30 minutes from the present time," and is carried out with the user leaving his/her home as a trigger. In addition, whether or not the user has left his/her home is judged by whether position information acquisition by the GPS and the like has been started or not.

Next, in the case where there is the destination prediction request (Yes of S1005), the carry frequency judgment unit 105 judges whether or not the user is carrying an infrequently carried item (S1006).

However, in the case where the user carries the English textbook in S1002, or the "English textbook" is judged as an infrequently carried item in S1004, the user is carrying an infrequently carried item (Yes of S1006), and, using the infrequently carried item "English textbook," the destination 30 minutes from the present time is predicted by the destination prediction unit 107 (S1007).

This description of the process order in which destination prediction is executed by the destination prediction unit 107 is carried out with reference to FIG. 19, but first, the history of when the "English textbook" is carried is extracted from the carried item movement history accumulated in the history accumulation unit 104 (S1201). Then, as shown in FIG. 6, the position corresponding to the prediction time is calculated from the extracted position causal relationship (S1202). For example, when the present time is 18:52, the prediction time is 19:22, or 30 minutes later. Accordingly, when the value positioned at 19:22 is extracted from the position causal relationship shown in FIG. 6, 3 times, or the 14th, the 21st, and the 28th, are extracted. When the average of the position of these 3 times is found, the position "N35.02, E135.00" is obtained as the predicted position.

Next, the mobile terminal 101 provides the commercial information on the screen in accordance with the obtained position (S1008). Providing the commercial information is carried out by acquiring information according to the position from, for example, the commercial information server which has stored the commercial information. Note that FIG. 8 is a table showing one example of information recorded in the commercial information server.

As described above, with the mobile terminal 101 according to the present first embodiment, the carried item of the user is detected by the carried item detection unit 103, and judgment of whether the carried item is a frequently carried item or an infrequently carried item is carried out by the carry frequency judgment unit 105; in the case where an infrequently carried item is being carried, the position causal relationship extraction unit 106 extracts the causal relationship, and the destination prediction unit 107 can use the information of the infrequently carried item and the position causal relationship to carry out prediction of the user's destination in accordance with the prediction task.

Second Embodiment

Next, a destination prediction apparatus according to the second embodiment of the present invention is described with reference to the diagrams. Note that in the abovementioned first embodiment, a method, in which a destination of the user is predicted based on detected position information and a history of the carried item information (carried item movement history), is described; however, in the present second embodiment, the destination prediction apparatus further detects a user's departure area and target area, and by converting a carried item movement history into a unit of 1 movement from the departure area to the target area, judges whether or not an item is a frequently carried item or an infrequently carried item. Note that the system configuration of the destination prediction apparatus in the present second embodiment is the same as that in the abovementioned first embodiment, and therefore descriptions are omitted.

In addition, in the present second embodiment, the carried item movement history is accumulated as a unit of 1 movement from the departure area to the target area, and therefore accumulation of the history of the carried item information and the position information is carried out based on, for example, a "possession check" operation and an "anti-theft function" executed by the user. Through this, it is possible to systemize and accumulate the carried item and the user's movement. Note that here, "possession check" is a function in which an RFID detection is carried out as previously mentioned, and the item the user is carrying is confirmed.

Figure 20:
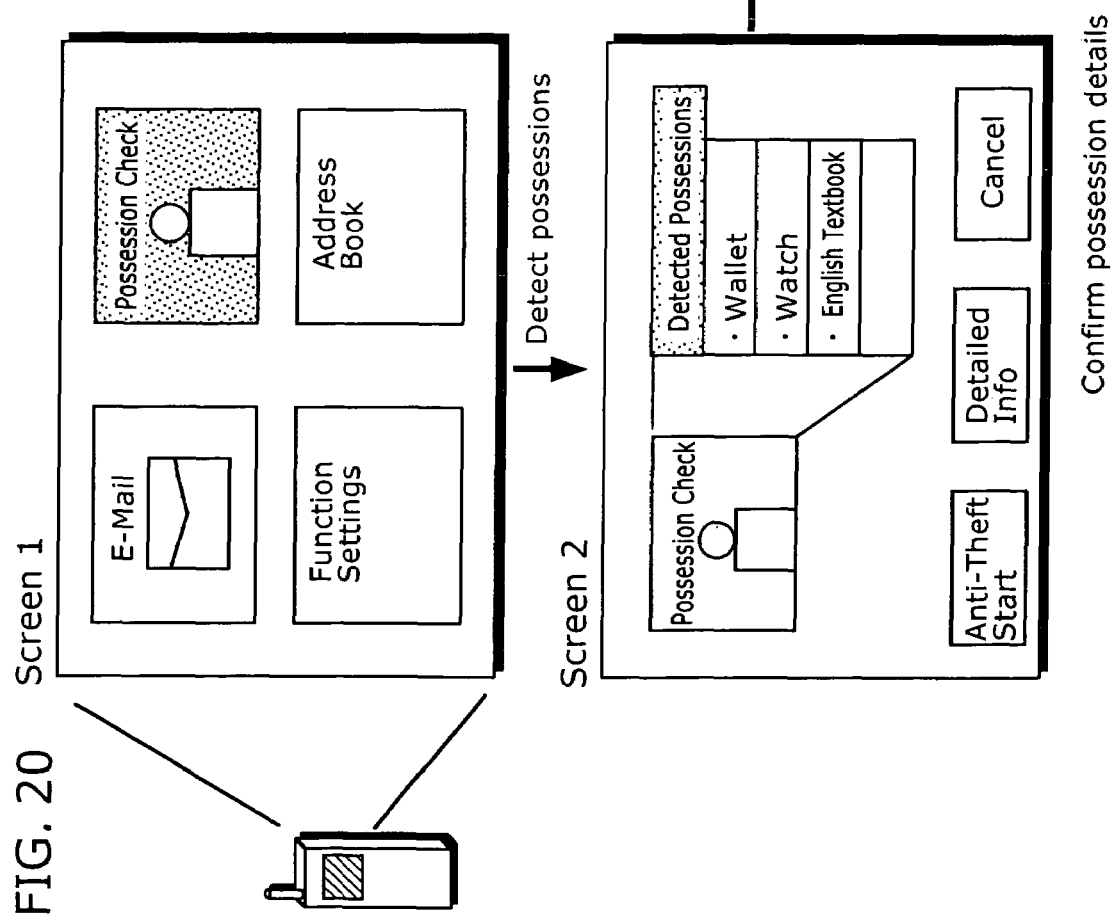
FIG. 20 is a diagram showing a carried item detection according to the second embodiment of the present invention.

FIG. 20 is a reference diagram showing an example of a screen display of the destination prediction apparatus according the present second embodiment.

By using the "possession check" function, the user can confirm the items he/she is currently carrying, and this can check whether or not he/she has forgotten anything. For example, the RFID within a detection area (for example, within a 2 Rcm diameter) is detected with the user's input operation, such as the "possession check," as a trigger, and the obtained ID is detected as a carried item (screen 1 of FIG. 20). Then, a tag is given to the possession, and in this case, an English textbook, a wallet, and the like are detected as the user's carried items (screen 2 of FIG. 20).

In addition, screen 3 of FIG. 20 displays a possession select screen in which a detailed display is requested, and screen 4 displays details of the selected carried item and position history.

In addition, as another function, the "anti-theft function" is a function which checks whether or not a carried item has separated from the user due to theft, being dropped, and so on. This function involves, for example, checking, at a predetermined timing, whether or not a carried item detected in the aforementioned "possession check" is within a detection area, and in the case where the item is out of the area and is not detected, judging that the item is lost, and notifying the user. In addition, the function involves recording the position the item is lost at by detecting the position information at that time.

FIG. 22 shows an example of a list of carried items detected through the "possession check," which is a function included in the destination prediction apparatus according to the present second embodiment.

First, the carried item information is detected by a carried item detection unit 103 via the input operation by the user such as "possession check," and, for example, it is detected that the user is carrying a "watch," the "wallet," and the "English textbook" at a date and time of "Wed, May 14, 19:20." Note that the destination prediction apparatus may hold this carried item list in a history accumulation unit 104 for re-use at a later time.

Next, descriptions are given for the case where the position information and carried item information of the user are detected periodically, along with the user's movement, through the "anti-theft function" operation.

FIG. 23 is a table showing a history in which the user's position and carried items are detected automatically at an interval of, for example, 1 minute; the history starts with the user carrying the "watch," "wallet," and "English textbook" at a position of "N35.00, E135.00" and a time of "Wed, May 14, 19:20," and the history of the carried item and position is sampled every 1 minute.

In other words, detection and accumulation of the carried item movement history is carried out by causing the "anti-theft function" to start with the "possession check" as a trigger, and furthermore, it is possible to accumulate the point where the function is caused to start as the departure area, and the point where the function is cause to stop as the target area. In addition, by converting the carried item movement history into 1 movement unit, which includes the movement from the departure area to the target area, judgment of the frequently carried item and the infrequently carried item can be carried out more accurately.

Note that the "anti-theft function" may be started and stopped through the user's input operation, or may be carried out automatically.

Also note that acquisition of the history of the carried item and the position is not limited to the descriptions given here. For example, it is acceptable to consider the user to have gone outdoors when position acquisition has succeeded, and to automatically begin acquisition.

FIG. 24B is a table showing a sequence of date and time information and position information sampled automatically. However, it is acceptable to combine the carried item information and the position information detected in the aforementioned possession check as the history of the position and carried item.

For example, at the starting time of position acquisition, it is acceptable to assume that the carried items detected in the most recent possession check are also being carried at present, and use this as the history of the position information and the carried item. In other words, the history in FIG. 23 is obtained from the carried item information shown in FIG. 24A and the sequence of the position information sampled automatically as shown in FIG. 24B.

In the present second embodiment, the position information (departure area, target area, route, and the like) is acquired as, for example, a node sequence corresponding to longitude/latitude. FIG. 21 shows a name and node number corresponding to a longitude/latitude. For example, the node number "C1" indicates "E135.20.35.45, N34.44.35.22," and the name of the point is "Hanamachi 1 Intersection"; this is obtained from map information and the like.

Note that it is acceptable to detect the position information periodically, or to use access points of when a mobile terminal 101 accesses a server, or, for example, to use information that can acquire position information included in each room indoors, as the position information. In addition, the position information is not limited to being uniquely set with the longitude/latitude. It is also acceptable to set a range with a threshold of a radius of several centimeters for the detected longitude/latitude information, and convert this to the departure area, target area, and route.

FIG. 25 shows a history that has systemized the user's movement and carried item from this series of history, in which the movement history (node series) from the departure area "company" at a date and time of "Wed, May 14, 19:20" to the target area "English School Geon" is associated with the items "wallet," "watch," and "English textbook" which the user is carrying at that time, and accumulated. That is, it is recorded in this table that at 19:20 on Wednesday, May 14, the user moves from the departure point of "work" to the target area of "English School Geon" while carrying the "wallet," "watch," and "English textbook."

Note that the departure area and the target area may be calculated using a different method. For example, the user may set longitude/latitude information of a point he/she is frequently dwells in, such as his/her home, and that surrounding area may be assumed to be the user's home. Or, it is acceptable to calculate a point in which the user dwells in a constant area for a specific time period (for example, 60 minutes or more) as the target area, but the embodiment is not limited to this.

Judgment between the frequently carried item and the infrequently carried item is executed by the carry frequency judgment unit 105; in the abovementioned first embodiment, it is possible to carry out judgment between the frequently carried item and the infrequently carried item simply by considering the frequency at which the item appears in the history, or by clustering the positions of the carried items.

In the present second embodiment, an item carried in a specific movement, or, in other words, the "infrequently carried item," is to be extracted more accurately, and thus from the departure area to the target area is converted into 1 movement. That is, movement from the departure area to the target area is considered 1 movement, and by judging an item appearing across a plurality of movements to be the "frequently carried item," an item appearing in limited movements to be the "infrequently carried item," it is possible to more accurately predict the destination. Hereafter, FIG. 25 is used for description, and in the present second embodiment, an item being carried in 1 movement is counted as 1 time. Thus, in the case of FIG. 25, the "wallet" is 6 times, the "watch" is 5 times, the "English textbook" is 3 times, and the "jersey" is 1 time.

The carry frequency judgment unit 105 sets, for example, a threshold value for the carry frequency, and calculates whether an item is the frequently carried item or the infrequently carried item. For example, in this case, when the threshold value is 4 times (greater than or equal to 60% of the total number of movements), it is possible to judge the "wallet" and "watch" as frequently carried items, and the "English textbook" and "jersey" as infrequently carried items.

In this manner, in the present second embodiment, the space between the departure area and the target area is calculated as 1 movement, and based on this information, the carry frequency judgment unit 105 judges between the frequently carried item and the infrequently carried item. Therefore, it is possible to accurately judge a carried item as an infrequently carried item even when, for example, the movement time is long and thus the carried item would normally be judged to be a frequently carried item.

Next, a result of judging between the frequently carried item and the infrequently carried item, when the carried item movement history is calculated with one movement from the departure area to the target area as 1 unit, is described using the diagrams.

FIG. 26 is a series of the carried item movement history accumulated in the history accumulation unit 104. Note that for the sake of description, the space from the departure area to the target area is not systemized here; rather, it is accumulated, as-is, as the position information and the carried item information, as indicated in the previous first embodiment.

As shown in the present diagram, a total of 33 histories, such as position "N34.00, E135.00" on date "May 14, 19:20" or position "N34.01, E135.00" on date "May 14, 19:21," are accumulated, where the user is carrying the carried items "wallet" and "English textbook." In addition, a total of 60 histories, such as position "N34.00, E135.00" on date "May 17, 19:20," where the user is carrying the carried items "wallet" and "racket," are accumulated; an overall total of 100 histories are accumulated in the history accumulation unit 104 as information of the carried item movement history.

Here, in the same manner as the previous first embodiment, when a carry percentage (carry number÷history total (%)) is calculated based on the frequency of the history, the wallet is present 100 times out of the total 100 histories, so the wallet is 100% (100÷100); the English textbook is 33% (33÷100); and the racket is 60% (60÷100).

FIG. 27 is a reference diagram for describing the infrequently carried item based on the carried item movement history.

When a threshold for judging the infrequently carried item is a carry percent of greater than or equal to 10% and less than 60%, the carry frequency judgment unit 105 judges the "English textbook" to be the infrequently carried item, and, as the "racket" has a carry percentage of greater than or equal to 60%, judges the "racket" to be, like the "wallet," the frequently carried item.

Figure 28:
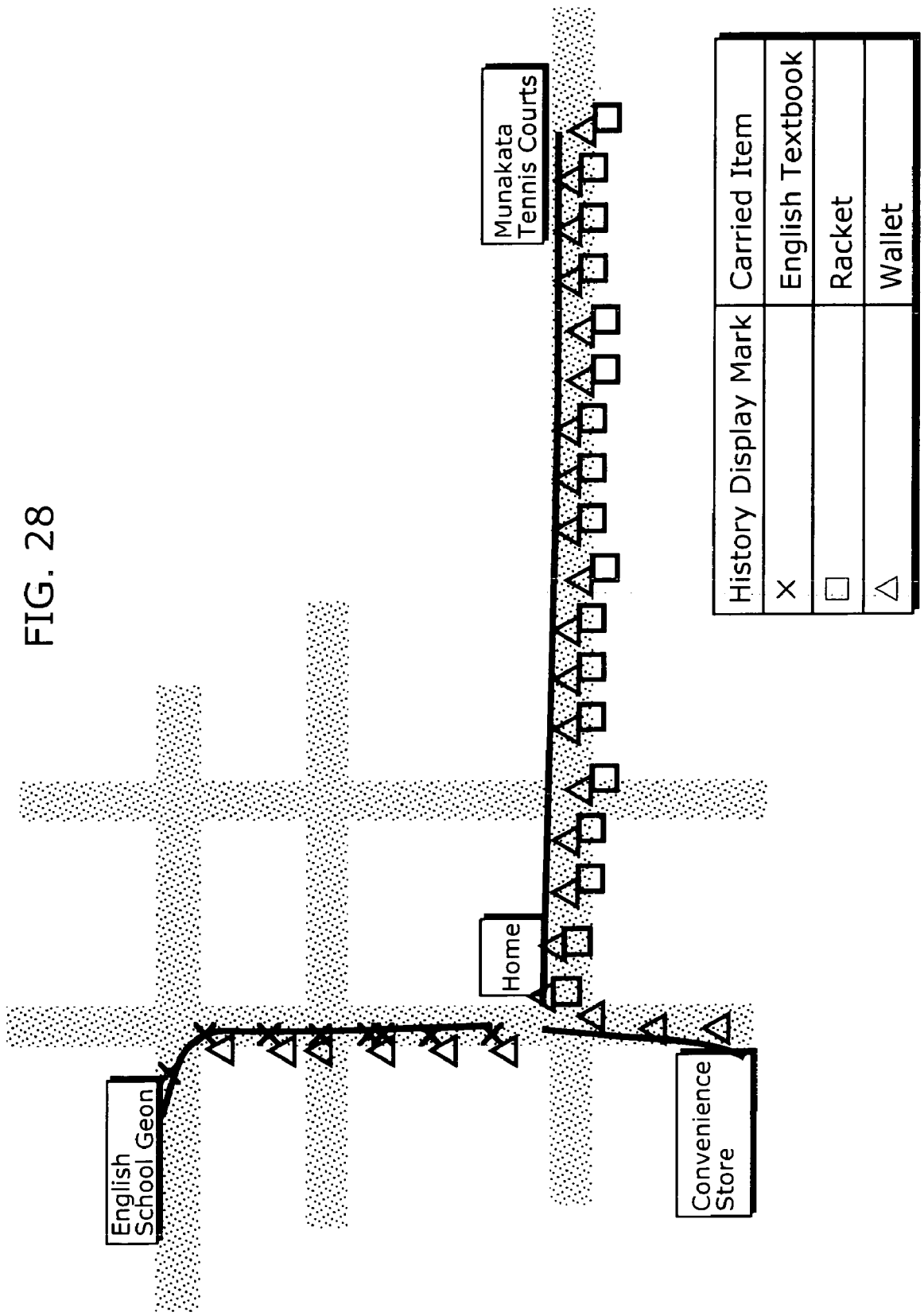
FIG. 28 is a diagram showing a relationship between a position and a carried item according to the first embodiment of the present invention.

FIG. 28 is a reference diagram showing the case where the carried item movement history shown in FIG. 26 is plotted in symbols on a map. Note that the "wallet" is plotted as a triangle, the "English textbook" is plotted as an x, and the racket is plotted as a square.

In FIG. 28, it can be seen that the user carries the "English textbook" when moving from "home" to "English School Geon," and carries the "racket" when moving from "home" to "Munakata Tennis Courts." On the other hand, it can be seen that the "wallet" is carried in every movement.

In other words, in the destination prediction method of the destination prediction unit 107 in the abovementioned first embodiment, because information per predetermined time is used as the frequency information, a carried item (the "racket") which should originally be judged as the infrequently carried item because it is an item carried only when moving to a predetermined destination (in the present example, "Munakata Tennis Courts") is actually judged as a frequently carried item with a high frequency by the carry frequency judgment unit 105; therefore, it is impossible to use the target area in the prediction task. This is due to the fact that while the destination is the same, the movement frequency is high, and so calculation is carried out taking into account only the frequency, regardless of the fact that the item appears many times in the history. Or, this is because despite that a distance to the destination is long and the history is numerously sampled, calculation is carried out taking into account only the frequency.

In addition, in the case where clustering is carried out with consideration to the position information, as shown in the first embodiment, in the case where the movement distance is long, areas in which the item appears become numerous, and thus there is the possibility that the "racket" is judged as the frequently carried item. Descriptions are given using FIGS. 29, 30, and 31.

Figure 29:
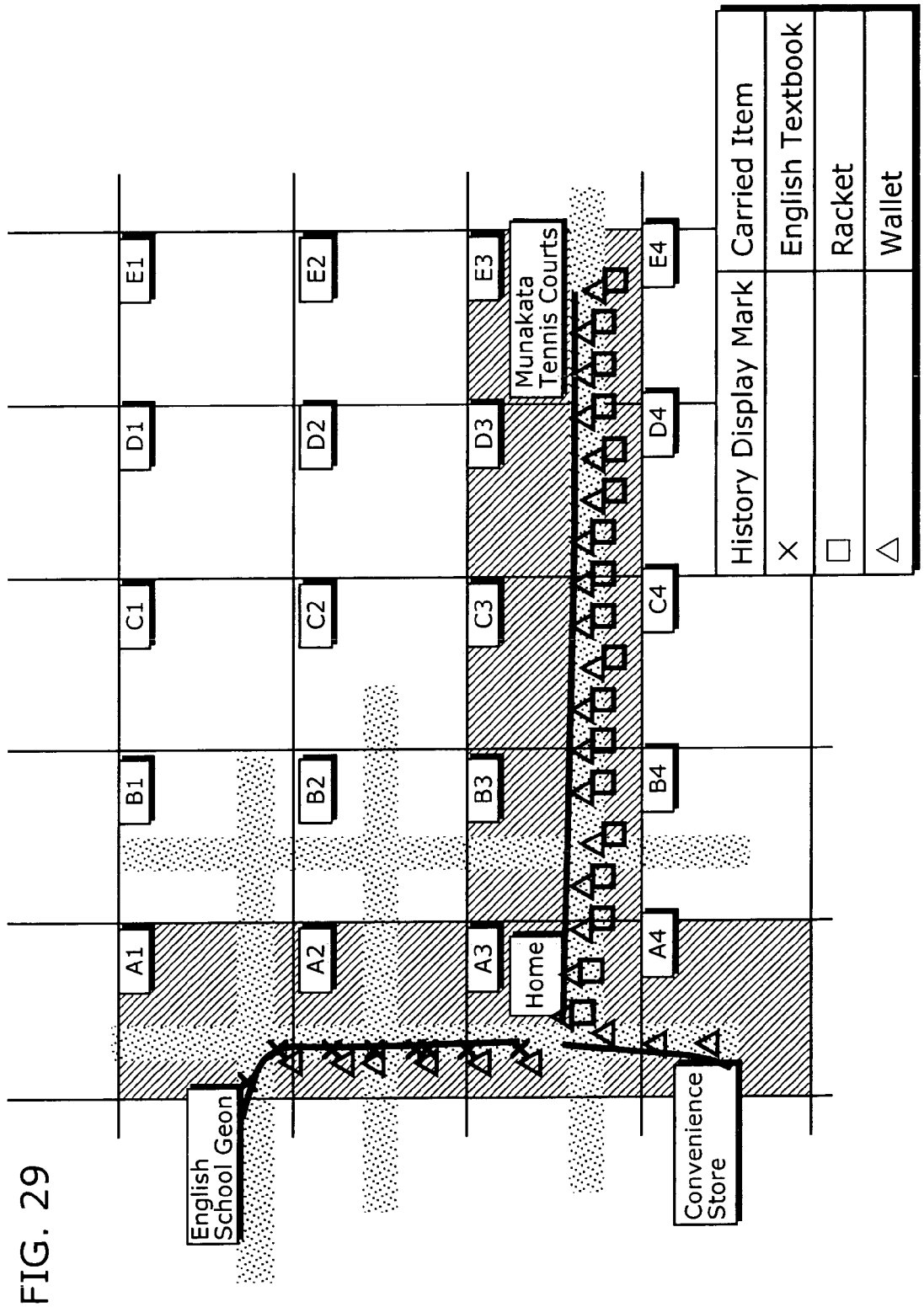
FIG. 29 is a diagram showing a relationship between an area and a carried item according to the first embodiment of the present invention.

FIG. 29 is a diagram in which FIG. 28 is cut into a mesh shape. The diagram shows each area as divided into numbers 1, 2, 3, and 4 on the vertical and letters A, B, C, D, and E on the horizontal.

Figure 30:
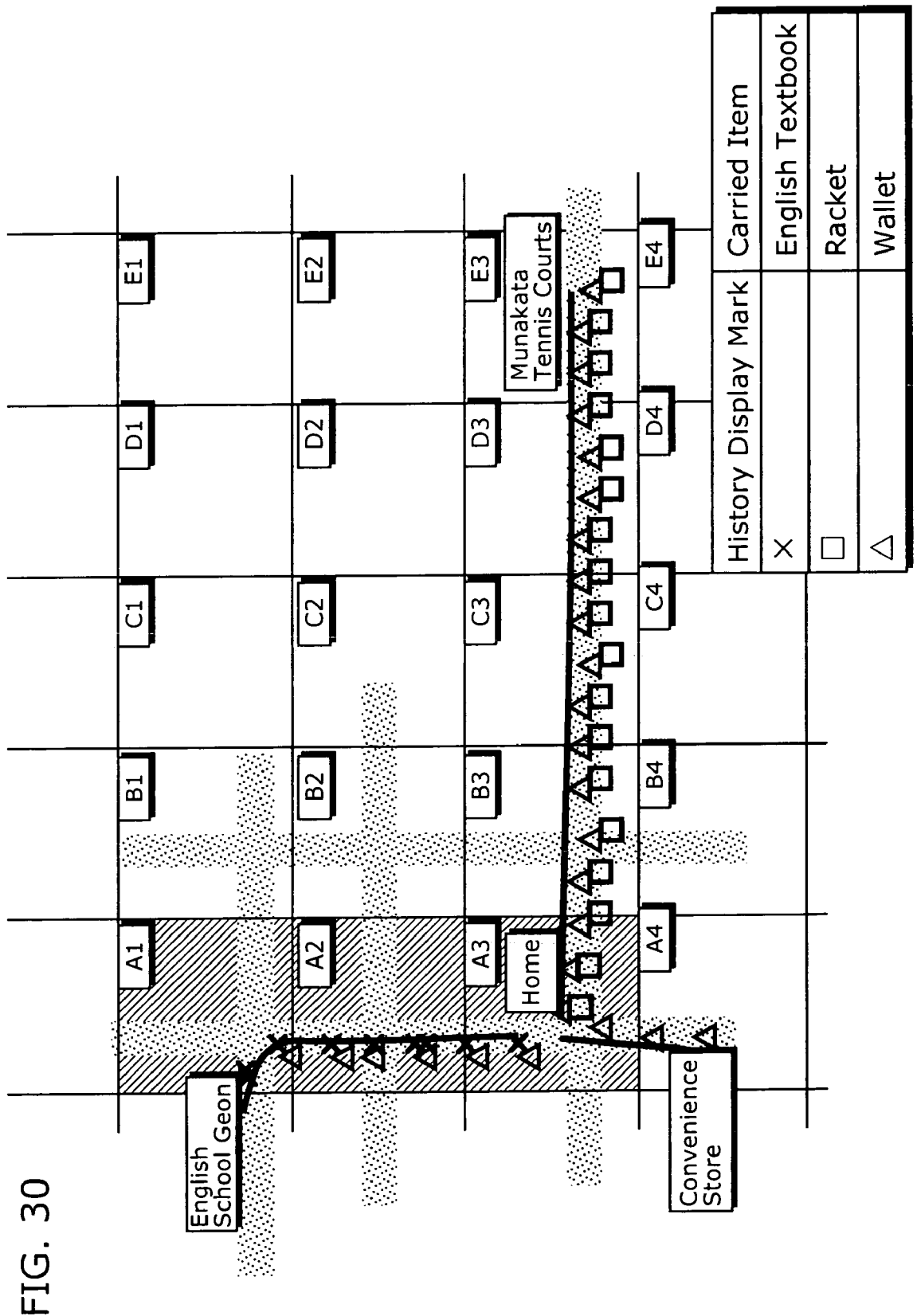
FIG. 30 is a diagram showing a relationship between an area and a carried item according to the first embodiment of the present invention.

FIG. 29 further shows, with hatched lines, the areas in which the "wallet" is present. From FIG. 29, it can be seen that the "wallet" appears in many areas: areas "A1 to A4," "B3," "C3," "D3," and "E3." On the other hand, FIG. 30 shows, with hatched lines, the areas where the "English textbook" is present, and it can be seen that the "English textbook" is limited to appearing in areas "A1 to A3." Through this, it is possible to judge between the frequently carried item and the infrequently carried item by setting the threshold value on the number of areas in which an item appears. When calculating a percentage a predetermined carried item is present in the area for all areas existing in the carried item movement history, the wallet is 100% (8÷8) and the English textbook is 37% (3÷8).

Figure 31:
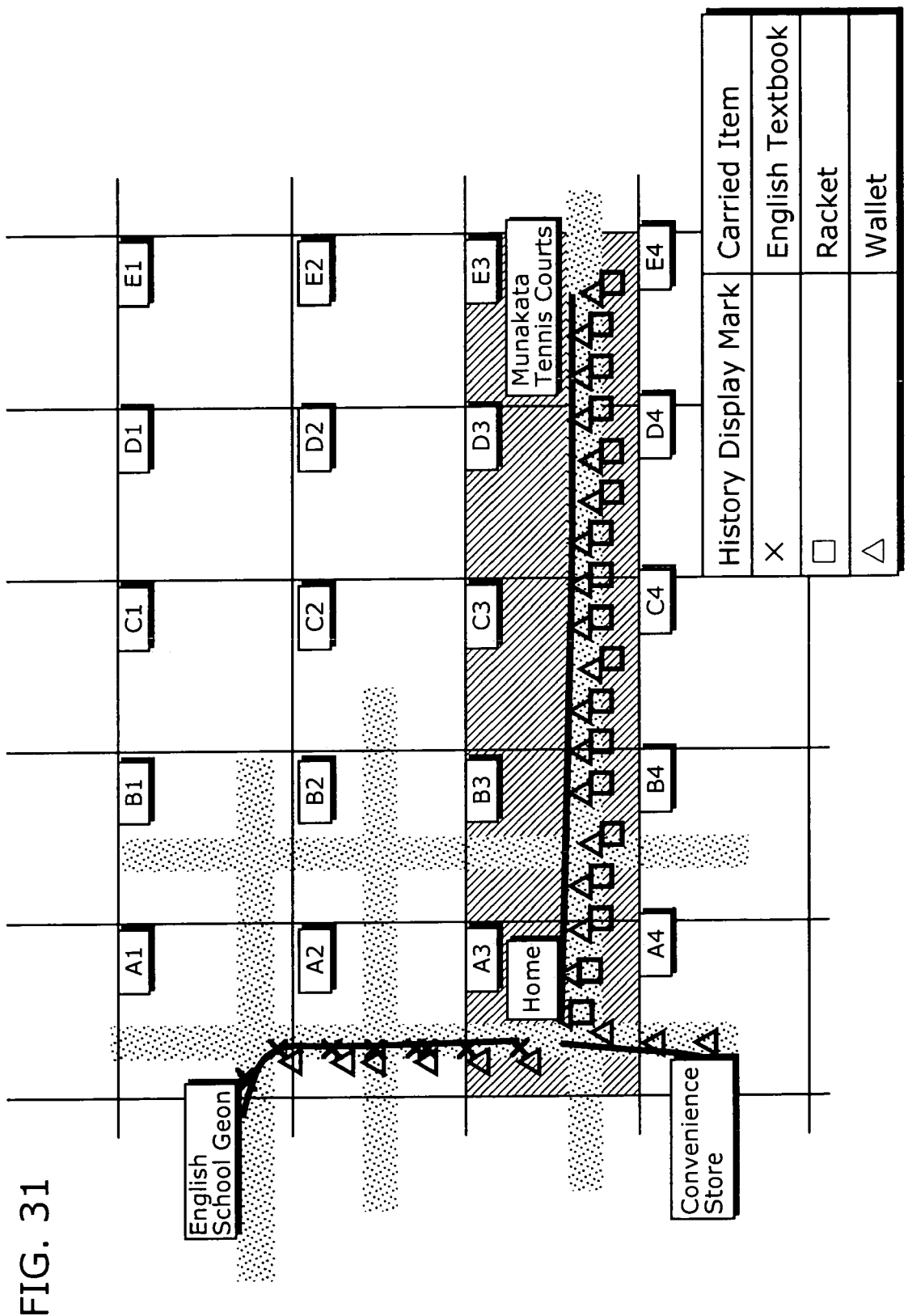
FIG. 31 is a diagram showing a relationship between an area and a carried item according to the first embodiment of the present invention.

In FIG. 31, the areas in which the "racket" is present are indicated by hatched lines, but because the movement distance is long, the areas in which the "racket" is present are numerous. In this case, there are 5 areas in which the "racket" is present, and when the percentage of areas in which the carried item appears is calculated in the same manner, the racket is 62% (5÷8), and when the threshold value for judging the infrequently carried item is set at greater than or equal to 10% and less than 60%, the "racket" is judged to be the frequently carried item.

Accordingly, in the present second embodiment, in order for it to be possible to accurately judge these items as infrequently carried items, the carried item movement history is converted as 1 movement from the departure area to the target area.

Figure 32:
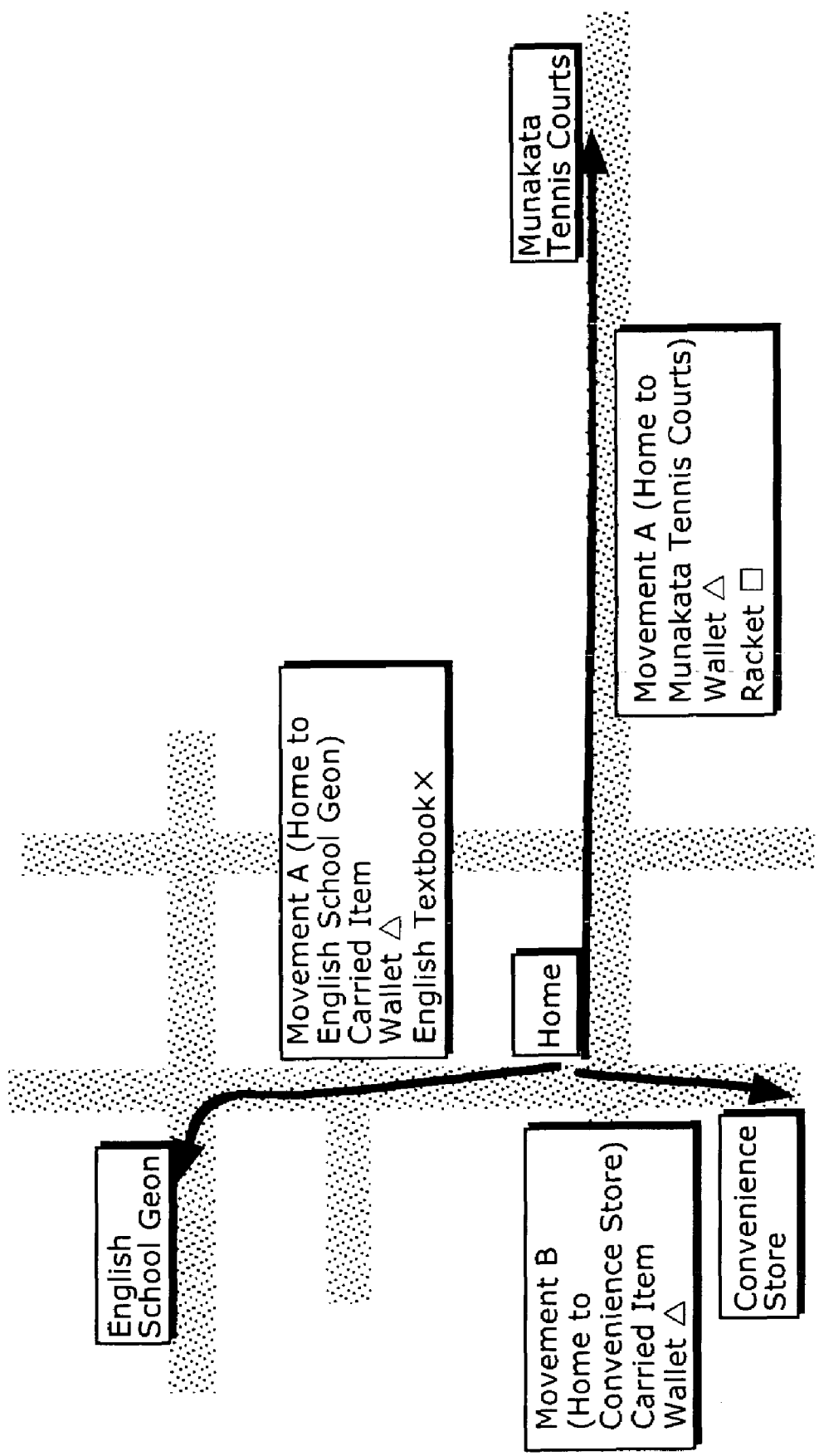
FIG. 32 is a diagram showing a relationship between an area and a carried item according to the first embodiment of the present invention.

FIG. 32 is a diagram which visualizes the carried item movement history (FIG. 26) as 1 movement from the departure area to the target area. In FIG. 32, it is possible to systemize the history in which the user carries the carried items "wallet" and "English textbook" as 1 unit from "home" to "English School Geon." In addition, it is possible to systemize the history in which the "wallet" is carried in movement from "home" to "convenience store" as 1 unit, and to systemize the history in which the "wallet" and "racket" are carried from "home" to "Munakata Tennis Courts" as 1 movement.

Therefore, when the carry frequency judgment unit 105 carries out judgment between the frequently carried item and the infrequently carried item with the percentage of the movement units (movement where the carried item is present÷total movements), the "wallet" is 100% (3÷3), the "English textbook" is 33% (1÷3), and the "racket" is 33% (1÷3); it is thus possible, by using the threshold value based on the movement unit percentage, to judge the "wallet" as the frequently carried item, and the "English textbook" and "racket" as infrequently carried items.

In this manner, in addition to the frequency and the position, it is possible for the carry frequency judgment unit 105 to more accurately judge the infrequently carried item, even in the case where frequency judgment is carried out based on the area and the time frequency, by converting the carried item movement history to 1 movement from the departure area to the target area. Note that 1 movement is 1 unit, but it is also acceptable to set a concept of a degree of similarity in movements, group similar routes, and calculate that frequency.

For example, as shown in FIG. 25, a movement series on "May 16" and on "May 17" are not the same, but are similar, and therefore grouping the two series in a same group is possible. Through this grouping, in FIG. 25, the "wallet" is 4 times, the "watch" is −4 times, the "English textbook" is 1 time, and the "jersey" is 1 time. Here, based on the threshold value, it is possible for the carry frequency judgment unit 105 to differentiate the "wallet" and "watch" as the frequently carried items and the "English textbook" and "jersey" as the infrequently carried items.

In addition, as previously mentioned, in the case of considering only the carry frequency and movement, when the carried item "English textbook," which has a comparatively high frequency, is compared with the "jersey," depending on the threshold, the "English textbook" cannot be judged as the frequently carried item. However, in this manner, by considering a degree of similarity of the movement routes, it is possible to think of movement to one target area as one unit rather than simply considering the carry frequency, and thus it is possible to more clearly distinguish the "English textbook" and "jersey" as the infrequently carried items and the "watch" and "wallet" as the frequently carried items, and therefore it is possible to utilize the present prediction method using the infrequently carried item. Note that it is possible to consider movement in which the target area is the same as one group, and to judge an item carried within a plurality of groups as the frequently carried item.

FIG. 33 is a table showing a relationship between the infrequently carried item and the target area.

The causal relationship extraction unit 106 calculates the infrequently carried item and a related target area as the position causal relationship. For example, the position causal relationship in the present embodiment is extraction of the carried item movement history that includes the infrequently carried item "English textbook." The extracted position causal relationship is indicated in FIG. 33. From FIG. 33, it can be seen that in the case of carrying the "English textbook," the user is moving to the target area "Geon English School." Or, when carrying the "jersey," the user is moving to the target area "Sports Gym Excize."

The destination prediction unit 107 uses the position detected by the position information detection unit 102, the carried item detected by the carried item information detection unit 103, and the position causal relationship extracted by the causal relationship extraction unit 106, and predicts the destination. In the present second embodiment, the prediction task is, for example, "predict the target area." A trigger for executing the prediction task is, for example, "execution trigger is the user going outdoors," and judging whether or not the user has gone outdoors can be carried out, for example, by judging "whether or not position acquisition by a GPS has been started." Furthermore, it is acceptable to automatically display, on the screen, commercial information regarding the predicted target area.

For example, the user departs his/her house carrying the "English textbook." In this case, the destination prediction unit 107 calculates the target area from the position causal relationship with the position acquisition by the GPS starting as the trigger. In this case, "English School Geon" is calculated from the position causal relationship (FIG. 33). Furthermore, it is possible to display information regarding the predicted target area "English School Geon," such as, for example, "class reservations," before arriving at the target area.

As shown earlier, the conventional target area prediction method depends on a present position of the user and movement in a predetermined period of time. In other words, movement of a certain length of time is necessary to judge whether or not past movement history and the current movement match. However, in the present second embodiment, a predetermined position and a target area in the case of carrying the infrequently carried item are extracted from the carried item movement history; therefore, if it is possible to detect that the user is carrying the infrequently carried item, it is possible to predict the destination of the user in a variety of prediction tasks.

For example, it is possible to predict the target area the instant the user carries the infrequently carried item even in the case where the position information cannot be acquired. For example, it is also possible to provide information regarding the target area to the user at an arbitrary timing before the user leaves his/her house.

Note that it is also acceptable to predict the target area, with the aforementioned "possession check" as a trigger, in the case where the infrequently carried item is carried, and to provide the information to the user.

For example, as shown in FIG. 20, it is acceptable to carry out the "possession check" (scene 1 and scene 2 of FIG. 20), and when looking at information of the "English textbook," which is the infrequently carried item, to provide information of the "English School Geon," which is the target area (scene 3 and scene 4).

Note that the position causal relationship is not limited to the target area. It is also acceptable to cause the extraction of the route (node series) to the target area. Through this, the target area is "English school Geon" in the case where the user carries the "English textbook," and the movement route is node IDs "C7-C8-C5-C6-C17-C18"; by further having time information, it is possible to predict an arrival time for a predetermined node.

Or, it is acceptable to use a date and time rather than calculating 1 movement as a unit from the departure area to the target area. Or, it is acceptable to calculate a unit using the time information. For example, when the acquisition time of the position information differs from a predetermined period (for example, 30 minutes), it is acceptable to calculate this as a different movement.

Figure 34:
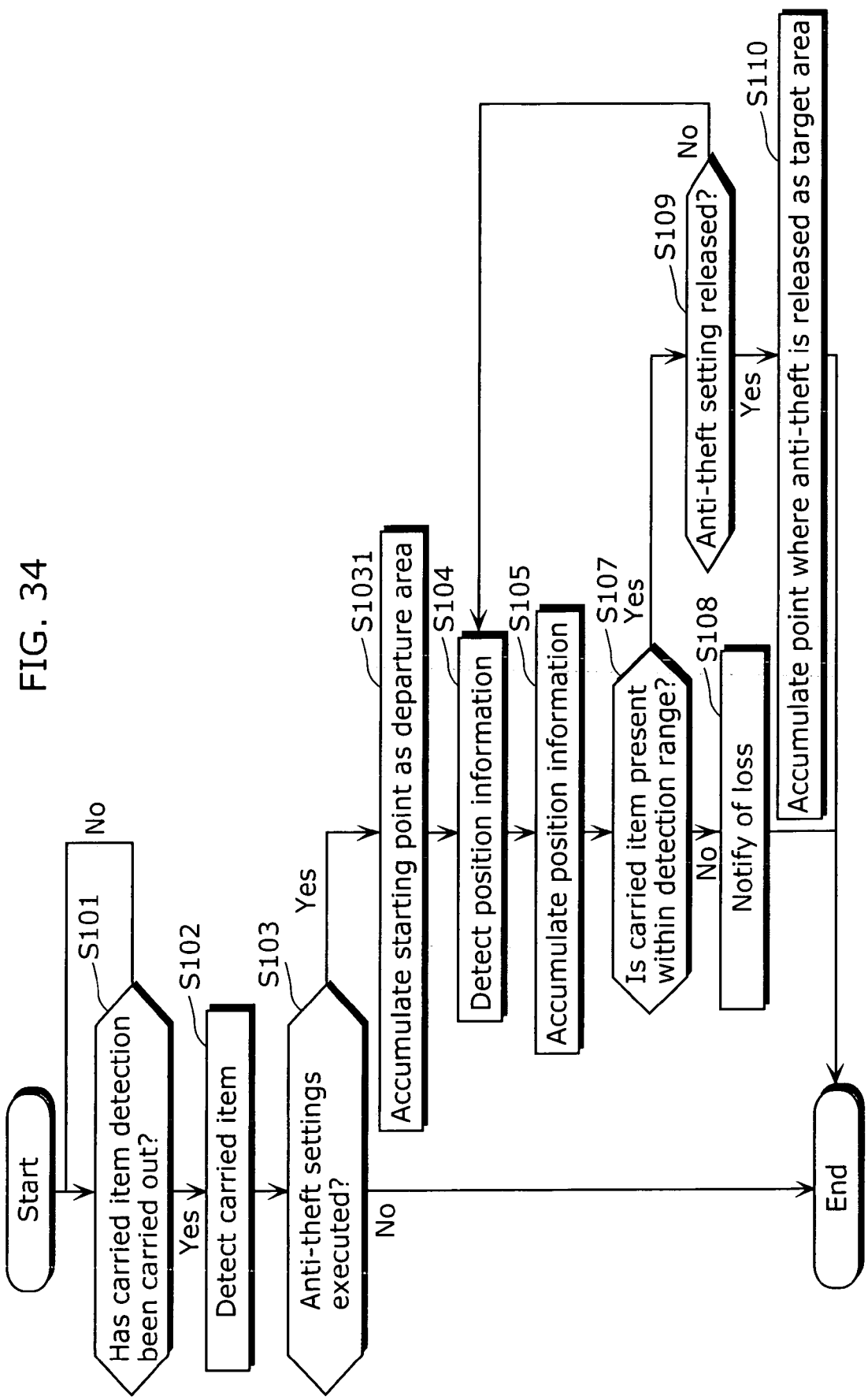
FIG. 34 is an operation flowchart according to the second embodiment of the present invention.

Hereafter, a prediction process of the destination prediction apparatus according to the present second embodiment is described using the flowchart in FIG. 34.

FIG. 34 is a flowchart showing an operational procedure regarding a destination prediction task in the case Where an anti-theft setting is executed.

First, the carried item detection unit 103 detects whether or not the possession check function is operating (S101). Then, in the case where the possession check function is operational (Yes of S101), the carried item detection unit 103 detects the carried item (S102). On the other hand, in the case where the possession check function is not operating (No of S101), the carried item detection unit 103 again judged whether or not the possession check operation has been carried out.

Next, the mobile terminal 101 detects whether or not the anti-theft function is operating (S103). In the case where the anti-theft function is operating (Yes of S103), a starting point is accumulated as the departure area (S1031).

Next, a position according to the movement of the user is acquired at a predetermined interval by the position information detection unit (S104). The history accumulation unit 104 accumulates the position information detected by the position information detection unit 102 and the carried item detected by the carried item detection unit 103 as the history, in the history accumulation unit 104. Note that the accumulated carried item movement history is shown, for example, in FIG. 23.

On the other hand, the anti-theft function detects whether or not the carried item is within a detection range (within a radius of Rcm from the user) (S107), and in the case where the carried item is not within the detection radius (No of S107), notifies the user that the item has been lost (S108).

Then, the operation of acquiring the position information is repeated until the anti-theft function is released, and in the case where the function is released (Yes of S109), the point where the function is released is accumulated as the target area (S110). This is, for example, carried out in order to release the anti-theft function, in order, for example, to prevent the anti-theft function from operating when the user leaves his/her seat after arriving at the English school.

Note that the carried item information and the position history accumulated in the history acquisition loop that is the process from S104 to S108 and S109 are accumulated as a history series, from the departure area to the target area, in the history accumulation unit 104.

As described above, FIG. 23 is a table in which the movement history is systemized; for example, a history in which the user departs work at 19:20 on May 14 and arrives at English School Geon is accumulated. In addition, it can be seen that the carried items at that time are the "wallet," "watch," and "English textbook."

Figure 35:
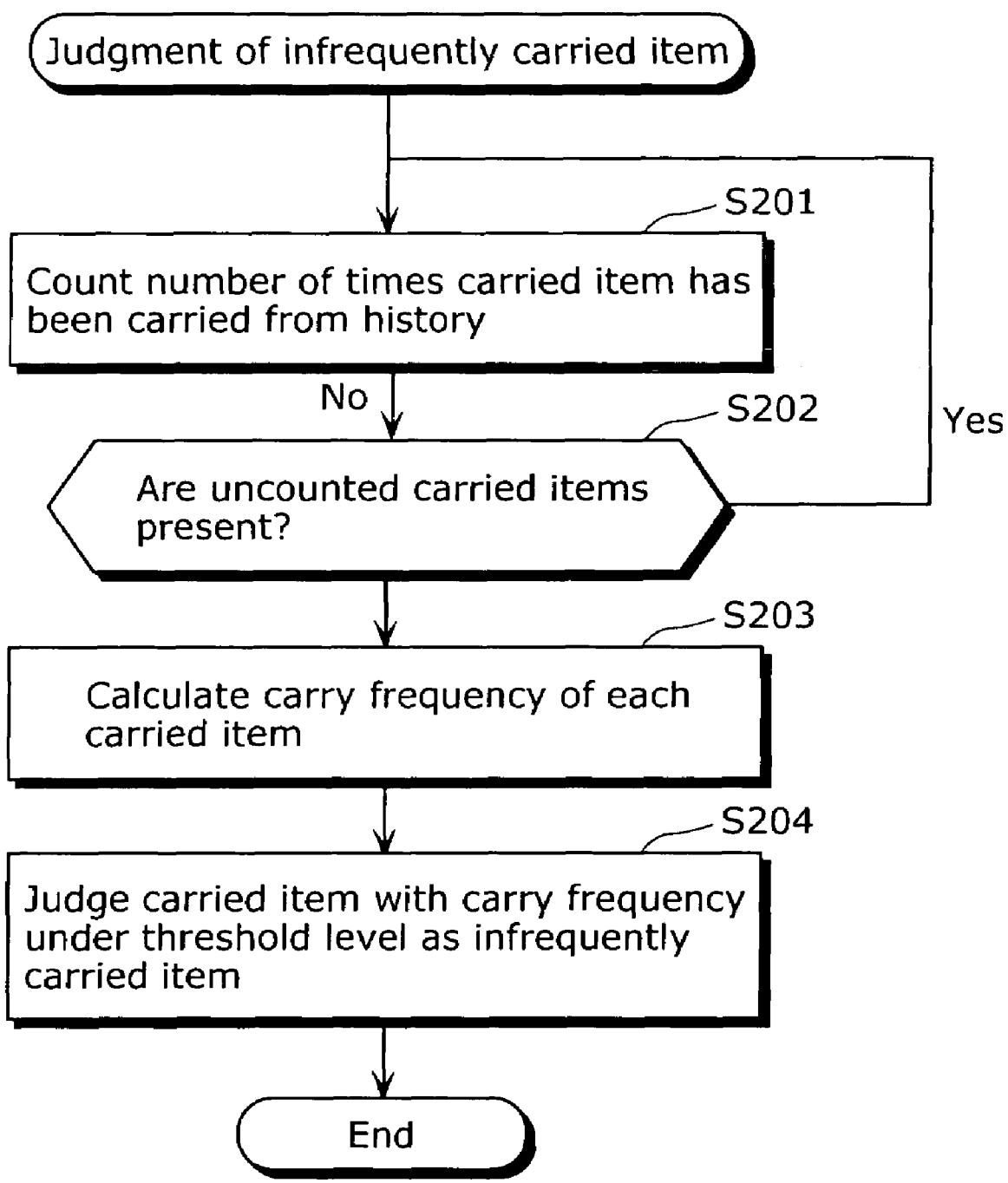
FIG. 35 is an operation flowchart according to the second embodiment of the present invention.

FIG. 35 shows a flowchart in the case where movement from the departure area to the target area is calculated as 1 unit and the infrequently carried item is judged, in the present second embodiment.

First, the number of times the carried item has been carried is counted from the history (S201). In FIG. 21, the number of times each of the carried items "wallet," "watch," and "English textbook" have been carried in the 1 movement "from home to English School Geon on May 14" is 1 time. Next, the uncounted history is calculated as necessary (repeating S201 to S202), and thus the "wallet" is counted 6 times, the "watch" is counted 5 times, the "English textbook" is counted 3 times, and the "jersey" is counted 1 time.

Next, the carry frequency judgment unit 105 calculates the carry frequency of each carried item. For all 6 movements, the "wallet" is 100% (6÷6), the "watch" is 84% (5÷6), the English textbook is 50% (3÷6) and the "jersey" is 16% (1÷6) (S203). Next, the frequently carried items and infrequently carried items are judged based on a threshold value (S204). In this case, when the threshold value is 4 times (greater than or equal to 60% of the total number of movements), the "wallet" and "watch" are judged to be frequently carried items, and the "English textbook" and "jersey" are judged to be infrequently carried items.

Figure 36:
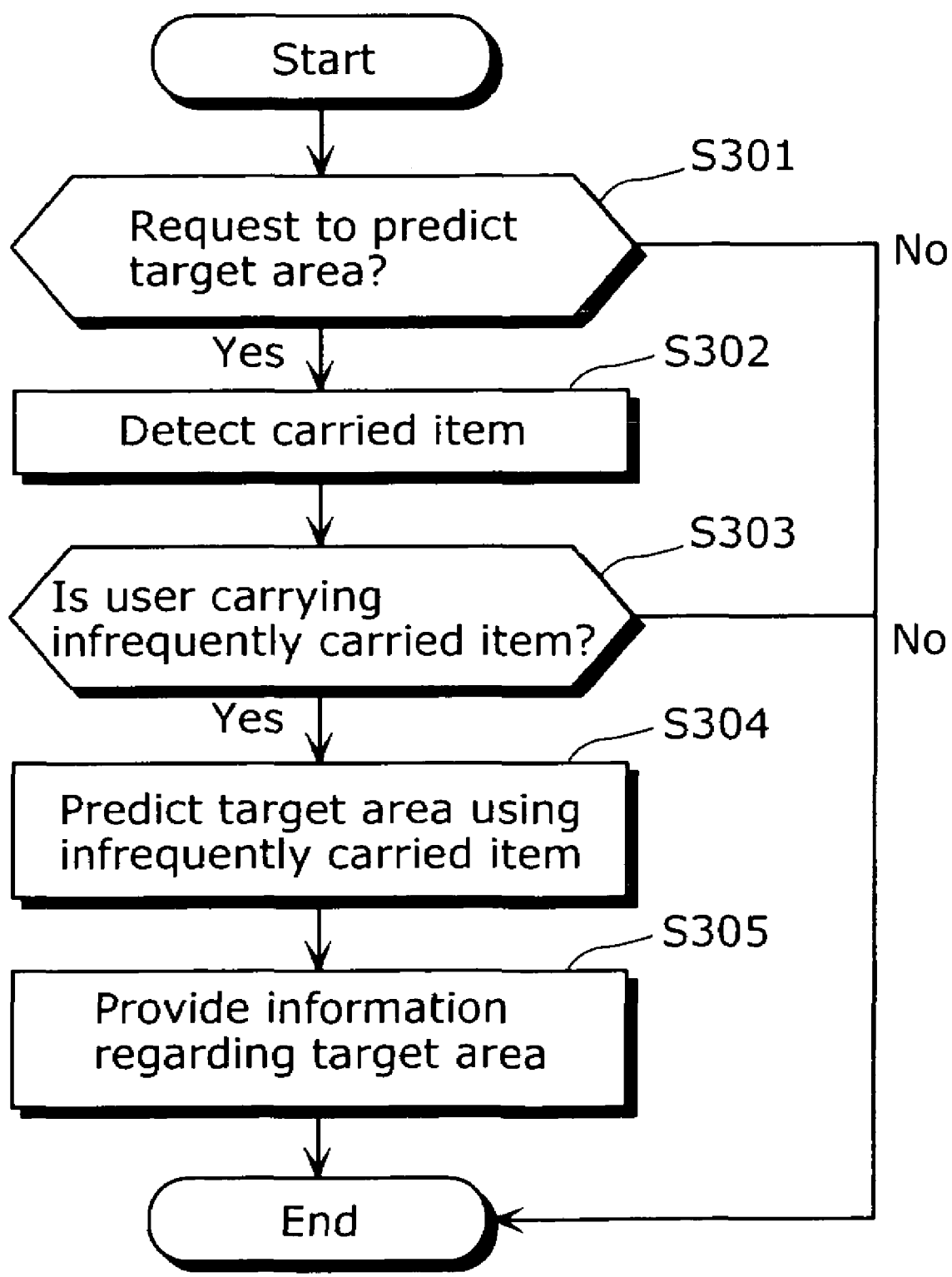
FIG. 36 is an operation flowchart according to the second embodiment of the present invention.

FIG. 36 is a flowchart describing an operational procedure in which the position causal relationship is calculated based on the infrequently carried items obtained from the operational flow in FIG. 35.

The target area prediction task accepts a target area prediction request via the user's input at a predetermined timing (S301), and executes the task with this as a trigger. For example, there is a request by a service and the like which predicts the user's target area at the same time the user leaves his/her house and presents information regarding the target area (Yes of S301).

At this time, the carried item detection unit 103 detects the carried item (S302). In the present diagram, the carried item detection unit 103 detects the "wallet" and the "English textbook."

Then, the carry frequency judgment unit 105 judges the presence/absence of the infrequently carried item from among the obtained carried items (S303). For example, the user is carrying the infrequently carried item "English textbook," and thus the causal relationship extraction unit 105 extracts a movement destination candidate based on the infrequently carried item (S304). In the carried item movement history shown in FIG. 33, the causal relationship, such as where the target area in the case where the "English textbook" is carried is 100% (3÷3), is obtained. Accordingly, the destination prediction unit 107 predicts the destination to be "English School Geon," and provides the information regarding the predicted destination (S305).

Note that in the previous first embodiment and the present second embodiment, the position, target area, and the like which have a causal relationship with the infrequently carried item correspond to one place, but there is also a case where this is not necessarily so, which is described using FIG. 37.

FIG. 37 is a table indicating an example of a relationship between the infrequently carried item and the target area. As shown in FIG. 37, there are cases where there is a plurality of target areas; for example, even when the user carries the infrequently carried item "jersey," there may be target areas of "Sports Gym Excize," "park," and so on. Accordingly, it is acceptable to set a threshold value and predict the target area with the highest probability as the predicted target area. In the case of FIG. 37, the target area "Sports Gym Excize" is 9 times, while the target area "park" is 1 time. In other words, in the case where the infrequently carried item "jersey" is carried, the "park" has a 10% (1÷10) movement probability, but as the target area "Sports Gym Excize" has a 90% (9÷10) movement probability, which is the highest, the predicted target area is the "Sports Gym Excize."

Note that in the previous first embodiment and the present second embodiment, the target area and the causally-related infrequently carried items are all described as one time, but the embodiments are not limited to this. It is also acceptable to extract the target area that is related to plural infrequently carried items. This is described using FIG. 38.

FIG. 38 is a diagram showing the position causal relationship between the infrequently carried item and the target area, as extracted by the causal relationship extraction unit 106. From FIG. 38, it can be seen that the user is moving to the target area "English School Geon" while carrying an "English textbook A," an "English textbook B," a "pencil case," and an "electronic dictionary." Accordingly, a combination of the plural infrequently carried items of "English textbook A, English textbook B, pencil case, and electronic dictionary," and the target area "English School Geon," are extracted as the target area with a causal relationship. On the other hand, at the time of the prediction task, it is acceptable to carry out a control causing the target area to be "English School Geon," in the case where the user is carrying only one of the plural infrequently carried items, or in the case where, for example, a threshold value of 50% or more is set, and the user carries less than the threshold value (in this case, 2 of the 4).

Furthermore, in the case where these plural infrequently carried items and the target area are related and are extracted, when the user starts moving without carrying any of these plural infrequently carried items, this is brought to the attention of the user. In FIG. 38, the target area "English School Geon" and the plurality of infrequently carried items "English textbook A, English textbook B, pencil case, and electronic dictionary" are extracted as having a causal relationship. At this time, for example, when the user leaves his/her house carrying only the "English textbook A, English textbook B, and pencil case" (with leaving the house as a trigger for predicting the target area), the "English School Geon" is predicated as the target area, and furthermore, the user is notified that he/she is not carrying the "electronic dictionary." In this manner, by using combination information regarding plural infrequently carried items, it is possible to carry out a forgotten item check simply by detecting the carried items.

Note that in the previous first embodiment and the present second embodiment, prediction is carried out using a personal history, but it is also acceptable to use histories of a plurality of people. For example, it is possible to extract a more universal position causal relationship by collecting the carried item movement history in a server. In addition, it is also acceptable to present this to a third party.

For example, by accumulating in a server the positional causal relationship, in which the user is moving to the "English School Geon" at 100% probability when he/she is carrying the "English textbook" as shown in FIG. 33, it is possible for the third party to obtain the "English School Geon" as a result of destination prediction even if there is no history in which the "English textbook" has been carried and the prediction task is executed with the "English textbook" being carried for the first time.

Third Embodiment

Next, a destination prediction apparatus according to the third embodiment of the present invention is described with reference to the diagrams. Note that the destination prediction apparatus according to the present third embodiment includes a carried item facility database, in which a position of a facility and facility information indicating a carried item a user generally carries when using the facility, are stored.

Figure 39:
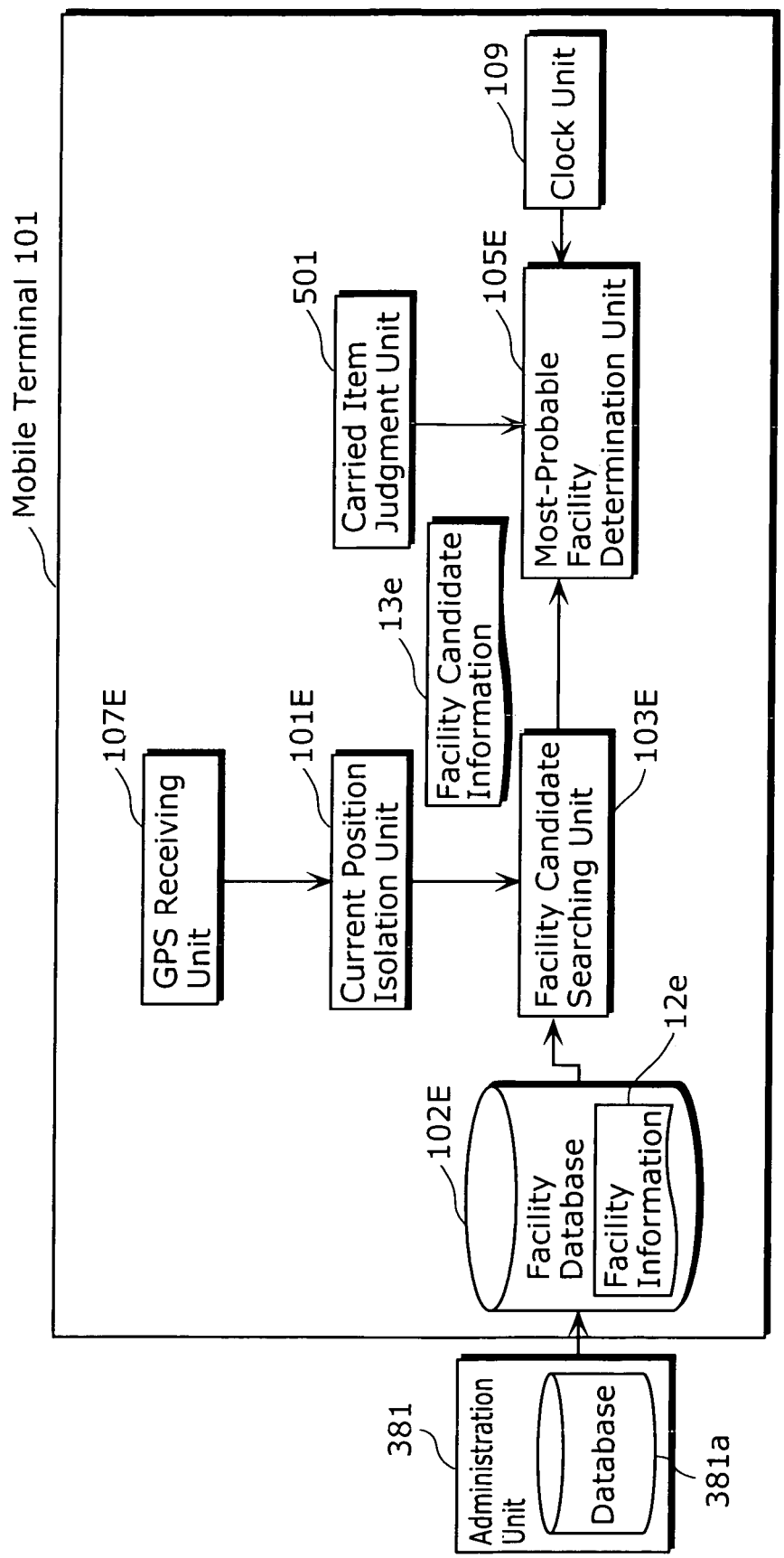
FIG. 39 is a diagram showing a configuration according to the third embodiment of the present invention.

FIG. 39 is a configuration diagram showing a configuration of the destination prediction apparatus according to the third embodiment of the present invention.

The destination prediction apparatus in the present third embodiment predicts the facility the user visits, and includes: a GPS receiving unit 107E; a current position isolation unit 101E; a facility database 102E; a facility candidate searching unit 103E; a carried item judgment unit 501; a most-probable facility determination unit 105E; and a clock unit 109. In addition, the destination prediction apparatus according to the present third embodiment is internally integrated into a portable terminal such as a cellular phone, Personal Digital Assistant (PDA), and so on, or in a mobile terminal such as a car navigation system, and moves along with the user.

The GPS receiving unit 107E receives position information regarding a current position from a GPS satellite.

The current position isolation unit 101E acquires the position information from the GPS receiving unit 107E and isolates the current position of the destination prediction apparatus, or, in other words, the current position of the user, from that position information.

The facility database 102E has, pre-stored, facility information 12e indicating the position of the facility and the carried item generally carried by the user who uses the facility (hereafter, referred to as specified item). Note that this facility database 102E may be installed inside a mobile terminal 101, or may be included as information in a server device external to the mobile terminal 101 and be acquired via a network.

The facility candidate searching unit 103E searches for a facility within a predetermined range central to the current position, from the facility information 12e stored in the facility database 102E, based on the current position isolated by the current position isolation unit 101E. Here, the aforementioned predetermined range is an appropriate value set in accordance with the positioning accuracy of the GPS. Next, the facility candidate searching unit 103E reads out the facility corresponding to the search results and the information of the specified item (the item generally carried by the user of the facility) from the facility information 12e, and notifies the most-probable facility determination unit 105E of facility candidate information 13E, which indicates the read-out results. In other words, the facility candidate searching unit 103E provides candidates of facilities visited by the user based on the GPS positioning, and outputs those results as the facility candidate information 13e.

On the other hand, the carried item detection unit 501 is configured of, for example, an RF tag reader, and detects the carried item of the user. The detected carried item is notified to the most-probable facility determination unit 105E.

When a plurality of facilities are provided as candidates in the facility candidate information 13e notified by the facility candidate searching unit 103E, the most-probable facility determination unit 105E selects, from among this plurality of facilities, the facility that corresponds to the carried item detected by the carried item detection unit 501, and that selected facility is determined to be the visited facility which the user actually visits.

Note that, as shown in the diagram, it is also possible to install an administration unit 381 which provides the facility information stored in the facility database 102E via a network. This administration unit 381 is included in a server device which mainly manages the facility information, and includes a database 381a for uniquely managing information of many users. Therefore, for example, it is possible to provide position information and class information of an English school to a user who has purchased a new English textbook using the information managed in the administration unit 381.

FIG. 40 is a diagram showing information content that indicates a content of the facility information 12e stored in the facility database 102E.

The facility information 12e has: a position column L1 which stores a position such as longitude/latitude; an identifier column L2 which stores an identifier for the facility in that position; a facility name column L3 for which stores a name of the facility (facility name); a morning carried item column L4 which stores the carried item the user uses in that facility in the morning (for example, from 5:00 to 11:00); an afternoon carried item column L5 which stores the carried item the user uses in that facility in the afternoon (for example, from 11:00 to 17:00); and an evening carried item column L6 which stores the carried item the user uses in that facility in the evening (for example, from 17:00 to 5:00).

The aforementioned identifier is allocated to each facility so that each facility can be uniquely isolated. In addition, the carried item column shows the carried item carried in the facility by general users, and is a specified item that triggers the isolation of the facility being used.

For example, the positions "longitude e1, latitude n1," "longitude e2, latitude n2," and so on are stored in the position column L1, the identifier "facility 2" which is associated with the position "longitude e2, latitude n2" is stored in the identifier column L2, and the facility name "Sports Gym Excize" which is associated with the identifier "facility 2" is stored in the facility name column L3. A "racket" is stored in the morning carried item column L4 as the specified item of a user in the facility "Sports Gym Excize," and a "swimsuit" is stored in the afternoon carried item column L5 as the generally carried item of the user in the facility "Sports Gym Excize." In addition, the "jersey" is stored in the evening carried item column L6 as the generally carried item of the user in the facility "Sports Gym Excize."

Here, in the case where a plurality of facilities (shops) is present in an identical site, the identifiers and facility names of these facilities are associated with the identical position.

For example, in the case where facilities "music studio" and "calligraphy school" are present on the site at position "longitude e3, latitude n3," the identifiers, facility names, and specified item of the facilities "music studio" and "calligraphy school" are associated with the position "longitude e4, latitude n4," as shown by the facility information 12e in FIG. 40.

Note that the facility information shown in FIG. 40 stores the carried item generally used at the facility (specified item) so that uniquely isolating each facility is possible; however, as shown in the aforementioned embodiments 1, 2, 3 and 4, it is also acceptable to store the specified item that is used in an even more specific time period (such as early morning, morning, afternoon, early evening, evening, late evening), and store the specified item that is used per day of the week. In addition, in place of the generally-used carried item being used as the information of the specified item, it is acceptable to give the carried item a weight, and handle the item as a statistical distribution using an average and variance, or express information regarding the carried item that has been given the weight using a fuzzy membership function.

There are cases in which the item used at each facility differs; for example, in the morning, the "Sports Gym Excize" is used as a tennis facility and the specified item is the "racket," whereas the same "Sports Gym Excize" is used for the pool in the afternoon with the specified item being the "swimsuit," and is used for aerobics in the evening with the specified item being the "jersey." By specifically dividing up the specified items, it is possible to isolate the area visited by the user.

In addition, it is also acceptable to pre-set the specified item, and it is acceptable to extract the specified item from a use history. In addition, the specified item does not have to be limited to a single item; there may be a plurality of specified items. Furthermore, by giving a weight (importance degree) to the plural specified items by how often they are carried, it is possible to isolate the facility through the importance degree. Or, it is acceptable to change the importance degree depending on the combination of carried items.

FIG. 41 is a diagram showing information content of the facility candidate information 13e, which the facility candidate searching unit 103E notifies to the most-probable facility determination unit 105E.

This facility candidate information 13e includes: a facility identifier column which stores an identifier of a facility searched by the facility candidate searching unit 103E; a facility name column which stores a facility name of that facility; a morning specified item column which stores an average carried item of the user in the morning in that facility, which is a specified item for isolating the facility; an afternoon specified item column for the average carried item of the user in the afternoon; and an evening specified item column for the average carried item of the user in the evening.

For example, when the facility candidate searching unit 103E searches, from the facility information 12e shown in FIG. 25, for facilities within a range of a 20 m diameter central to the current position isolated by the current position isolation unit 101E, in the case where the positions "longitude e1, latitude n1" and "longitude e2, latitude n2" are included within that range, the facility candidate searching unit finds the facilities "Sports Gym Excize" and "English School Geon" from the facility information 12e, and reads out these pieces of information.

The facility candidate searching unit 103E stores the read-out facility identifiers in the facility identifier column, stores the facility names in the facility name column, and stores the specified item at each facility in the specified item column, thus creating the facility candidate information 13e indicated in FIG. 41.

The most-probable facility determination unit 105E acquires the facility candidate information indicated in FIG. 41 from the facility candidate searching unit 103E, and, upon receiving a notification from the carried item isolation unit 501 that the user carries the "English textbook" at "19:00 on Apr. 6, 2003," judges that the user is carrying the "English textbook" in that area on that date and time (evening, because it is 19:00). Then, the most-probable facility determination unit 105B searches for the facility that conforms to the evening isolated item from among the facilities "English School Geon" and "Sports Gym Excize" indicated in the facility candidate information 13b, and isolates the facility which the user is predicted as visiting to be the facility "English School Geon."

On the other hand, when as a result of searching for the specified item of these facilities from among the facilities indicated in the facility candidate information 13e, the most-probable facility determination unit 105E ends the prediction task as being unable to predict upon judging that there is no corresponding facility.

In this manner, in the present embodiment, the predicted visited facility is isolated according to the user's carried item and the date and time, from among several facility candidates given through the use of the GPS, and therefore it is possible to predict the facility which the user will visit with high precision.

Figure 42:
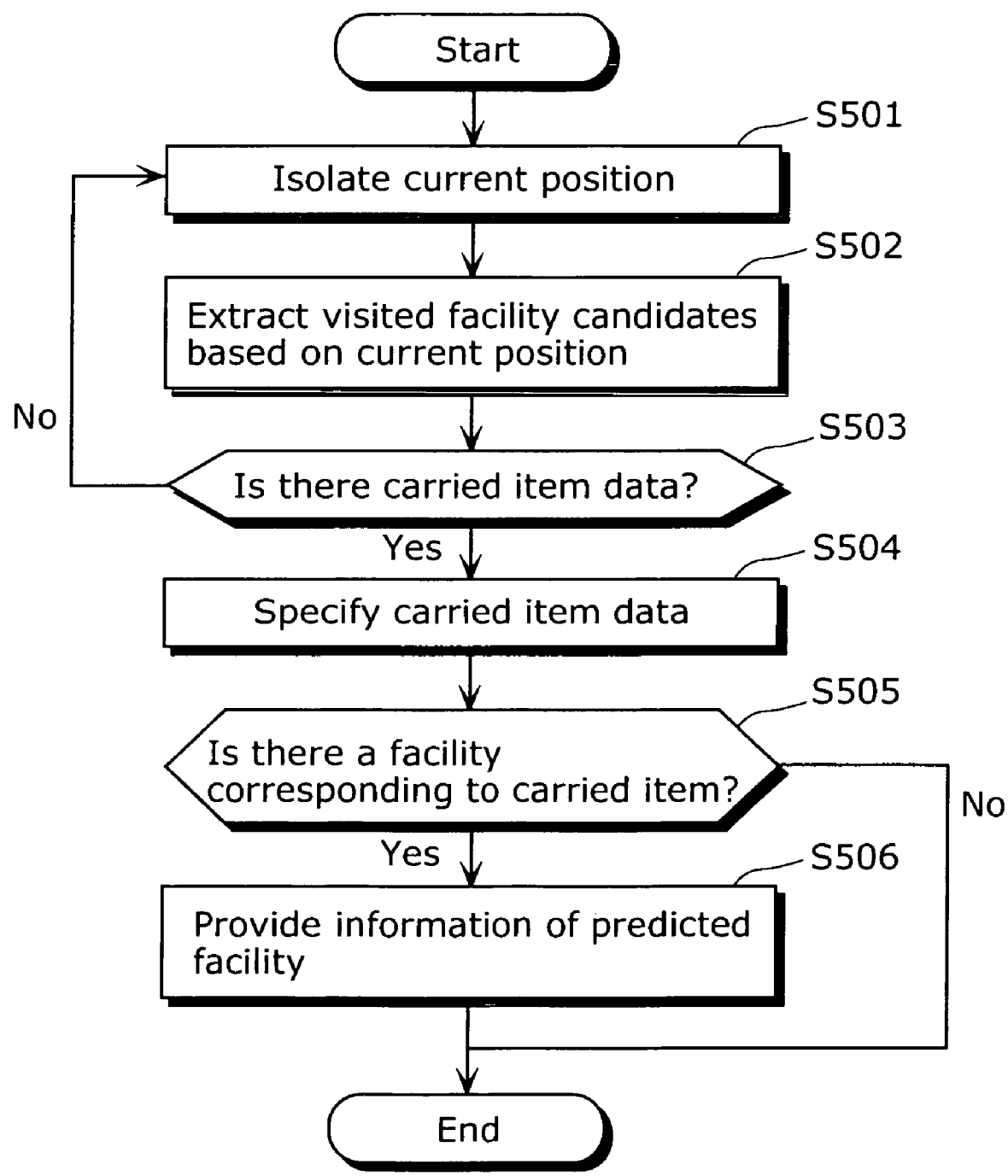
FIG. 42 is a flowchart showing an operation of the above destination prediction apparatus.

An operation of the destination prediction apparatus according to the present third embodiment is described using FIG. 42.

FIG. 42 is a flowchart indicating an operation of the destination prediction apparatus according to the present third embodiment.

First, the GPS receiving unit 107E receives the position information from a GPS satellite at a predetermined time interval, and the current position isolation unit 101E isolates the current position of the user from that position information (S501).

Next, the facility candidate searching unit 103E extracts, as predicted visited facility candidates, the facilities within a predetermined radius central to the current position isolated in S501, from the facility information 12e of the facility database 102E.

Here, the carried item specification unit 501 judges whether or not a carried item has been detected (S503). When it is judged that a carried item has been detected (Y of S503), the destination prediction apparatus predicts that destination (S504). For example, a carried item list of "wallet," "watch," and "English textbook" is detected.

After the carried item has been detected in S504, the most-probable facility determination unit 105E judges whether or not there is a compatible facility among the visited facilities given as candidates, based on the specified item of the visited facilities given as candidates in S502 and the carried item the user is carrying (S505). For example, in the present embodiment, the case where "the user is carrying at least one specified item" is compatible, while the case where "the user s not carrying even one specified item" is not compatible; it is judged whether or not there is a compatible facility. For example, the destination determination unit 105E judges that, among the facilities given as visited facility candidates in the facility candidate information 13e indicated in FIG. 41, there is the facility "English School Geon" as the facility that includes the "English textbook."

When it is judged that there is a predicted visited facility in S505 (Y of S505), the destination prediction apparatus predicts that facility as the visited facility and provides information regarding that facility (S506).

On the other hand, in S505, when it is judged that there is no facility corresponding to the amount of time the user stays (N of S505), the process finishes, with prediction being impossible.

Note that in the present third embodiment, the specified item of the facility database 102E is a set in advance, but the embodiment is not limited to this. It is also acceptable to automatically generate the facility information from the carry history or the like of a plurality of users. Furthermore, a different person may be used as well.

For example, it is possible to automatically generate the information by uploading the position causal relationship indicated in the previous second embodiment to a server. From the position causal relationship in FIG. 33, it is shown that the "English School Geon" is obtained at 100% in the case where the user carries the "English textbook." By uploading this to a server, it is also possible for a third party, as opposed to only the user him/herself, to use the causal relationship in which the "English School Geon" is indicated when carrying the "English textbook."

Furthermore, in the present embodiment, it is acceptable to make a notification in the case where it is judged, from a relationship between the plurality of carried items and the user's carried item, that the user carried and forgot a carried item, in the same manner as the previous second embodiment.

Note that it is also acceptable to generate the facility information using text information and the like obtained via an e-mail or the Internet.

FIG. 43 shows an e-mail received by the mobile terminal 101. Information regarding a place and necessary items is denoted as a notification (items to bring) for a next class at an English school. The information includes the place, "English School Geon, Room 100"; a time, "8:00 PM"; necessary items, "English textbook A, English textbook B, and electronic dictionary"; and so on. Accordingly, it is acceptable to extract the information regarding the place and necessary items from this text information and create the facility database. By using the text information, the causal relationship between the place and the necessary items is obtained, and by using the position causal relationship, it is possible to predict the visited place, even if the user has not visited that place (in this case, the "English School Geon") before. In addition, in the same manner as in the previous second embodiment, it is possible to notify the user of a forgotten item based on a relationship between the plurality of specified items extracted from the text information and the user's current carried items.

Note that in FIG. 43, the place is "English School Geon, Room 100," and therefore it is possible to isolate the place, but it is also acceptable for the sender to specify the place. In addition, the "electronic dictionary" is listed in the e-mail, but by further including an analogy engine and the like, it is possible to judge a normal "dictionary" as the specified item, in addition to the "electronic dictionary."

Note that it is also acceptable to further set a category in the facility that has a relationship with a predetermined specified item, and to predict the target area using this specified item in the case of categories of the same type. This is described hereafter using FIGS. 44 and 45.

Figure 45:
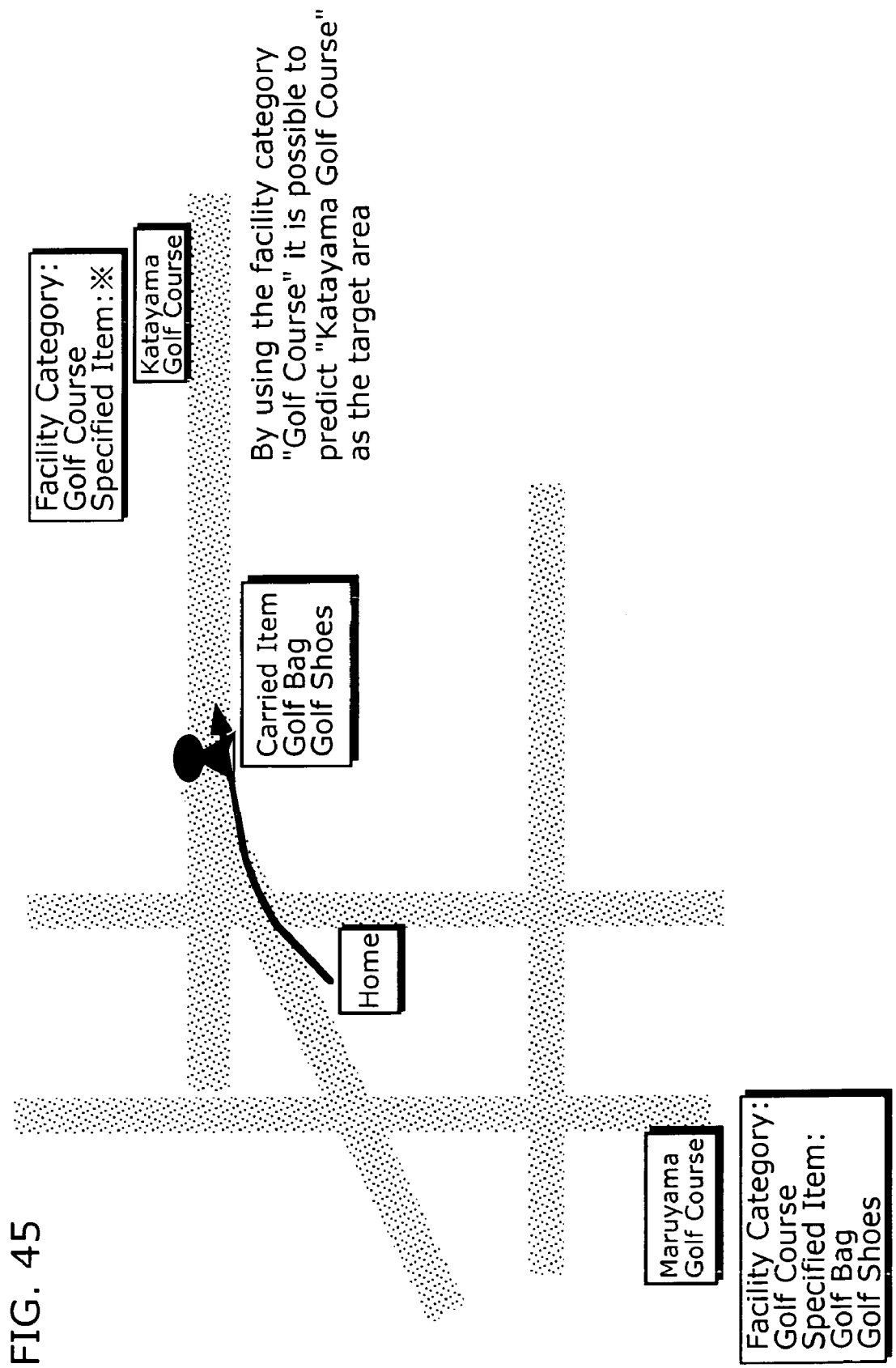
FIG. 45 is a diagram showing an arrival point prediction from a facility category according to the third embodiment of the present invention.

FIG. 44 is a facility database. The specified items "golf bag" and "golf shoes," along with a facility category "golf course," are shown for the facility name "Maruyama Golf Course." On the other hand, the specified items for the facility name "Katayama Golf Course" are not calculated (shown with a "star" mark). In other words, using the terminology of the pervious embodiment, there is no history of facilities the user has visited; or, in the present embodiment, there is no history of carried items of a plurality of users, and therefore a state in which the specified items are not calculated is shown. In this case, the "Katayama Golf Club" is not calculated as the target area. However, by using the facility category "golf course" here, it is, for example, possible to predict the target area even in the case where the user has not visited the place before. As shown in FIG. 45, the user carries the "golf bag" and "golf shoes" and moves in the direction indicated by the arrow. At this time, it is possible to predict, as the target area, the facility "Katayama Golf Course," which has the same facility category of "golf course." In addition, by using the aforementioned method for notifying the user of a forgotten item, in the case where the user has forgotten the "golf shoes," it is possible to make such a notification.

In this manner, it is possible to predict the target area through the user's carried items by using the text information of the facility category, as opposed to using only the specified item pre-registered with the facility.

Fourth Embodiment

Next, a destination prediction apparatus according to fourth embodiment of the present invention is described.

In the abovementioned first and second embodiments, a method is described in which a history of a user's carried item and movement is accumulated; from this accumulated information, a causal relationship between the carried item and destination is extracted; and the destination is predicted. In particular, by using an infrequently carried item and a frequently carried item of the user, it is possible to predict the destination with higher accuracy. In addition, it is described in the previous third embodiment that by using information that indicates a causal relationship between the carried item and a target area, it is possible to accurately predict the target area even if the user has not gone to that target area before. In this manner, by using information of movement in which a predetermined item is carried, which is a daily activity of the user, it is possible to predict the destination of the user.

However, there are many cases where the user normally carries a plurality of items, rather than just one. In recent years, there has been a tremendous increase in items carried by users that are detected in an environment in which tags that identify items, such as RFIDs, are given to all items. From this tremendous amount of carried items, cases arise in which, when predicting the destination, a plurality of destinations is predicted depending on the carried items, and accurate prediction cannot be carried out. Accordingly, in the present fourth embodiment, a method is described in which, in the case where a plurality of carried items is detected, the carried item most necessary for predicting the target area of the user is judged, and the destination of the user is predicted.

Figure 46:
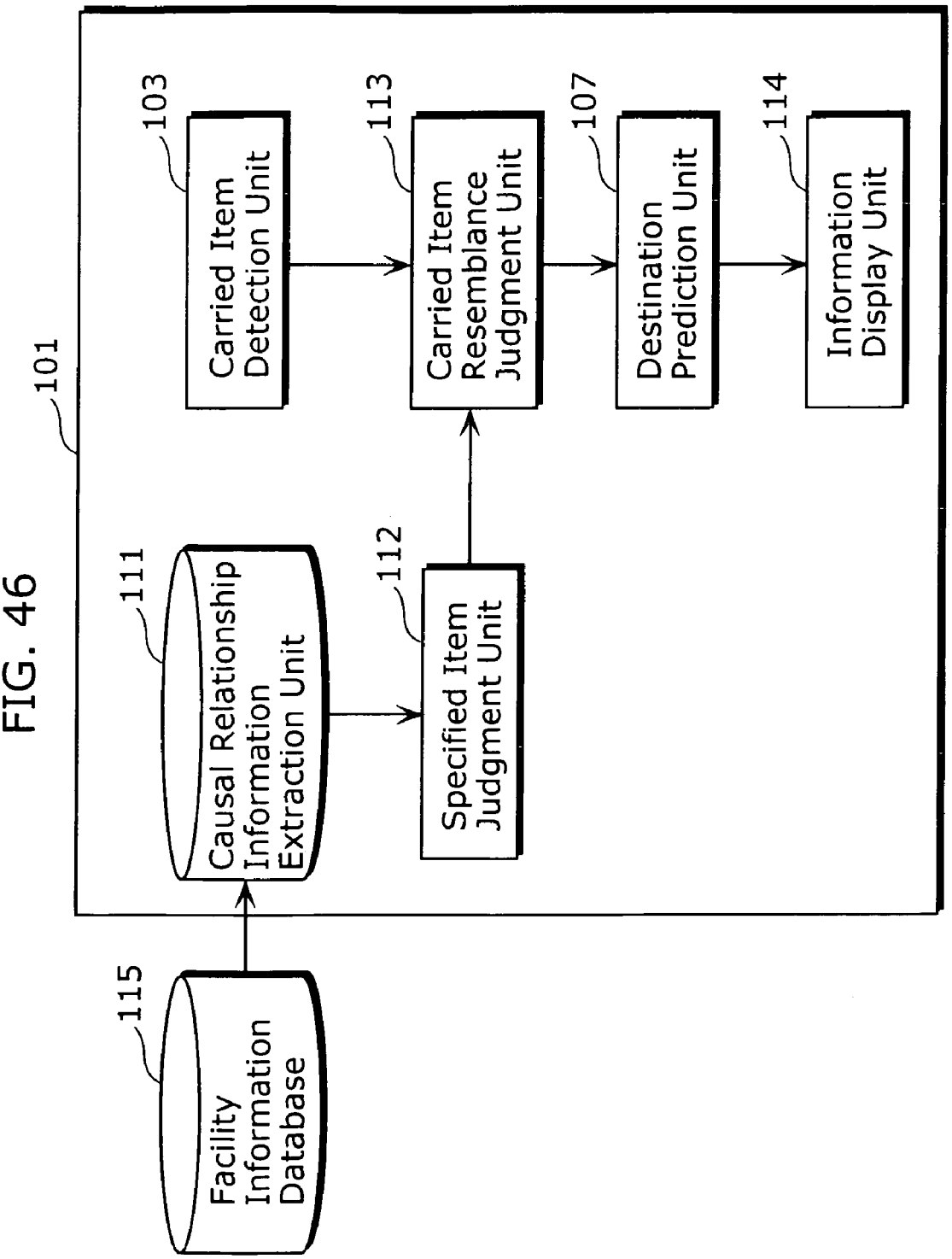
FIG. 46 is a system configuration diagram of a mobile terminal according to the fourth embodiment.

FIG. 46 is a system configuration diagram of a mobile terminal 101 in the present fourth embodiment. Configuration elements indicated in previous embodiments are given the same numbers.

In FIG. 46, the mobile terminal 101, which is the destination prediction apparatus according to the present fourth embodiment, is, for example, a cellular phone and the like, and is configured of: a carried item detection unit 103; a causal relationship information accumulation unit 111; a specified item judgment unit 112; a carried item resemblance judgment unit 113; a destination prediction unit 107; and an information display unit 114.

As in the aforementioned embodiments, the carried item detection unit 103 is configured of, for example, an RF reader, and detects the carried item which the user carries.

The causal relationship information accumulation unit 111 is a unit that accumulates information that associates the carried item with position information of a facility and the like (causal relationship information), and is a unit that corresponds to the facility database in the previous third embodiment.

FIG. 47 shows the causal relationship information, in which the carried items accumulated in the causal relationship information accumulation unit 111 are associated with, for example, the accumulated position information of the facility in which those carried items are used. For example, in a ID "001," "longitude 135 degrees, 34 minutes, 30 seconds, latitude 35 degrees, 30 minutes, 10 seconds," which is a position of a facility name "Yodobashi Cram School," is associated with the carried items "English textbook Y," "Japanese-English Dictionary," and "English-Japanese Dictionary" which are used at the corresponding facility "Yodobashi Cram School," and is accumulated.

In the aforementioned second embodiment, association of the facility and the carried item used at that facility is automatically extracted using a carry history of the user, but the association is not limited to this. It is also acceptable for an administration company of the mobile terminal or each facility to generate the causal relationship information, which differs with each facility. In addition, it is acceptable for the user himself to acquire the causal relationship information generated by, for example, each facility, or for the acquisition to be carried out automatically at an interval. Or, it is acceptable to extract information regarding the carried item from information regarding each facility, the information being posted on the Internet, and to create and extract the causal relationship information in which the carried item and facility are associated.

In the present fourth embodiment, the causal relationship information is created from the information regarding each facility, which is accumulated in a facility information database 115; the user acquires this causal relationship information, and the information is accumulated in the causal relationship information accumulation unit 111. Hereafter, a specific example is used for description.

Figure 48:
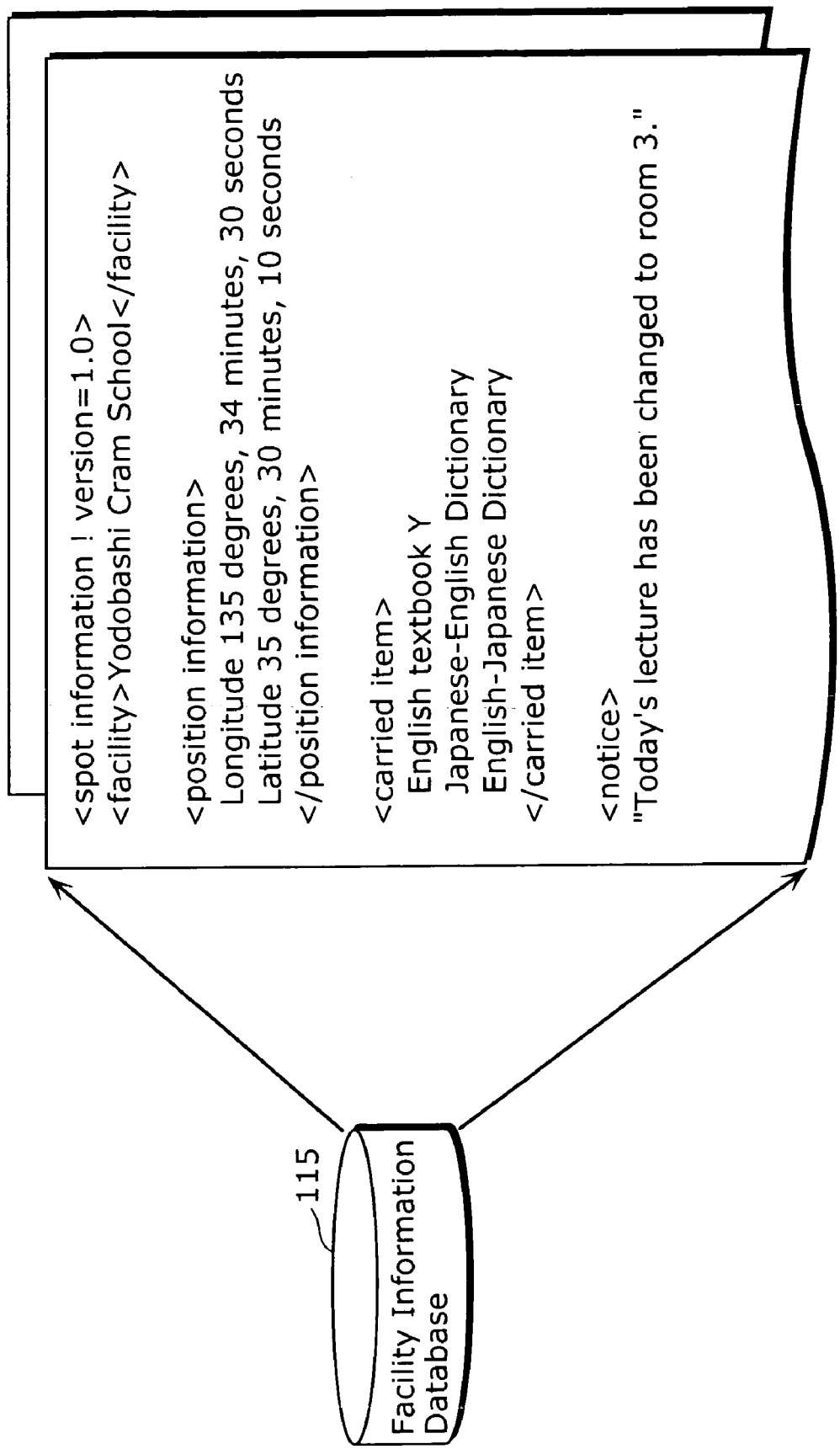
FIG. 48 is a diagram showing facility information in the fourth embodiment.

FIG. 48 shows information regarding the facility "Yodobashi Cram School." The information regarding "Yodobashi Cram School" is accumulated in a general-purpose format such as, for example, extensible Markup Language (XML) so that it can be viewed on the Internet and so on. As is well-known, XML is generally accumulated as a tag and that tag's value. Here, a name "Yodobashi Cram School" is denoted in a "facility" tag. In addition, "longitude 135 degrees, 34 minutes, 30 seconds, latitude 35 degrees, 30 minutes, 10 seconds" is denoted in a "position information" tag. Furthermore, "English textbook Y, Japanese-English dictionary, English-Japanese dictionary" is denoted in a "carried item" tag as the items necessary for the Yodobashi Cram School. In addition, information such as "today's lecture has been changed to room 3" is denoted in a "notice" tag. In this manner, the XML is accumulated as the tag and that value. On the other hand, a content provider uses this information to provide information. For example, at the Yodobashi Cram School, the class details change with each lecture, and thus the necessary items change as well. Accordingly, a general method of use is one in which the "carried item" tag is posted on the Internet; by viewing this, the user can understand the items needed each day.

On the other hand, in the present fourth embodiment, the causal relationship information, in which the carried item and the corresponding facility are associated, is generated by using the information accumulated in the facility information database 115, and the causal relationship information is accumulated in the causal relationship information accumulation unit 111. As shown in FIG. 48, the "position" tag and the "carried item" tag are indicated in the facility information. By associating these and accumulating them, it is possible to acquire the causal relationship information of the position "longitude 135 degrees, 34 minutes, 30 seconds, latitude 35 degrees, 30 minutes, 10 seconds" of the facility "Yodobashi Cram School" and the carried items "English textbook Y," "Japanese-English dictionary," and "English-Japanese dictionary," as shown in the ID "001." In addition, by using this causal relationship information, it is possible to predict the destination, in which the user is moving towards the Yodobashi Cram School, in the case where the user is carrying these carried items.

Incidentally, the user generally carries a plurality of carried items. Furthermore, among items used at a facility, there are items that are also used at other facilities, and so there are instances where items overlap. Therefore, in the case where a plurality of items is carried, there are times when it is impossible to uniquely isolate the destination. Accordingly, as an example, in the present fourth embodiment, carried items with little or no overlap are accumulated as the causal relationship information, and the item (carried item) that can uniquely isolate the facility is determined.

The specified item judgment unit 112 is a unit that judges the specified item from among the carried items accumulated in the causal relationship information accumulation unit 111. There are instances where overlapping carried items are present in the causal relationship of the carried items and facilities shown in FIG. 49. For example, with the Yodobashi Cram School, because English lectures are carried out, the "Japanese-English dictionary" and "English-Japanese dictionary" are present as necessary items. However, the "English-Japanese dictionary" and "Japanese-English dictionary" are accumulated as carried items for the facility "Hanamachi University" as well. In addition, one of the carried items for the "Hanamachi University" is "writing instruments," and this overlaps with "writing instruments" for a "Hanamachi General Library." In this manner, the carried items in each facility do not necessarily differ; there are cases where they overlap. In this case, for example, even when the user carries the "Japanese-English dictionary" and "writing instruments," it is difficult to predict whether the user will move to the destination of "Yodobashi Cram School," "Hanamachi University," or "Hanamachi General Library." Accordingly, the specified item judgment unit 112 judges the items with no overlap as specified items that can isolate the facility.

For example, in the case of FIG. 49, it can be seen that from among the items "English textbook Y," "Japanese-English dictionary," and "English-Japanese dictionary" from the facility "Yodobashi Cram School," the "English textbook Y" does not overlap with any other facility. Therefore, the "English textbook Y" is judged to be the specified item for "Yodobashi Cram School." In other words, while it is not possible to judge between the "Yodobashi Cram School" and the "Hanamachi University" when the user carries only the "Japanese-English dictionary," it is possible to predict that the user is moving to "Yodobashi Cram School" because the "English textbook Y" is used only at the "Yodobashi Cram School." In the same manner, among the carried items "reference book B," "Japanese-English dictionary," "English-Japanese dictionary," "writing instruments," and "student ID" of the facility "Hanamachi University," the "reference book B" or the "student ID" do not overlap with any other facility, and therefore are judged to be specified items. Also in the same manner, the specified items for the "Hanamachi General Library" are books "Electric Engineering" and "Energy Conservation Methods" borrowed from the library.

The carried item resemblance judgment unit 113 is a unit that judges the degree to which the carried items detected by the carried item detection unit 103 match (or resemble) the causal relationship between the carried items and the facility as accumulated by the causal relationship information accumulation unit 111 and the specified item. Using a result obtained by the carried item resemblance judgment unit 113, the destination prediction unit 107 predicts the destination.

FIG. 50 shows the user's carried items as detected by the carried item detection unit 103. As indicated in FIG. 50, the "English textbook Y," "Japanese-English dictionary," "writing instruments," and "watch" are presently detected as the carried items. In this manner, there are cases where the user carries plural items at one time, rather than just a single item. In addition, this plurality of items does not necessarily completely match with the carried items of a predetermined facility in the causal relationship information. There are instances in which there are not enough carried items, as well as instances in which items not present in the causal relationship information are carried. Accordingly, the carried item resemblance judgment unit 113 judges the degree to which the detected carried items match the causal relationship information. Then, the facility that matches to the highest degree is calculated as the predicted destination by the destination prediction unit 107.

As indicated in FIG. 50, the user's current carried items are the "English textbook Y," "Japanese-English dictionary," "writing instruments," and "watch," and from the causal relationship indicated in FIG. 49, for example, the "Japanese-English dictionary" differs from "Yodobashi Cram School," but the two items "English textbook Y" and "Japanese-English dictionary" match. On the other hand, the two items "Japanese-English dictionary" and "writing instruments" match with the "Hanamachi University." In addition, the one item "writing instruments" matches with the "Hanamachi General Library." However, there is no item that matches with "Sports Gym Excize." Therefore, considering the number of carried items that match, "Yodobashi Cram School" and "Hanamachi University," in which two items match, can be considered to be predicted destinations. Furthermore, in the present fourth embodiment, the specified item is calculated taking into consideration the overlapping of the carried items. Here, from among the matching carried items, the "English textbook Y" is the specified item of the "Yodobashi Cram School." In other words, in this case, the predicted destination is calculated as the "Yodobashi Cram School."

There are instances where the user carries a plurality of items at once, rather than a single item; and the carried items do not necessarily match completely with the carried items of the facility. Accordingly, in the case where the judged specified item is used and the specified item is carried, it is possible to improve the prediction accuracy by assuming the corresponding facility to be the predicted destination.

Figure 51:
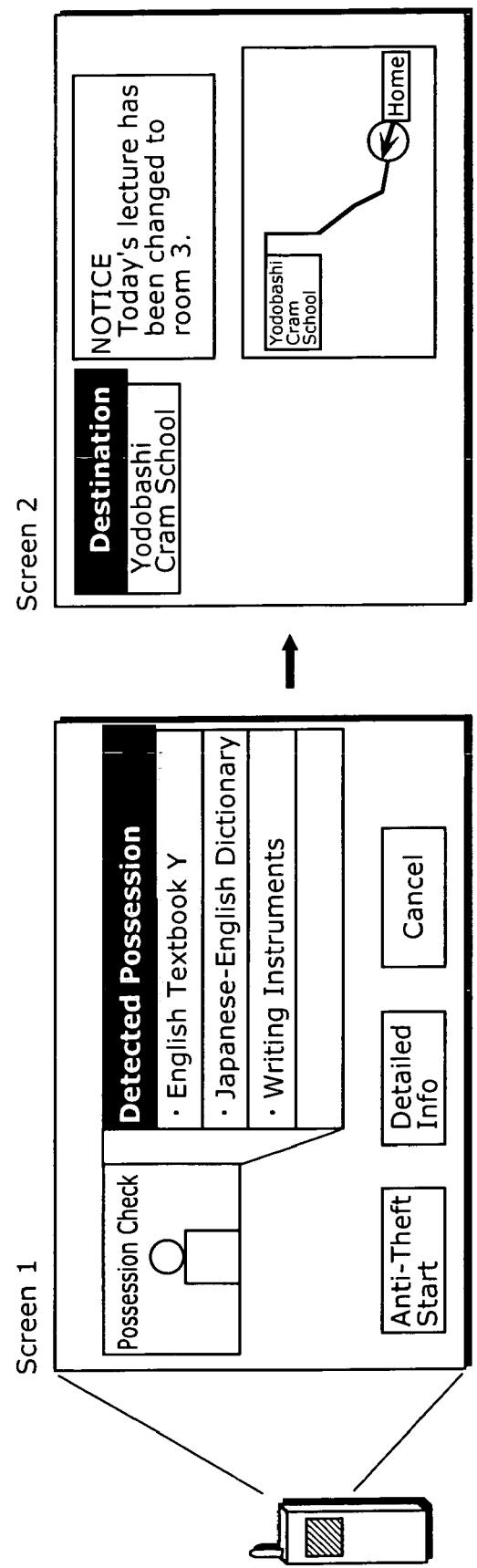
FIG. 51 is a diagram showing a display of information regarding a predicted movement destination in the fourth embodiment.

The information display unit 114 is a unit that displays information regarding the predicted destination, and is, for example, a display unit of a cellular phone. FIG. 51 shows information regarding the predicted destination "Yodobashi Cram School." First, the items the user is carrying are detected through an operation for detecting the user's carried items. In "Screen 1," detection of the carried items "English textbook Y," "Japanese-English dictionary," and "writing instruments," which the user currently carries, is shown. Then, the predicted destination "Yodobashi Cram School" is calculated from the carried items, and information regarding the "Yodobashi Cram School," which is, for example, accumulated in a facility information server 113, is shown in "Screen 2." In "Screen 2," the information regarding the Yodobashi Cram School is shown, such as "today's lecture has been changed to room 3" in the "notice" tag (FIG. 48). In a conventional information display device, it is necessary for the user to access this facility information by him/herself. However, by predicting the destination based on the user's carried items, and providing the information regarding the destination beforehand, it is possible to stimulate the activity of the user. In addition, in a conventional destination prediction apparatus, the destination is generally predicted after considering a certain amount of the user's movement. Therefore, there is a problem in that it is not possible to quickly receive relevant information such as whether or not a facility is closed, even though the user is already en route to that facility. However, by considering the user's carried items, it is possible to predict the destination with more flexible timing, such as, for example, when the user carries the carried items, or when the user finishes packing the carried items in a bag; thus it is possible to receive the provided information in advance with more appropriate timing.

Figure 52:
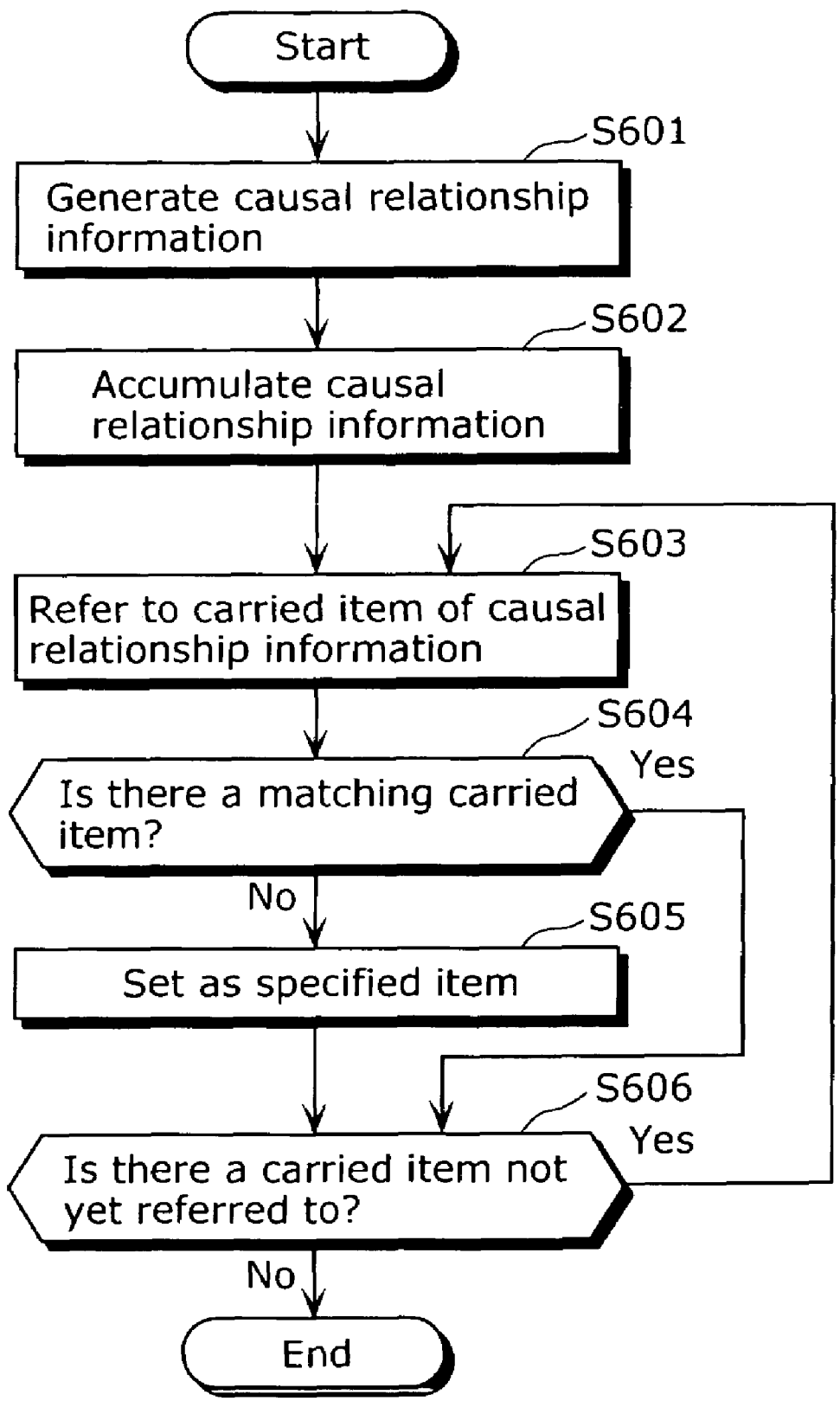
FIG. 52 is a flowchart occurring in judgment of a specified item in the fourth embodiment.
Figure 53:
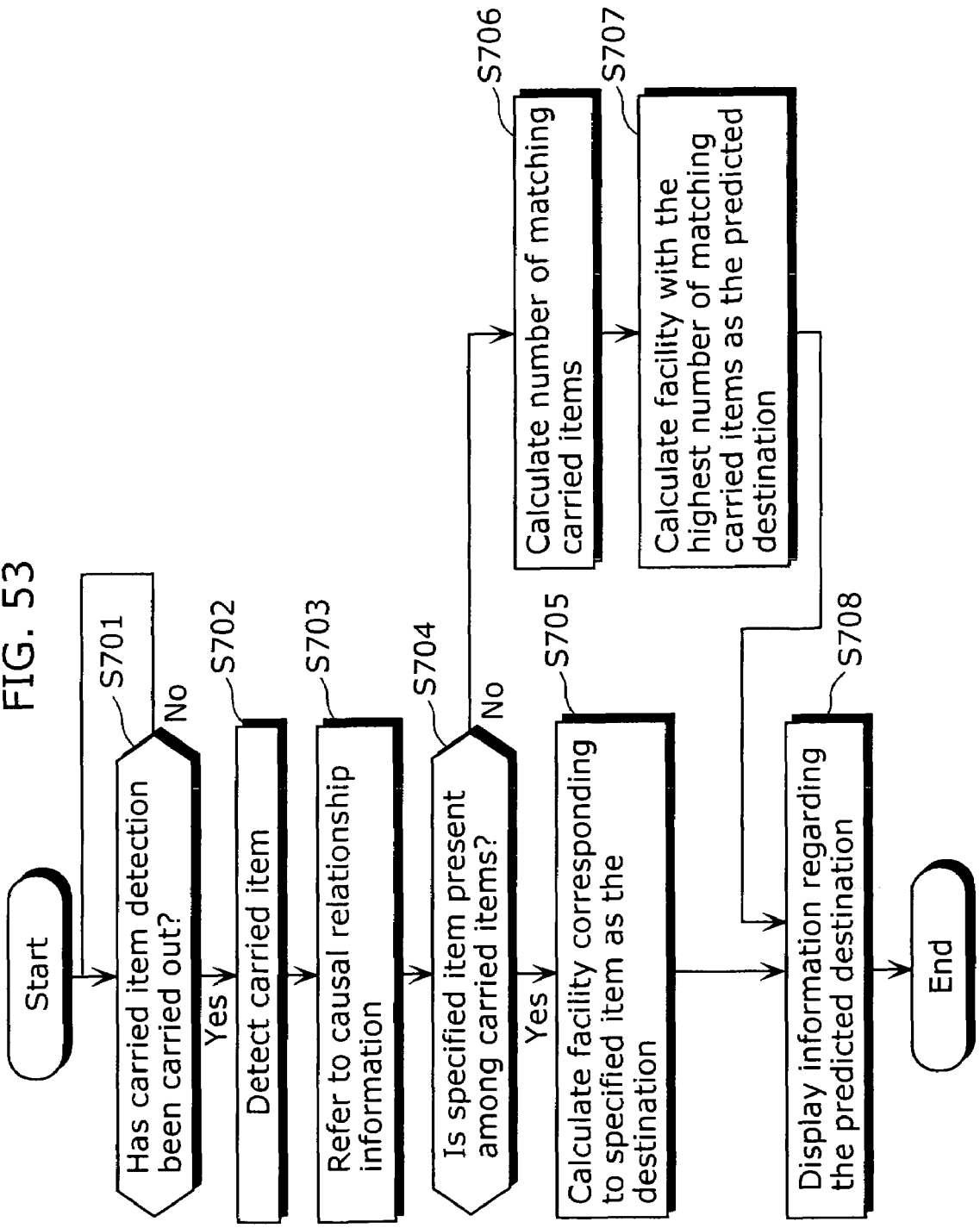
FIG. 53 is a flowchart occurring in prediction of a movement destination in the fourth embodiment.

A process of the mobile terminal 101 according to the present fourth embodiment is described using the flowcharts in FIGS. 52 and 53.

First, the causal relationship information, in which the carried items and the facilities are associated, is generated from the information regarding the facilities that is accumulated in the facility information database (S601), and accumulated in the causal relationship information accumulation unit 111 (S602). Then, referring to the carried items accumulated in the causal relationship information accumulation unit 111 (S603), it is judged whether or not there is overlapping (S604). In the case of overlapping (Yes of S604), the carried item is set as the specified item (S605). Then, this process is repeated for all of the carried items (S606 to S603), and when judgment regarding the specified item has finished for all carried items (No of S606), the process finishes.

On the other hand, in the flow of predicting the destination, first, the carried item detection unit 103 detects the carried items of the user (S701 to S702). Then, the degree of resemblance of the carried items is judged by referring to the detected carried items and the causal relationship information accumulated in the causal relationship information accumulation unit 111 (S703). Note that the degree of resemblance in the present fourth embodiment is judged based on the presence/absence of the abovementioned specified item. It is judged whether or not the specified item is present among the detected carried items (S704), and in the case where the specified item is present (Yes of S704), the destination of this specified item is calculated as the predicted destination (S705). However, in the case where the specified item is not present (No of S704), the number of matching carried items is calculated (S706), and the facility with the highest number of matching carried items is calculated as the predicted destination (S707). Then, the information related to the predicted destination is displayed (S708).

Note that in the present fourth embodiment, in judgment by the carried item resemblance judgment unit 113 of the degree to which the user's carried items match the carried items associated with the facility, identical items are treated as matching, but the embodiment is not limited to this. For example, it is acceptable to use the analogy dictionary of the carried items, such as a carried item used as a substitute, a broader concept, and the like, and judge the matching degree. Hereafter, descriptions are given using the diagrams.

Figure 54:
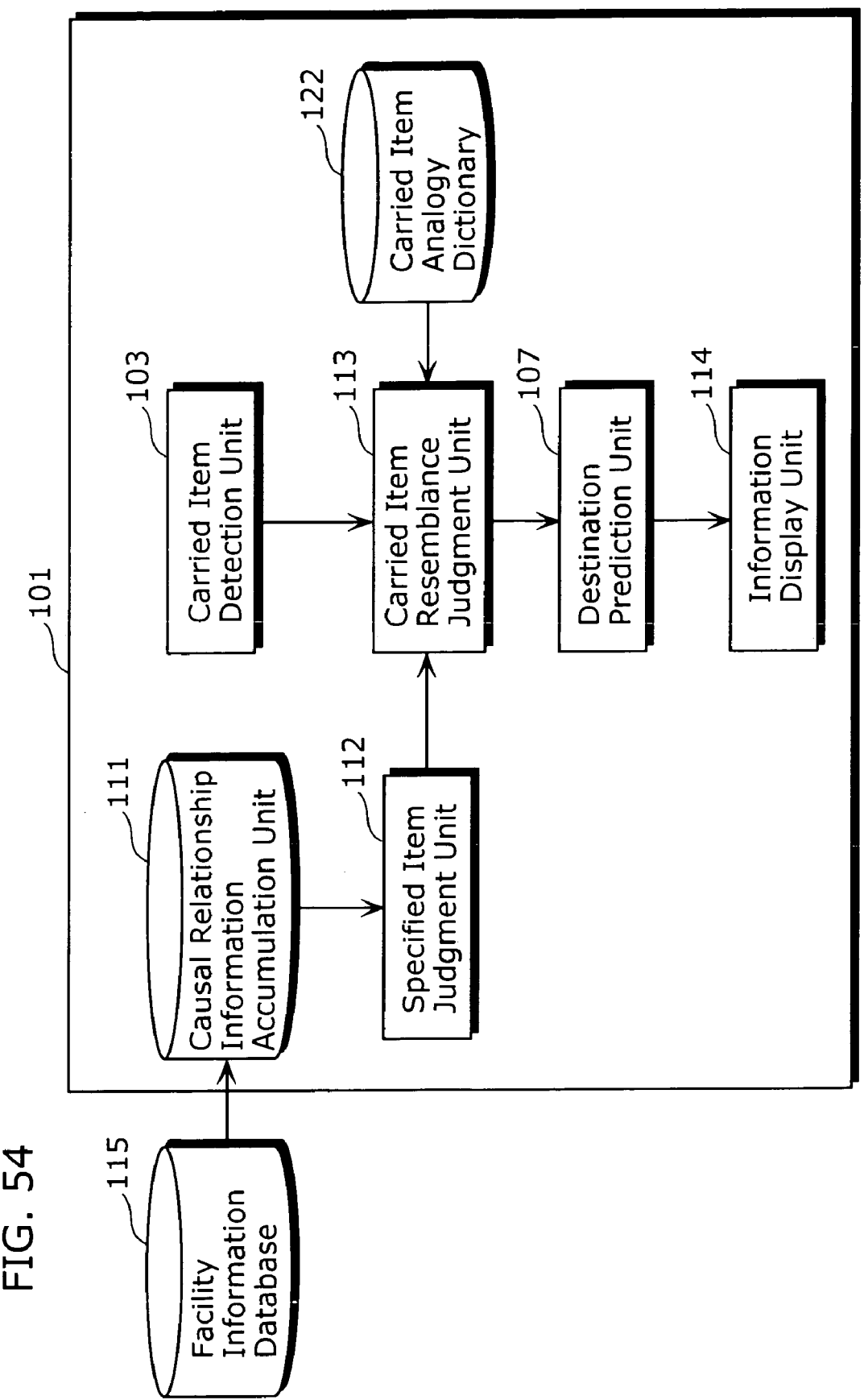
FIG. 54 is a system configuration diagram of a mobile terminal in the fourth embodiment.

FIG. 54 is a different system configuration diagram that uses the mobile terminal 101 according to the present fourth embodiment. The mobile terminal 101 in the present diagram includes a carried item analogy dictionary 122 in addition to the configuration elements shown in FIG. 46. The carried item analogy dictionary 122 is a unit that accumulates, for a certain carried item, a relationship of that carried item, such as a carried item used as a substitute, the broader concept, and the like.

In general, the user carries a plurality of items which have several variations. Therefore, the generated facility and the associated item do not necessarily match. For example, in the causal relationship information shown in FIG. 48, the carried items "English-Japanese dictionary" and "Japanese-English dictionary" are associated with the "Yodobashi Cram School." However, depending on the user, there are cases where an integrated "Japanese-English/English-Japanese dictionary" is used, as well as cases where an electronic dictionary is used. Accordingly, the carried item analogy dictionary 122 accumulates these substitute carried items and the like and the uses the analogy dictionary to judge the matching degree.

FIG. 55 shows a corresponding relationship of the carried items accumulated by the carried item analogy dictionary 122. For example, the Japanese-English dictionary and English-Japanese dictionary are accumulated as carried items of the same type. That is, the Japanese-English dictionary can be thought of as an item of the same type because it is used in an English class and the like. Furthermore, in place of the Japanese-English dictionary and the English-Japanese dictionary, it is possible to use the electronic dictionary or the Japanese-English/English-Japanese dictionary, which therefore are associated as substitute carried items. In such a manner, in the environment where tags are given to all items, because the items for isolating the destination may be plural as opposed to just a single item, and furthermore, because using a substitute carried item as the item that fulfills the role of the carried item can be considered, it is possible to more universally predict the destination of the user by using the carried item analogy dictionary.

For example, as shown in FIG. 56, the "English textbook Y," "electronic dictionary," "writing instruments," and "watch" are detected as the user's carried items. In this case, while the "electronic dictionary" is not the "Japanese-English dictionary" or the "English-Japanese dictionary," based on the carried item analogy dictionary 122, the "electronic dictionary" is the substitute carried item for the "Japanese-English dictionary" and the "English-Japanese dictionary," and therefore it is possible to predict movement to the "Yodobashi Cram School." Note that in the present fourth embodiment, judgment of the resemblance degree in the carried item resemblance judgment unit 113 is carried out based on the number of matching carried items, the presence/absence of the specified item, and the like, but the embodiment is not limited to this. It is also acceptable to set a degree of importance on the carried item which reflects a strength of a causal relationship, the carried item having the causal relationship with a predetermined facility and the like, and use this degree of importance to predict the destination.

FIG. 57 is the causal relationship information accumulated in the causal relationship information accumulation unit 111, and shows the degree of importance given to the carried items. For example, the carried item "English textbook Y," which is associated with the "Yodobashi Cram School" that has an ID "001," is given the degree of importance of 10, and the "Japanese-English dictionary" and "English-Japanese dictionary" are given the degree of importance of 3. Or, the carried item "reference book B," which is associated with the "Hanamachi University" that has the ID "002," is given the degree of importance of 5, and the "Japanese-English dictionary" and the "English-Japanese dictionary" are given the degree of importance of 3. The matching degree of the facility is calculated from the total sum of these degrees of importance. For example, the user is presently carrying the "English textbook Y" and the "Japanese-English dictionary." In this case, the matching degree with the "Yodobashi Cram School" is "13 (=10+3)," and the matching degree of the "Hanamachi University" is "3"; therefore, it is possible to predict that the user is moving toward the "Yodobashi Cram School," which has the higher matching degree. In addition, rather than the simple sum of the degrees of importance and the carried items, it is acceptable to initially calculate the degree of importance when a combination of a plurality of carried items matches. For example, the carried items "jersey," "sports shoes," "tennis balls," and "racket" are present for the "Sports Gym Excize" of the ID "004," but based only on one of these items, it cannot necessarily be thought that the user is moving toward the gym. For example, the user may simply be wearing the jersey. In addition, depending on the carried item, there are items which only function when a plurality of carried items are assembled. For example, even when the user carries the "racket," he/she cannot play tennis without the "tennis balls," so it is unlikely that he/she is moving toward the "Sports Gym Excize." Accordingly, for example, it is acceptable for the degree of importance of "10" to be calculated only in the case where the all the carried items "jersey," "sports shoes," "tennis balls," and "racket" are present (note that this is indicated by the star symbol), and to predict that the user is moving toward the "Sports Gym Excize."

Note that these degrees of importance may be set in advance, or, as is shown in the aforementioned first embodiment, a history of the user's position and carried items can be accumulated, and using this history, the degree of importance may be changed for each user. Hereafter, FIGS. 58 and 59 are used for description.

FIG. 58 shows the accumulated carried items and the position information. As shown in the aforementioned first embodiment, the carried items detected by the carried item detection unit 103 are associated with the user's position information as detected by a position information detection unit 102, and by accumulating this in a history accumulation unit 104, the history of the carried items and the detected position is accumulated. For example, it can be seen that the carried items "reference book B," "Japanese-English dictionary," "student ID," and "laptop PC" are detected at a position "longitude 135 degrees 36 minutes 30 seconds, latitude 35 degrees, 36 minutes, 10 seconds" which is the facility "Hanamachi University." In addition, it can be seen that these carried items "reference book B," "Japanese-English dictionary," "student ID," and "laptop PC" have been carried a plurality of times at the Hanamachi University. In other words, in the case where the user shown in the present example attends a lecture at the "Hanamachi University," he/she constantly carries not only the "reference book B," "Japanese-English dictionary," and "student ID," but also the "laptop PC." On the other hand, in the aforementioned causal relationship between the carried items at "Hanamachi University," the carried items are the "reference book B," "Japanese-English dictionary," "English-Japanese dictionary," "writing instruments," and "student ID" (FIG. 57), and in this manner, the causal relationship information that is set in advance does not necessarily match with the items the actual user normally possesses at the facility. Accordingly, this causal relationship information is changed based on the history of the user's carried items.

FIG. 59 reflects the history. It can be seen that the "laptop PC" has been added to the "reference book B" and so on as the carried item for the "Hanamachi University" of the ID "002."

In the environment where tags are given to a variety of items and the plurality of carried items is detected, the detected items are not necessarily common for all users. Accordingly, as shown in the present example, it is acceptable to accumulate the history per user and cause the content to reflect this history. Thus it becomes possible to predict the destination while further considering a characteristic of the carried item of the user.

As described above, with the mobile terminal 101 according to the present 4th embodiment, the specified item judgment unit 112 judges, from among the user's carried items, the specified item which is a carried item that does not overlap in a plurality of destinations, and it is possible for the destination prediction unit 107 to use this specified item to predict the destination.

Fifth Embodiment

Next, a destination prediction apparatus according to the fifth embodiment of the present invention is described.

In the abovementioned fourth embodiment, a method is described in which a destination of a user is predicted using causal relationship information of a facility and a carried item. However, there are cases where, for example, a plurality of destinations are predicted based on the carried item at a certain point in time, and it is not necessarily possible to uniquely specify the destination. For example, there is the case where because the user presently carries a "Japanese-English dictionary," a plurality of destinations, such as "Yodobashi Cram School" and "Hanamachi University," are predicted, and it cannot be determined which of the destinations the user is moving toward. However, depending on an activity of the user after this, it is ultimately possible to calculate one of the destinations as a predicted destination. Accordingly, in the present fifth embodiment, a method in which a movement of the user is further detected and the destination is accurately predicted, is described.

Figure 60:
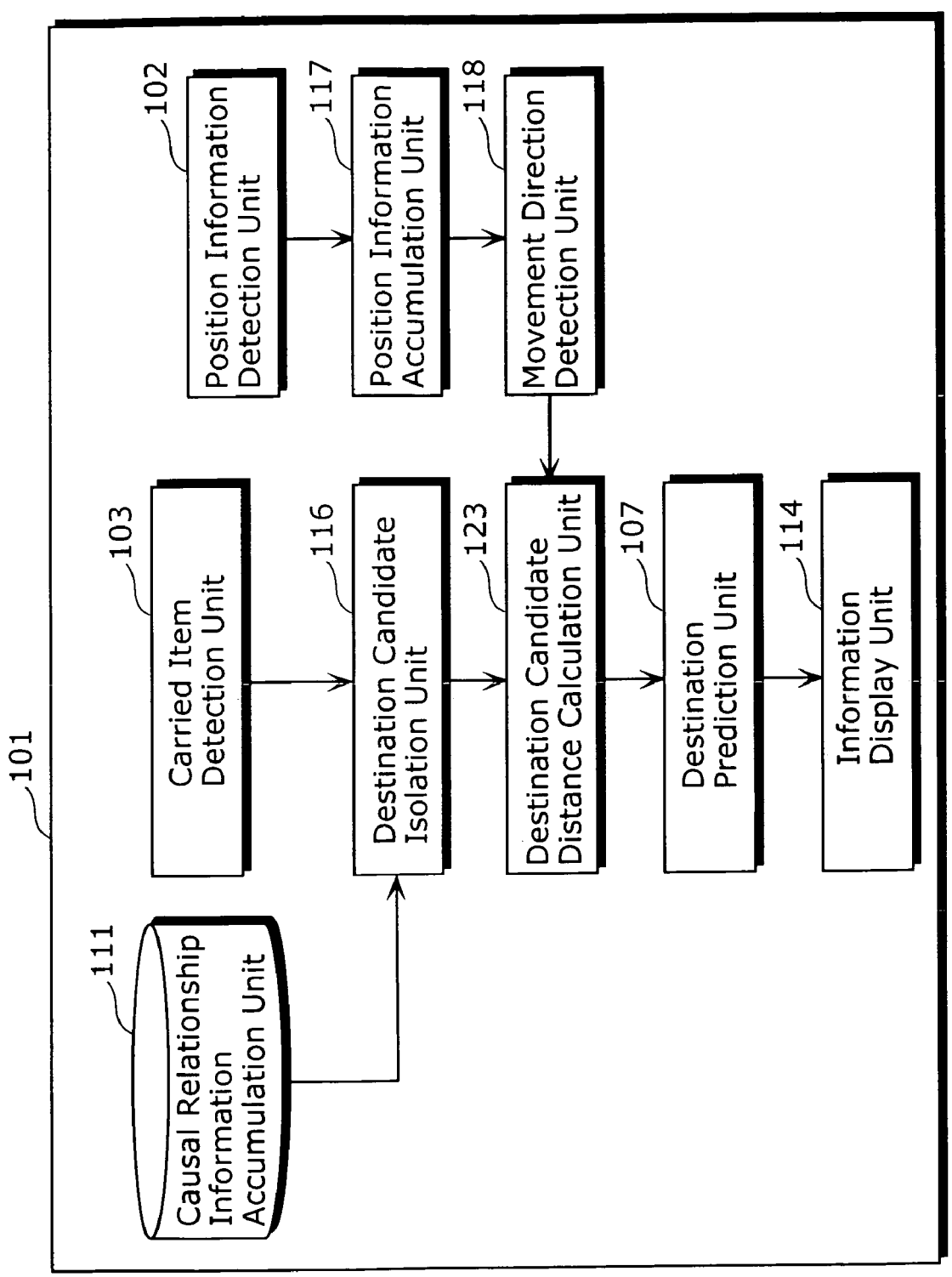
FIG. 60 is a system configuration diagram of a mobile terminal in the fifth embodiment.

FIG. 60 is a system configuration diagram of a mobile terminal 101 according to the present fifth embodiment. Configuration elements that are shown in the previous embodiments are given the same numbers, and descriptions are omitted.

A destination candidate isolation unit 116 is a unit which isolates a destination candidate from the carried item of the user detected by a carried item detection unit 103 and causal relationship information of the carried item and a facility. For example, presently, the carried item detection unit 103 detects a "Japanese-English dictionary" and an "English-Japanese dictionary" as the user's carried items, as shown in FIG. 61B. Using these detected carried items, the destination candidates are isolated from the causal relationship information of the carried items and the facilities. FIG. 61 shows the causal relationship information of the carried items and the facilities as accumulated in a causal relationship information accumulation unit 111.

Here, the destination candidate isolation unit 116 isolates the facilities "Yodobashi Cram School" and "Hanamachi University" as including the detected carried items "Japanese-English dictionary" and "English-Japanese dictionary," as shown in FIG. 61A. However, at the present stage, it is impossible to judge which destination the user will move toward. Accordingly, the user's subsequent movement is taken into consideration, a final predicted destination is isolated, and information regarding the destination is provided.

A position information detection unit 102 is a unit that detects a position of the user, in the same manner as in the previous embodiments, and is configured of, for example, a GPS and the like.

In addition, a position information accumulation unit 117 is a unit that accumulates detected position information, and furthermore, a movement direction detection unit 118 detects a movement direction of the user form the accumulated position information. For example, it is possible to calculate a direction in which the user is moving from a difference between the current position information and the position information detected previously, and the movement direction detection unit 118 detects the movement direction of the user. In addition, it is possible to calculate a distance to these facilities from the position information of the plurality of destination candidates isolated by the destination candidate isolation unit 116; judge, for example, the facility which the user is approaching as the facility the user is moving toward; and predict that facility as the destination. Hereafter, a specific example is used for description.

Figure 62:
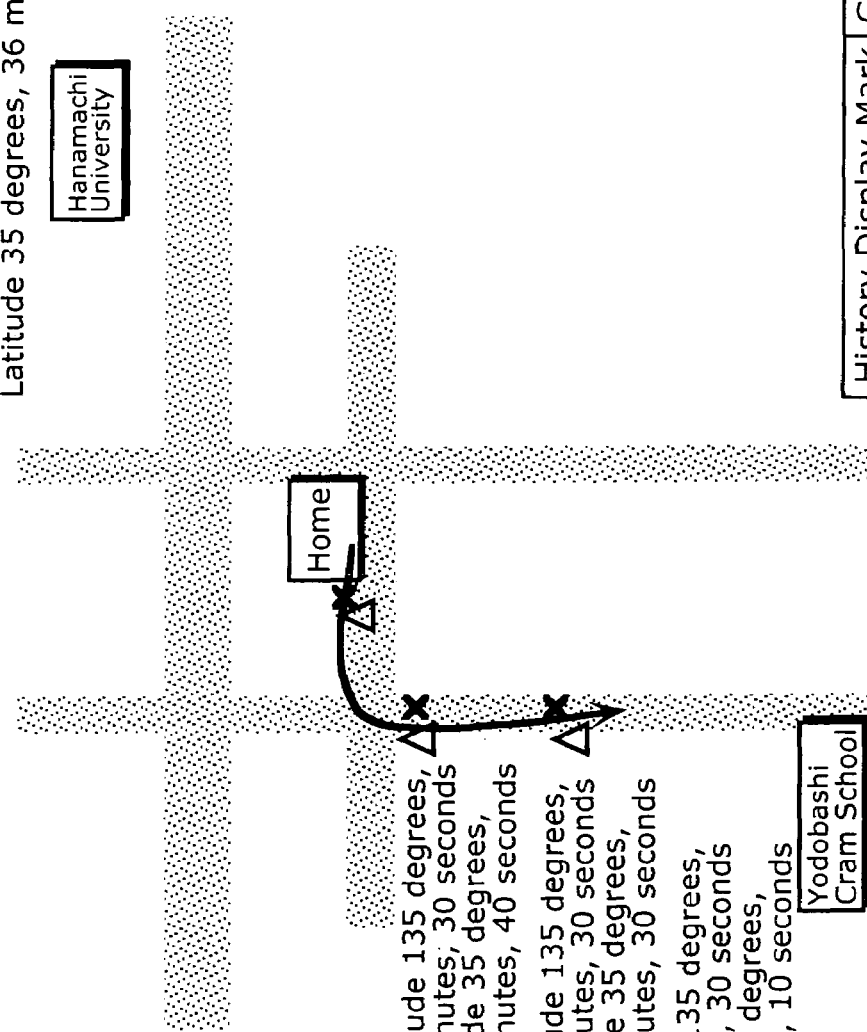
FIG. 62 is a diagram showing a movement direction of the user in the fifth embodiment.

FIG. 62 shows, on a map, the detected current position of the user and the positional relationship with "Yodobashi Cram School" and "Hanamachi University." For example, the user is detected as currently being in position "longitude 135 degrees 34 minutes 30 seconds, latitude 35 degrees 30 minutes 30 seconds" while carrying the "Japanese-English dictionary" and the "English-Japanese dictionary." However, "Hanamachi University" is located at "longitude 135 degrees 36 minutes 30 seconds, latitude 35 degrees 36 minutes 10 seconds," and "Yodobashi Cram School" is located at "longitude 135 degrees 34 minutes 30 seconds, latitude 35 degrees 30 minutes 10 seconds," and it is possible to acquire the position information of these facilities from the causal relationship information accumulated in the causal relationship information accumulation unit 111. Furthermore, it is possible to calculate the direction the user is moving in from the previous position information accumulated in the position information accumulation unit 117. For example, a previous detected position is "longitude 135 degrees 34 minutes 30 seconds, latitude 35 degrees 30 minutes 40 seconds." In this case, it is possible to judge that the user is moving from north to south. Furthermore, from the direction and detected position, the distance to "Yodobashi Cram School" is growing smaller, and therefore it is possible to judge that the user is moving toward the "Yodobashi Cram School."

On the other hand, there are many cases where the items the user normally carries are plural, rather than being limited to one. In addition, the carried items with a causal relationship to a facility, in that the items are used at a certain facility and so on, may be plural, and it may not be possible to isolate a single destination from the user's carried items. There are cases where there are not enough carried items, or cases where a carried item which does not exist in the causal relationship is present. Accordingly, in the present fifth embodiment, plural destination candidates are isolated, and by further detecting the subsequent activity of the user, it is possible to more accurately detect the destination.

Note that it is also possible to predict the destination using information in which the user does not currently carry a carried item, but subsequently carries a carried item that has the causal relationship, as opposed to only information simply of whether or not the user is moving toward the facility. For example, in the case of the abovementioned example, the carried items which the user currently carries are the "English-Japanese dictionary" and the "Japanese-English dictionary," so it cannot be determined whether the user is going to "Yodobashi Cram School" or to "Hanamachi University." For example, it is possible to predict the "Yodobashi Cram School" when the user carries the "English textbook Y" which has the causal relationship with the "Yodobashi Cram School," but there are cases where, for example, this "English textbook Y" has been left at the Cram School. Or, it is possible to predict that the user will later move toward the "Yodobashi Cram School" if it can be seen that while the user is not currently carrying the "English textbook Y," he/she is moving to acquire the textbook. In other words, it is possible to more accurately predict the destination by taking into consideration the position of an item with a causal relationship with the facility, and the position of the user, rather than only the carried items the user currently carries. Accordingly, in the present fifth embodiment, a method is described in which the user's current carried items and, furthermore, a item the user is not carrying (non-carried item) are detected, and the destination is predicted taking into consideration a positional relationship between the user and the non-carried item.

Figure 63:
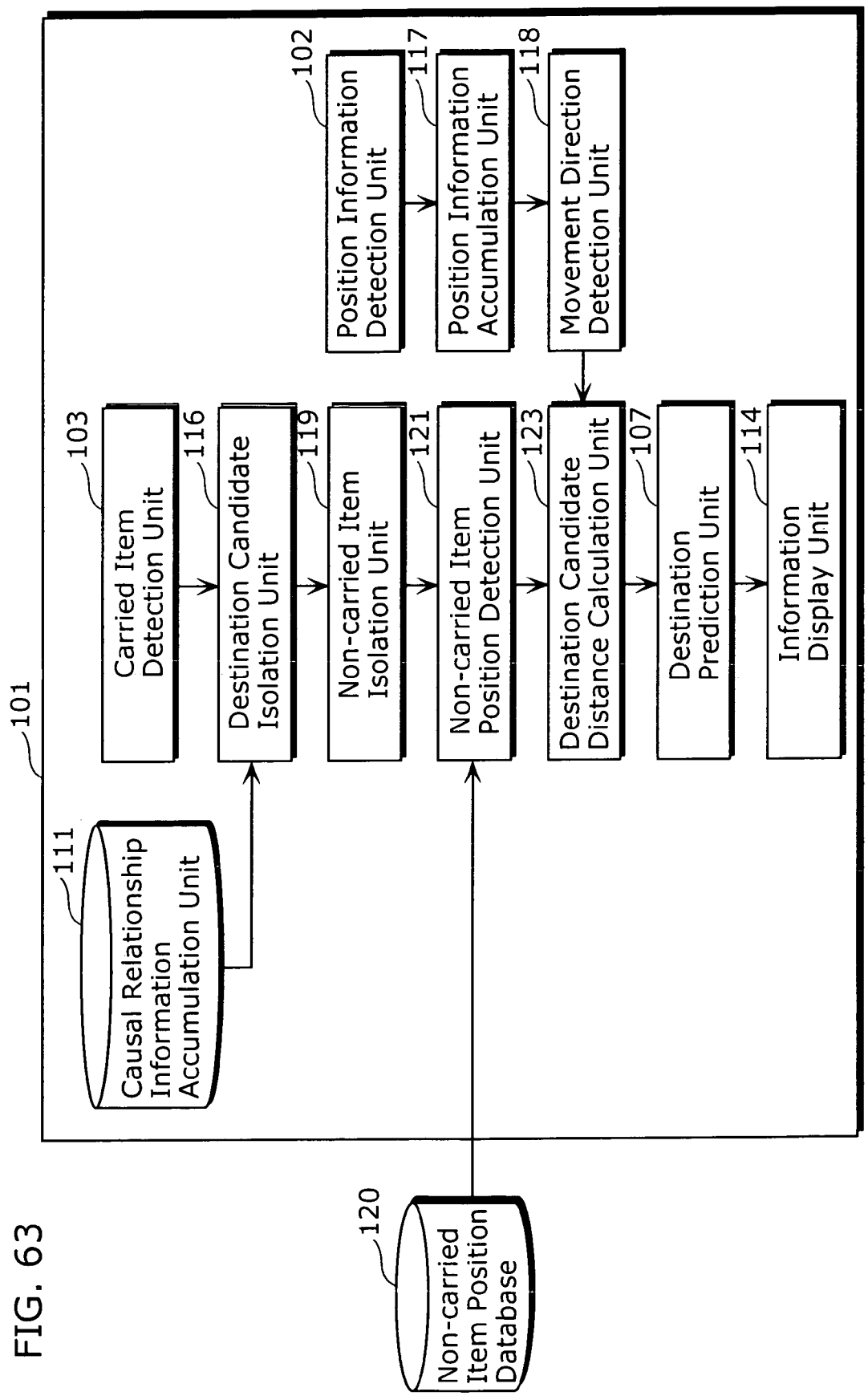
FIG. 63 is a system configuration diagram of a mobile terminal in the fifth embodiment.

FIG. 63 is a different system configuration diagram of the mobile terminal 101 according to the present fifth embodiment. Configuration elements that are shown in the previous mentioned embodiments are given the same numbers, and descriptions are omitted.

A non-carried item isolation unit 119 is a unit which isolates the carried item not detected by the carried item detection unit 103, or, in other words, the non-carried item which is not carried at present, from among the carried items that have a causal relationship with the predicted destination isolated by the destination candidate isolation unit 116.

For example, as is shown in FIG. 64B, the user presently carries the "Japanese-English dictionary" and the "English-Japanese dictionary." However, from causal relationship information shown in FIG. 64A, in the case where user carries the "Japanese-English dictionary" and the "English-Japanese dictionary," as previously mentioned, the destination candidate isolation unit 116 specifies that the user is moving to "Yodobashi Cram School" or "Hanamachi University." However, it is currently not possible to judge which facility from among these plural destinations the user is moving toward. Accordingly, an item which the user is not currently carrying but is valuable in isolating the destination (the non-carried item) is judged. For example, in the case where the user moves toward the "Yodobashi Cram School," in addition to the "Japanese-English dictionary" and the "English-Japanese dictionary," the "English textbook Y" is necessary as the carried item; however, the user does not carry this "English textbook Y" and thus it is judged as the non-carried item. On the other hand, in the case where the user moves toward the "Hanamachi University," in addition to the "Japanese-English dictionary" and the "English-Japanese dictionary," the "reference book B" is necessary as the carried item; however, the user does not carry this "reference book B" and thus it is judged as the non-carried item. Next, the current position of these non-carried items is detected.

A non-carried item position detection unit 121 is a unit that detects the current position of the non-carried item that is isolated by the non-carried item isolation unit 119. For example, the items that the user possesses are managed by a server or the like, and in the current fifth embodiment, are managed by a non-carried item position database 120. The position of the non-carried items is isolated through the non-carried item position database.

The non-carried item position database 120 associates the detected items that the user possesses with the position and accumulates this information. FIG. 65 shows the positions of the items the user carries as accumulated in the non-carried item position database. For example, an item ID "001" has the item "English textbook Y," and the current position of that item is shown as "longitude 135 degrees 34 minutes 30 seconds, latitude 35 degrees 30 minutes 10 seconds." Or, the item ID "002" has the item "reference book B," and the current position of that item is shown as "longitude 135 degrees 35 minutes 10 seconds, latitude 35 degrees 33 minutes 10 seconds."

Note that in recent years, due to the appearance of an IC tag and the like which is given to an item, many items are given identifiers, and it has thus become possible to manage the items. Furthermore, through a tag reader installed in a variety of places, such as one's own home, it is possible to manage positions of these items through a server and the like. In such an environment, a conventional invention that, for example, detects a forgotten item, detects a stolen item, and so on by detecting the items in one's own home, has been disclosed. The non-carried item database according to the present method is applicable to a server that manages these items, and because a method for constructing such a server has been conventionally disclosed, it is of no immediate concern.

Figure 66:
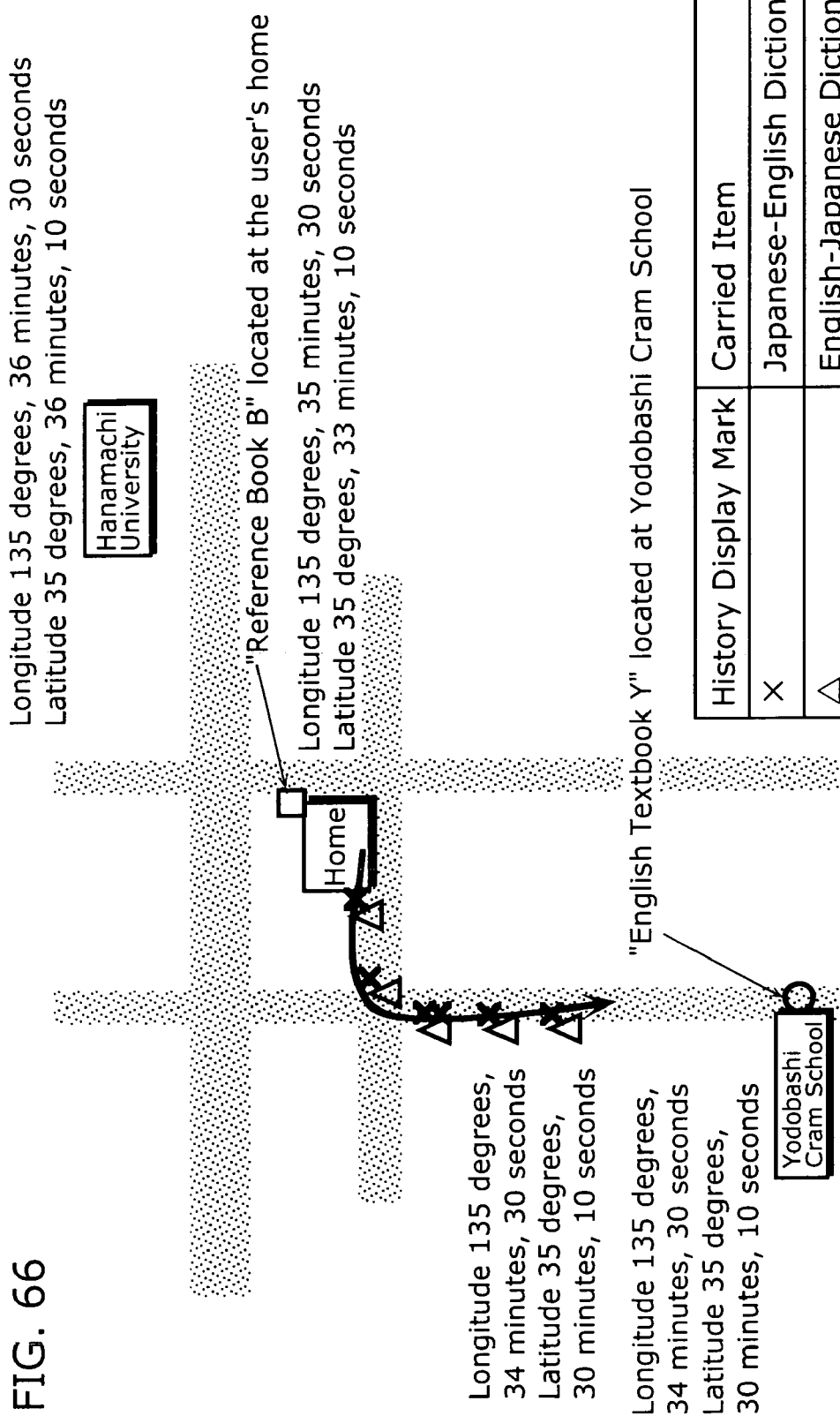
FIG. 66 is a diagram showing a movement direction of a user in the fifth embodiment.

FIG. 66 shows a position relationship of the aforementioned non-carried items, a position relationship in accordance with the user's movement, and so on, on a map. In FIG. 66, a white circle is the "English textbook Y," and it can be seen that it is located at the "Yodobashi Cram School." This shows that, because the user normally leaves the "English textbook Y" at the facility where it is normally used, which is the "Yodobashi Cram School," the "English textbook Y" is positioned at the "Yodobashi Cram School," rather than moving with the user.

On the other hand, a white square is the "reference book B," and it can be seen as being located at the user's own home. Also, from the current movement of the user, it can be seen that the "reference book B" is left at the user's own home.

Normally, in the case where the user moves toward a predetermined facility, there are many instances where the user moves while carrying items to be used at that facility, and in the present invention, it has been shown that it is possible to accumulate this as the causal relationship information, and predict the destination using this causal relationship information. On the other hand, the user does not necessarily move while holding these items. For example, in the present example, there are cases where the "English textbook Y," which is the carried item that has a causal relationship with the Yodobashi Cram School, has been left at the Cram School. Therefore, the item cannot be detected by the carried item detection unit 103, and thus it is difficult to accurately predict the destination. Accordingly, by judging these items to be non-carried items and referring to the non-carried item database which has accumulated information that manages the items, For example, in the case of FIG. 66, plural candidates of "Yodobashi Cram School" and "Hanamachi University" are calculated as the destination candidates based on the currently carried "Japanese-English dictionary" and "English-Japanese dictionary." However, because the non-carried item "reference book B" has been left at home and is separated from the user's current position, it cannot be thought that the user is moving toward "Hanamachi University." In addition, because the user is approaching the "English textbook Y" in the position relationship, it is possible to predict that the user is moving toward the "Yodobashi Cram School."

Figure 67:
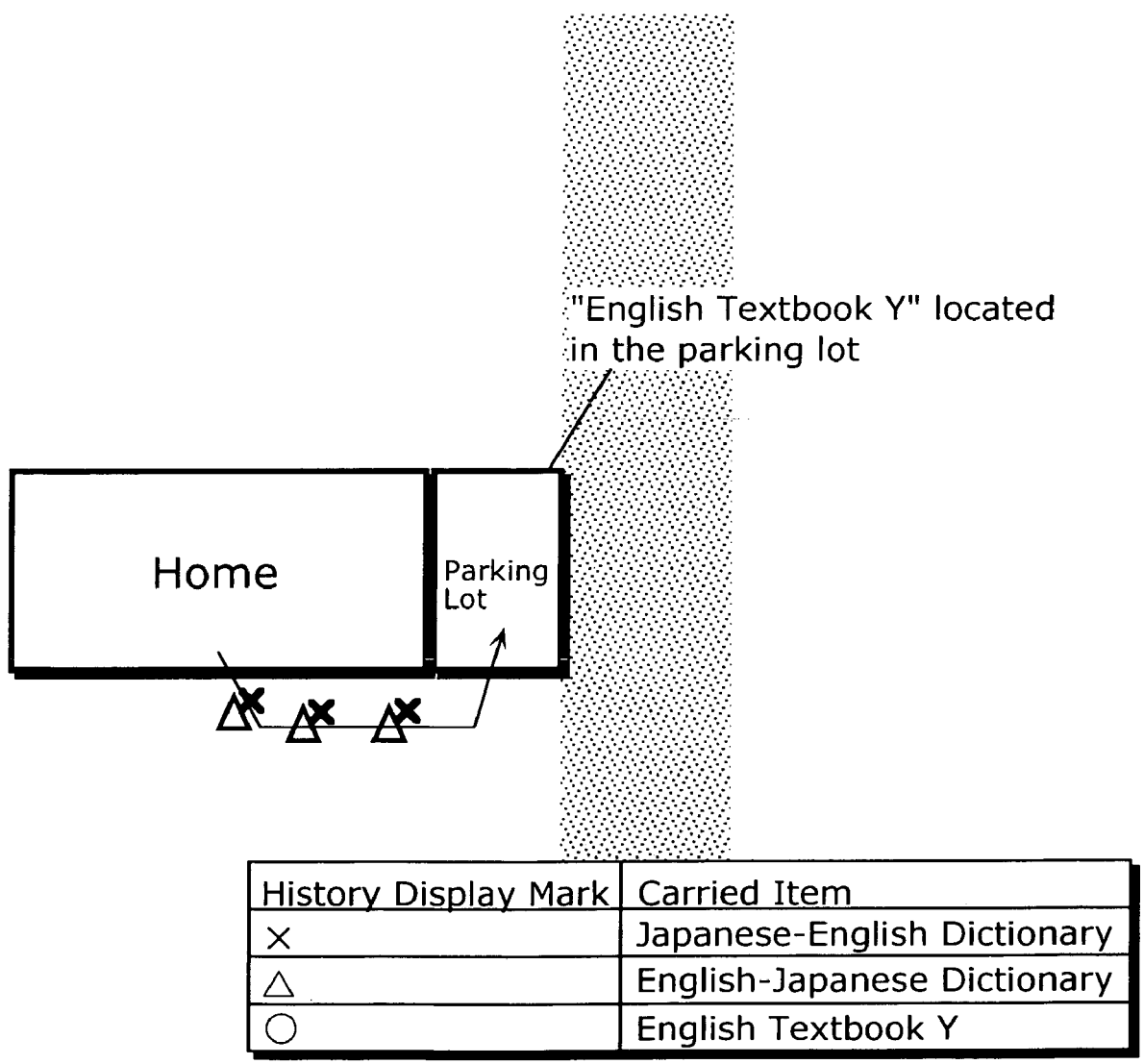
FIG. 67 is a diagram showing a positional relationship between a non-carried item and a user in the fifth embodiment.

FIG. 67 is a diagram for describing a different example. For example, the user is shown as currently carrying the carried items "Japanese-English dictionary" and "English-Japanese dictionary" while moving toward a parking lot of his/her own home. With only the "Japanese-English dictionary" and "English-Japanese dictionary," it is, as above, not possible to specify between the "Yodobashi Cram School" and the "Hanamachi University." However, from the non-carried item position database, the "English textbook Y" is calculated as being present inside a car in the parking lot. In this case, the user carries the "Japanese-English dictionary" and the "English-Japanese dictionary" while moving toward the parking lot where the "English textbook Y" is present, and therefore, in other words, it is possible to assume that the user will move, in the car, toward the "Yodobashi Cram School," which is where these carried items are used.

In this manner, it is possible to predict the destination of the user in a more flexible manner from a position relationship between the user and the position of the non carried item, by isolating the non-carried item used to predict the destination and referring to that position, rather than from only the carried items the user currently carries.

Figure 68:
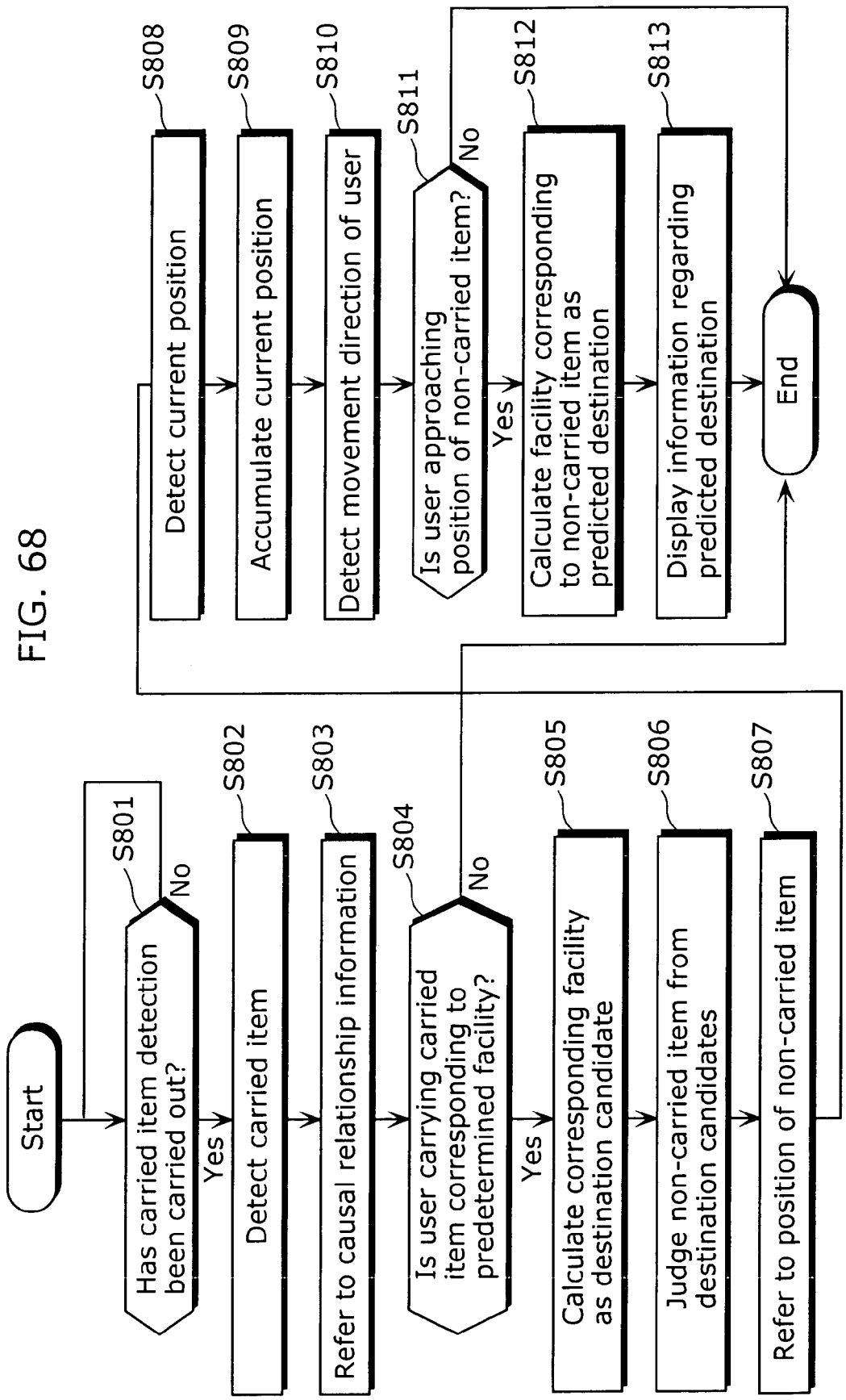
FIG. 68 is a flowchart of when a movement destination is predicted using a non-carried item in the fifth embodiment.

Hereafter, the flowchart in FIG. 68 is used to describe an operational flow of the present fifth embodiment.

First, the carried item detection unit 103 detects the carried item of the user (S801). Then, when the carried item is detected (S802), the causal relationship information accumulated in the causal relationship information accumulation unit 111 is referred to (S803), and it is judged whether or not the user carries a carried item that corresponds to a predetermined facility (S804). When there is no corresponding carried item (No of S804) the process finishes. However, in the case where there is a corresponding carried item (Yes of S804), the destination candidate isolation unit 116 isolates these as the destination candidates (S805).

Next, the non-carried item isolation unit 119 judges the non-carried items which the user is not currently carrying from the causal relationship information of the isolated destination candidates (S806). The position of the isolated non-carried item is referred to in the non-carried item database 120 (S807). Then, the position relationship between the user and the non-carried item is judged.

First, the current position detection unit 103 detects the position of the user (S808). This information is accumulated in the position information accumulation unit 117 (S809), and from the accumulated position information, the movement direction detection unit 118 detects the movement direction of the user (S810). Taking into consideration the position relationship of the non-carried item detected in S807, it is judged whether or not the user is currently approaching the non-carried item (S811). In the case where the user is approaching (Yes of S811), the facility that has a causal relationship with the corresponding non-carried item is calculated as the predicted destination (S812). Then, the information regarding the specified predicted destination is displayed (S813).

On the other hand, in the case where the user is not approaching any of the non-carried items, the destination cannot be specified, and the process finishes (No of S811).

Note that the non-carried item is described as being an item which the user is not currently carrying, but the embodiment is not limited to this. The non-carried item may be a substitutable item, an item the user will purchase, and so on.

In addition, it is acceptable to accumulate a history of the carried items and the position information detected in accordance with the movement of the user, and in the case where the user moves away from the carried item, by automatically registering that position, creating the non-carried item position database.

Figure 69:
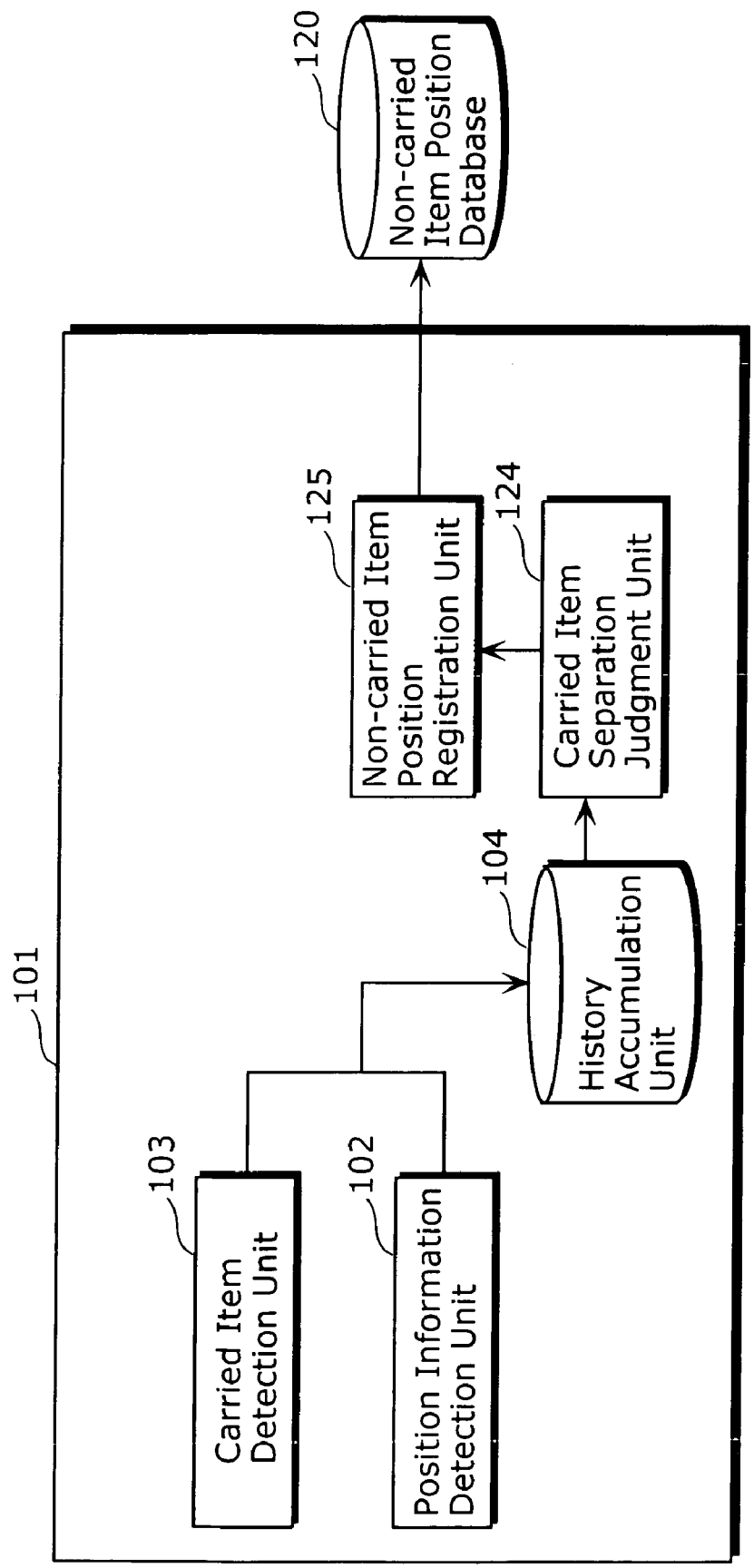
FIG. 69 is a system configuration diagram of a mobile terminal in the fifth embodiment.

FIG. 69 is a different system block diagram of the mobile terminal 101 that includes configuration elements necessary for creating the non-carried item position database. In addition to the position information detection unit 102, carried item detection unit 103, and history accumulation unit 104 shown in the aforementioned embodiments, there is a carried item separation judgment unit 124 and a non-carried item position registration unit 125, which create the non-carried item position database 120.

In creating the non-carried item position database, first, in the same manner as the aforementioned first embodiment, the items the user presently carries are detected by the carried item position detection unit 103, and the position of the user is detected by the position information detection unit 102; these are associated with one another and accumulated in the history accumulation unit 104.

Figure 71:
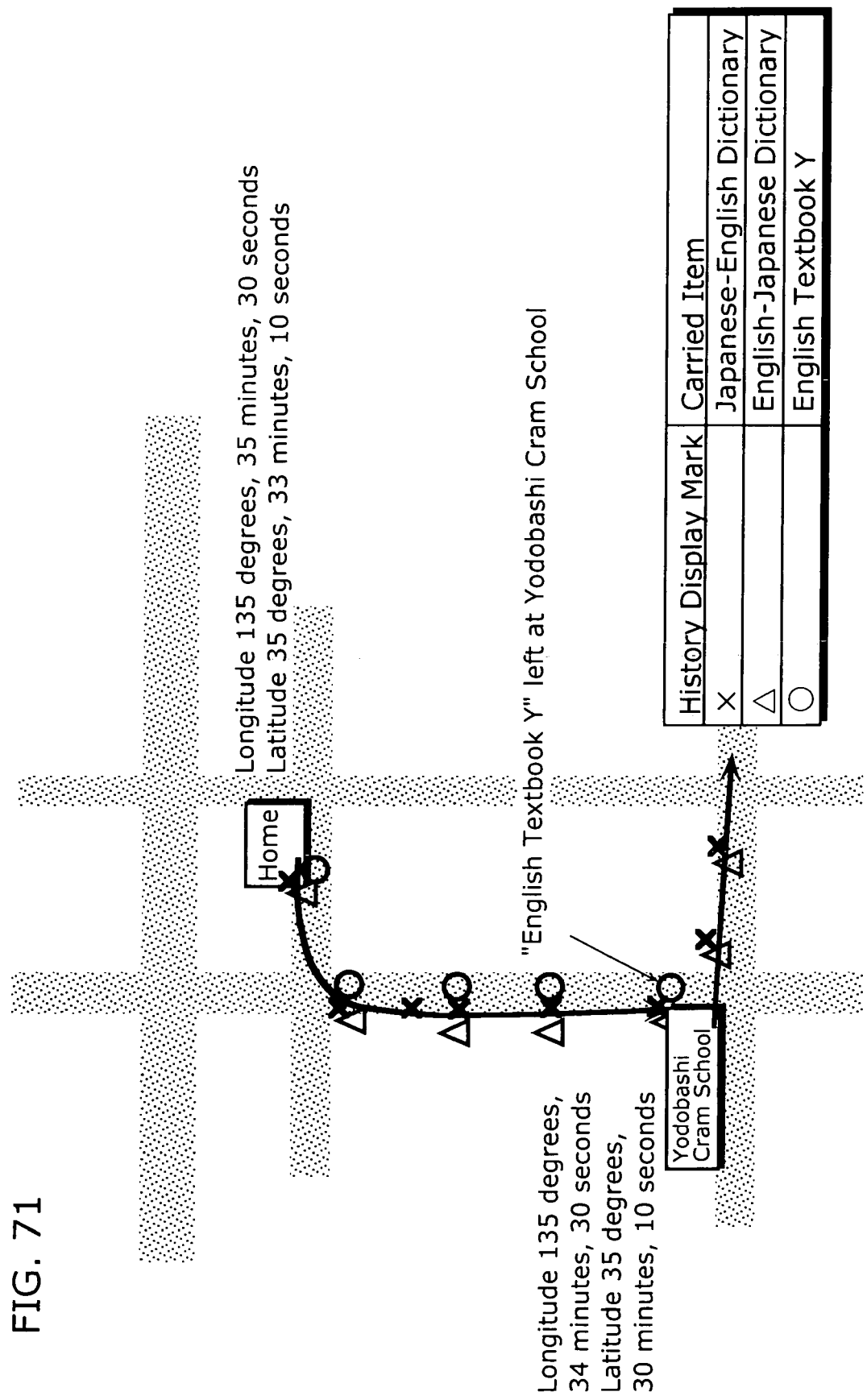
FIG. 71 is a diagram showing a separation of a carried item in the fifth embodiment.

FIG. 70 is the history of the movement of the user and the carried items the user carries at that time, as accumulated in the history accumulation unit 104. For example, the history in which the user leaves "home" which is the position "longitude 135 degrees 35 minutes 30 seconds, latitude 35 degrees 33 minutes 10 seconds" and moves to "Yodobashi Cram School" which is the position "longitude 135 degrees 34 minutes 30 seconds, latitude 35 degrees 30 minutes 10 seconds," is accumulated. In addition, the user carries the "English textbook Y," "Japanese-English dictionary," and "English-Japanese dictionary" while moving. On the other hand, it can be seen that upon arriving at the "Yodobashi Cram School," the "English textbook Y" is not detected, and the user is moving while carrying only the "Japanese-English dictionary" and "English-Japanese dictionary." This shows that the user in the present example has left the "English textbook" at the "Yodobashi Cram School," and thus the "English textbook" is not detected thereafter. FIG. 71 shows the carried items of FIG. 70 and the movement history of the user on a map. It can be seen that the user departs his/her house carrying the "English textbook Y," "Japanese-English dictionary," and "English-Japanese dictionary" and arrives at the "Yodobashi Cram School." However, it can be seen that after this, the user leaves the "English textbook Y" and once again starts moving carrying only the "Japanese-English dictionary" and "English-Japanese dictionary." In this manner, there are instances where the user purchases or leaves items midway and moves, rather than always carrying the items, and therefore these items are not detected and become non-carried items, as in the history in FIG. 70. Accordingly, in this kind of case in which the item is not detected, it is judged to be the non-carried item by the carried item separation judgment unit 124, and by registering, in the non-carried item position registration unit 125, the position of the latest detection as the position of the non-carried item, it is possible to create the non-carried item database 120 in which the position of the non-carried item is accumulated.

FIG. 72 shows the non-carried item and that position as accumulated in the non-carried item position database. The position "longitude 135 degrees 34 minutes 30 seconds, latitude 35 degrees 30 minutes 10 seconds" where the "English textbook Y" is last detected is associated as the position of the non-carried item "English textbook Y" and accumulated.

As described above, even in the case where there is no infrequently carried item and no specified item, the mobile terminal 101 according to the present fifth embodiment isolates, with the destination candidate isolation unit 103, a plurality of destination candidates for the destination, based on the carried item detected by the carried item detection unit 103; calculates the distance between the user and the destination candidates with the destination candidate distance calculation unit 123; and it is thus possible for the destination prediction unit 107 to predict the destination candidate which the user is approaching as the destination.

In addition, in the mobile terminal 101 shown in FIG. 63, the non-carried item isolation unit 119 isolates the non-carried item which the user is not carrying; the non-carried item position detection unit 121 detects the position of the non-carried item; the destination candidate distance calculation unit 123 calculates the distance between the user and the destination candidate, which is a facility associated with the non-carried item; and therefore it is possible for the destination prediction unit 107 to predict the destination of the user based on the distance. Therefore, the mobile terminal 101 according to the present fifth embodiment can predict the destination of the user in a more flexible manner, from a position relationship between the user and the position of the non carried item, by isolating the non-carried item used to predict the destination and referring to that position, rather than from only the carried items the user currently carries.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

A destination prediction apparatus according to the present invention can be applied to a car navigation apparatus, a mobile terminal such as, for example, a cellular phone, and so on, which has a screen that can present destination information to the user with appropriate timing and in an appropriate form.

What is claimed is:

1. A destination prediction apparatus which predicts a destination of a user, said apparatus comprising:
   a carried item detection unit operable to detect a carried item which the user carries;
   an accumulation unit operable to associate at least the carried item detected by said carried item detection unit with position information, and accumulate the carried item and the position information as a history;
   a causal relationship extraction unit operable to extract, from the history, a causal relationship between at least the carried item and the position information;
   a destination prediction unit operable to predict the destination of the user based on the causal relationship and the carried item; and
   a carry frequency judgment unit operable to perform judgment that distinguishes whether the carried item is a frequently carried item which is carried with a frequency greater than or equal to a predetermined percentage, or an infrequently carried item which is carried with a frequency lower than the predetermined percentage,
   wherein said causal relationship extraction unit is operable to extract a causal relationship between the infrequently carried item and the frequently carried item.

2. The destination prediction apparatus according to claim 1,
   wherein said carry frequency judgment unit is operable to judge the carried item with a percentage lower than the predetermined percentage to be the infrequently carried item, and the carried item with a percentage greater than or equal to the predetermined percentage to be the frequently carried item, using, as the predetermined percentage, a percentage at which the user carries the carried item in each of a plurality of predetermined periods.

3. The destination prediction apparatus according to claim 1,
   wherein said frequency carry judgment unit is operable to judge the carried item with a percentage lower than the predetermined percentage to be the infrequently carried item, and the carried item with a percentage greater than or equal to the predetermined percentage to be the frequently carried item, using, as the predetermined percentage, a percentage at which the user carries the carried item in each of a plurality of areas obtained by dividing a travel route of the user on a map.

4. The destination prediction apparatus according to claim 1,
   wherein said frequency carry judgment unit is operable to judge the carried item with a percentage lower than the predetermined percentage to be the infrequently carried item, and the carried item with a percentage greater than or equal to the predetermined percentage to be the frequently carried item, using, as the predetermined percentage, a percentage at which the carried item is present in each of a plurality of classes that are obtained by dividing a travel route into the classes.

5. The destination prediction apparatus according to claim 1, further comprising
   a target area prediction unit operable to predict a target area which is the destination of the user,
   wherein said causal relationship extraction unit is operable to extract a causal relationship between the infrequently carried item and the target area.

6. The destination prediction apparatus according to claim 5,
   wherein said carry frequency judgment unit is further operable to judge the carried item with a percentage lower than the predetermined percentage to be the infrequently carried item, and the carried item with a percentage greater than or equal to the predetermined percentage to be the frequently carried item, using, as the predetermined percentage, a percentage at which the carried item is carried when a movement from a departure area to the target area predicted by said target area prediction unit is calculated as one movement.

7. A destination prediction apparatus which predicts a destination of a user, said apparatus comprising:
   a carried item detection unit operable to detect a carried item which the user carries;
   an accumulation unit operable to associate at least the carried item detected by said carried item detection unit with position information, and accumulate the carried item and the position information as a history;
   a causal relationship extraction unit operable to extract, from the history, a causal relationship between at least the carried item and the position information;
   a destination prediction unit operable to predict the destination of the user based on the causal relationship and the carried item;
   a non-carried item isolation unit operable to isolate a non-carried item which is not carried by the user based on the casual relationship and the carried item detected by said carried item detection unit;
   a non-carried item position detection unit operable to detect a position in which the non-carried item is present; and
   a non-carried item position relationship judgment unit operable to judge a position relationship between the non-carried item and the user based on the position of the non-carried item detected by said non-carried item position detection unit, a position of the user and a movement direction of the user, wherein said destination prediction unit is operable to predict, as the destination of the user, a destination corresponding to the non-carried item, in the case where said non-carried item position relationship judgment unit judges that the user is approaching the non-carried item.

8. The destination prediction apparatus according to claim 7, wherein said destination prediction unit is further operable to predict the destination of the user excluding the destination corresponding to the non-carried item.

9. A destination prediction method for predicting a destination of a user, said method comprising:

detecting a carried item which the user carries;

associating at least the carried item detected by said carried item detection unit with position information, and accumulating the carried item and the position information as a history;

judging whether the carried item is a frequently carried item which is carried with a frequency greater than or equal to a predetermined percentage, or an infrequently carried item which is carried with a frequency lower than the predetermined percentage;

extracting, from the history, a causal relationship between at least the carried item and the predetermined position information; and predicting the destination of the user based on the causal relationship and the carried item, wherein said extracting comprises extracting a causal relationship between the infrequently carried item and the frequently carried item.

10. A program used in a destination prediction method for predicting a destination of a user, said program being embodied on a computer-readable medium and causing a computer to execute a method comprising the steps of:

detecting a carried item which the user carries;

associating at least the carried item detected by said carried item detection unit with position information, and accumulating the carried item and the position information as a history;

extracting, from the history, a causal relationship between at least the carried item and the position information;

judging whether the carried item is a frequently carried item which is carried with a frequency greater than or equal to a predetermined percentage, or an infrequently carried item which is carried with a frequency lower than the predetermined percentage; and predicting the destination of the user based on the causal relationship and the carried item, wherein said extracting comprises extracting a causal relationship between the infrequently carried item and the frequently carried item.

11. A destination prediction method for predicting a destination of a user, said method comprising:

detecting a carried item which the user carries;

associating at least the carried item detected by said carried item detection unit with position information, and accumulating the carried item and the position information as a history;

extracting, from the history, a causal relationship between at least the carried item and the position information;

predicting the destination of the user based on the causal relationship and the carried item;

isolating a non-carried item which is not carried by the user based on the casual relationship and the carried item;

detecting a position in which the non-carried item is present; and judging a position relationship between the non-carried item and the user based on the detected position of the non-carried item, a position of the user and a movement direction of the user, wherein said predicting comprises predicting, as the destination of the user, a destination corresponding to the non-carried item, in the case where said judging judges that the user is approaching the non-carried item.

12. A program used in a destination prediction method for predicting a destination of a user, said program being embodied on a computer-readable medium and causing a computer to execute a method comprising the steps of:

detecting a carried item which the user carries;

associating at least the carried item detected by said carried item detection unit with position information, and accumulating the carried item and the position information as a history;

extracting, from the history, a causal relationship between at least the carried item and the position information;

predicting the destination of the user based on the causal relationship and the carried item;

isolating a non-carried item which is not carried by the user based on the casual relationship and the carried item;

detecting a position in which the non-carried item is present; and judging a position relationship between the non-carried item and the user based on the detected position of the non-carried item, a position of the user and a movement direction of the user, wherein said predicting comprises predicting, as the destination of the user, a destination corresponding to the non-carried item, in the case where said judging judges that the user is approaching the non-carried item.

* * * * *